US012127059B2

(12) United States Patent
Melodia et al.

(10) Patent No.: US 12,127,059 B2
(45) Date of Patent: Oct. 22, 2024

(54) INTELLIGENCE AND LEARNING IN O-RAN FOR 5G AND 6G CELLULAR NETWORKS

(71) Applicant: Northeastern University, Boston, MA (US)

(72) Inventors: Tommaso Melodia, Newton, MA (US); Salvatore D'Oro, Allston, MA (US); Michele Polese, Boston, MA (US); Leonardo Bonati, Boston, MA (US)

(73) Assignee: Northeastern University, Boston, MA (US)

( * ) Notice: Subject to any disclaimer, the term of this patent is extended or adjusted under 35 U.S.C. 154(b) by 259 days.

(21) Appl. No.: 17/456,361

(22) Filed: Nov. 23, 2021

(65) Prior Publication Data

US 2022/0167236 A1 May 26, 2022

Related U.S. Application Data

(60) Provisional application No. 63/118,630, filed on Nov. 25, 2020.

(51) Int. Cl.
*H04W 36/06* (2009.01)
*H04B 17/336* (2015.01)
(Continued)

(52) U.S. Cl.
CPC .......... *H04W 36/06* (2013.01); *H04B 17/336* (2015.01); *H04W 28/0236* (2013.01);
(Continued)

(58) Field of Classification Search
None
See application file for complete search history.

(56) References Cited

U.S. PATENT DOCUMENTS

2020/0296630 A1* 9/2020 Thaliath ................ H04W 28/16
2021/0029580 A1* 1/2021 Gupta ................... H04W 24/08
(Continued)

FOREIGN PATENT DOCUMENTS

WO    WO 2020/154564 A1    7/2020
WO    WO 2020/223593 A1    11/2020

OTHER PUBLICATIONS

U.S. Appl. No. 63/051,992, titled "A unified framework for multi-access edge computing (MEC) network slicing in 5G networks;" Salvatore D'Oro, filed Jul. 15, 2020.
(Continued)

*Primary Examiner* — Anh Ngoc M Nguyen
(74) *Attorney, Agent, or Firm* — Verrill Dana, LLP

(57) ABSTRACT

A radio access network (RAN) intelligent controller (RIC) and corresponding method may be implemented within RAN and in next-generation cellular networks to improve performance. The RIC comprises an interface to a RAN and further comprises a data-driven logic unit. The data-driven logic unit (i) produces, based on data received from the RAN via the interface, a representation describing a state of the RAN and (ii) based on the representation describing the state, instructs an action associated with at least one network element. The interface transmits a message based on the action instructed. The message is to be routed to the at least one network element. The representation is based on a context of the RAN. The message transmitted enabling re-configuration of the at least one network element. The re-configuration improves performance of the at least one network element within the context.

17 Claims, 28 Drawing Sheets

(51) Int. Cl.
  H04W 28/02    (2009.01)
  H04W 28/08    (2023.01)
  H04W 28/24    (2009.01)
  H04W 36/30    (2009.01)
(52) U.S. Cl.
  CPC ....... *H04W 28/0967* (2020.05); *H04W 28/24* (2013.01); *H04W 36/30* (2013.01)

(56) References Cited

U.S. PATENT DOCUMENTS

| | | | |
|---|---|---|---|
| 2022/0022044 A1 | 1/2022 | D'Oro et al. | |
| 2022/0156572 A1* | 5/2022 | Han | G06F 16/278 |
| 2022/0394727 A1* | 12/2022 | Wang | H04W 28/0231 |

OTHER PUBLICATIONS

3GPP TR 38.816 V15.0.0 (Dec. 2017) Technical Report, 3rd Generation Partnership Project; Technical Specification Group Radio Access Network; Study on CU-DU lower layer split for NR; (Release 15), 16 pages (Dec. 2017).
3GPP TS 28.552 V16.11.0 (Sep. 2021) Technical Specification, 3rd Generation Partnership Project; Technical Specification Group Services and Systems Aspects; Management and orchestration; 5G performance measurements (Release 16), 196 pages (Sep. 2021).
3GPP TS 32.425 V17.1.0 (Jun. 2021) Technical Specification, 3rd Generation Partnership Project; Technical Specification Group Services and System Aspects; Telecommunication management; Performance management (PM); Performance measurements; Evolved Universal Terrestrial Radio Access Network (E-UTRAN) (Release 17), 113 pages (Jun. 2021).
3GPP TS 36.213 V16.7.1 (Oct. 2021) Technical Specification, 3rd Generation Partnership Project; Technical Specification Group Radio Access Network; Evolved Universal Terrestrial Radio Access (E-UTRA); Physical layer procedures (Release 16), 7 pages (Oct. 2021).
3GPP TS 36.213 V16.2.0 (Jun. 2020) Technical Specification, 3rd Generation Partnership Project; Technical Specification Group Radio Access Network; Evolved Universal Terrestrial Radio Access (E-UTRA); Physical layer procedures (Release 16), 576 pages (Jun. 2020).
3GPP TS 36.213 V16.7.1 (Oct. 2021) Annex A (informative): Change history, 21 pages (Oct. 2021).
3GPP TS 36.213 V16.7.1 (Oct. 2021) Sections 1-5, 53 pages (Oct. 2021).
3GPP TS 36.213 V16.7.1 (Oct. 2021) Sections 6 and 7, 229 pages (Oct. 2021).
3GPP TS 36.213 V16.7.1 (Oct. 2021) Sections 8 and 9, 105 pages (Oct. 2021).
3GPP TS 36.213 V16.7.1 (Oct. 2021) Sections 10-13, 102 pages (Oct. 2021).
3GPP TS 36.213 V16.7.1 (Oct. 2021) Section 14, 61 pages (Oct. 2021).
Abadi, M. et al., "TensorFlow: Large-Scale Machine Learning on Heterogeneous Distributed Systems," arXiv: 1603.04467v2 [cs.DC] 19 pages (Mar. 16, 2016).
Abbasloo, S. et al., "Wanna Make Your TCP Scheme Great for Cellular Networks? Let Machines Do It for You!" IEEE Journal on Selected Areas in Communications, vol. 39, No. 1, pp. 265-279 (Jan. 2021).
Ayala-Romero, J.A. et al., "vrAIn: A Deep Learning Approach Tailoring Computing and Radio Resources in Virtualized RANs," Proc. of ACM MOBICOM, 16 pages (Oct. 21-25, 2019).
Bega, D. et al., "DeepCog: Cognitive Network Management in Sliced 5G Networks with Deep Learning," IEEE International Conference on Computer Communications (IEEE INFOCOM 2019), Paris, France, 9 pages (2019).
Bertizzolo, L. et al., "Arena: A 64-antenna SDR-based ceiling grid testing platform for sub-6 GHz 5G-and-Beyond radio spectrum research," Computer Networks, 181, 17 pages (Jul. 28, 2020).
Bonati, L. et al., "CellOS: Zero-touch Softwarized Open Cellular Networks," Computer Networks, 180, 13 pages (2020).
Bonati, L. et al., "Open, Programmable, and Virtualized 5G Networks: State-of-the-Art and the Road Ahead," Computer Networks, vol. 182, 28 pages, (Aug. 29, 2020).
Bonati, L. et al., "Intelligence and Learning in O-RAN for Data-Driven NextG Cellular Networks," IEEE Communications Magazine, 7 pages, Oct. 2021.
L. Bonati, et al., "Intelligence and learning in O-RAN for data-driven NextG cellular networks," arXiv:2012.01263 [cs.NI], Dec. 2, 2020.
Bonati, L. et al., "SCOPE: An Open and Softwarized Prototyping Platform for NextG Systems," MobiSys '21, Jun. 24-Jul. 2, 2021, Virtual, WI, USA, 12 pages.
Brake, D., "A U.S. National Strategy for 5G and Future Wireless Innovation," Information Technology & Innovation Foundation, 54 pages (Apr. 2020).
Breen, J. et al., "Powder: Platform for Open Wireless Data-driven Experimental Research," Computer Networks, 197, 18 pages (Available online Jul. 8, 2021).
Chen, M. et al., "Artificial Neural Networks-Based Machine Learning for Wireless Networks: A Tutorial," IEEE Communications Surveys & Tutorials, vol. 21, No. 4, Fourth Quarter 2019, 33 pages (2019).
Cheung, B., "Mobility Standards Harmonization with ONAP," 5G Use Cases in R6 Frankfurt, 9 pages (May 4, 2020).
Chinchali, S. et al., "Cellular Network Traffic Scheduling with Deep Reinforcement Learning," The Thirty-Second AAAI Conference on Artificial Intelligence (AAAI-18), 9 pages (2018).
Chuai, J. et al., "A Collaborative Learning Based Approach for Parameter Configuration of Cellular Networks," IEEE Conference on Computer Communications 2019, 1396-1404 (2019).
Cong Luong, N. et al., "Applications of Deep Reinforcement Learning in Communications and Networking: A Survey," IEEE Communications Surveys & Tutorials, vol. 21, No. 4, Fourth Quarter 2019, pp. 3133-3174 (2019).
Coronado, E. et al., "5G-EmPOWER: A Software-Defined Networking Platform for 5G Radio Access Networks," IEEE Transactions on Network and Service Management, vol. 16, No. 2, pp. 715-728 (Jun. 2019).
D'Oro, S. et al., "The Slice Is Served: Enforcing Radio Access Network Slicing in Virtualized 5G Systems," IEEE International Conference on Computer Communications (INFOCOM) 2019, Paris, France, 10 pages (Feb. 1, 2019).
Ericsson Mobility Report, Nov. 2021, 40 pages (2021).
Ericsson, "Ericsson mobility report," Jun. 2021. [Online]. Available: https://www.ericsson.com/en/mobility-report.
Fu, Y. et al., "Artificial Intelligence to Manage Network Traffic of 5G Wireless Networks," AI for Network Traffic Control, IEEE Network, 7 pages (Nov./Dec. 2018).
Garcia-Aviles, G. et al., "Experimenting with open source tools to deploy a multi-service and multi-slice mobile network," Computer Communications, 150: (2020) 1-12.
Garcia-Aviles, G. et al., "POSENS: A Practical Open Source Solution for End-to-End Network Slicing," 5G Testing and Field Trials, IEEE Wireless Communications, 8 pages (Oct. 2018).
Giordani, M. et al., "Toward 6G Networks: Use Cases and Technologies," Mobile Communications and Networks, IEEE Communications Magazine, 7 pages (Mar. 2020).
Golam Kibria, M. et al., "Big Data Analytics, Machine Learning, and Artificial Intelligence in Next-Generation Wireless Networks," IEEE Access, vol. 6, pp. 32328-32335 (Jun. 29, 2018).
Gomez-Miguelez, I. et al., "srsLTE: An Open-Source Platform for LTE Evolution and Experimentation," arXiv: 1602.04629, pp. 25-32 (Feb. 2016).
Gündüz, D. et al., "Machine Learning in the Air," IEEE Journal on Selected Areas in Communications, vol. 37, No. 10, 16 pages (Oct. 2019).
Haarnoja, T. et al., "Reinforcement Learning with Deep Energy-Based Policies," arXiv:1702.08165, 10 pages (2017).

(56) References Cited

OTHER PUBLICATIONS

Hewlett Packard Enterprise. 2020. HPE Speeds Up 5G Adoption with Cloud Native 5G Core Software Stack, Available as-a-Service. https://www.hpe.com/us/en/newsroom/press-release/2020/03/hpe-speeds-up-5g-adoption-with-cloud-native-5g-core-software-stack-available-as-a-service.html, (Mar. 10, 2020).
Hill, "House unanimously passes $750 million Open RAN 5G bill," RCRWireless Intelligence on All Thing Wireless, (Nov. 18, 2020).
Rakuten. 2020. "How Elegant Software Can Make 5G Networks More Resilient," https://rakuten.today/blog/5g-network-reliability-lightreading.html (Jun. 12, 2020).
Huang, Y. et al., "A Deep-Learning-based Link Adaptation Design for eMBB/URLLC Multiplexing in 5G NR," IEEE Conference on Computer Communications, 10 pages (2021).
Jiang, C. et al., "Machine Learning Paradigms for Next-Generation Wireless Networks," Accepted from Open Call, IEEE Wireless Communications, pp. 98-105 (Apr. 2017).
Kaltenberger, F. et al., "OpenAirInterface: Democratizing innovation in the 5G Era," Computer Networks, 176, 11 pages (2020), Available online May 1, 2020.
Koutlia, K. et al., "Design and Experimental Validation of a Software-Defined Radio Access Network Testbed with Slicing Support," Wireless Communications and Mobile Computing, vol. 2019, Article ID 2361352, 17 pages (Jun. 12, 2019).
Lime Microsystems. 2020. LimeSDR. https://limemicro.com/products/boards/ (accessed Jul. 21, 2020).
Marinova, S. et al., "End-to-end network slicing for future wireless in multi-region cloud platforms," Computer Networks, 177, 10 pages (May 21, 2020).
McKeown, N. et al., "OpenFlow: Enabling Innovation in Campus Networks," ACM SIGCOMM Computer Communication Review, vol. 38, No. 2, pp. 69-74 (Apr. 2008).
V. Mnih, et al., 2013. Playing Atari with Deep Reinforcement Learning. arXiv preprint arXiv: 1312.5602 (Dec. 19, 2013).
Mnih, V. et al., "Human-level control through deep reinforcement learning," Nature, vol. 518, 13 pages (Feb. 26, 2015).
Mollahasani, et al., "Actor-critic learning based QoS-aware scheduler for reconfigurable wireless networks," IEEE Trans. on Netw. Sci. Eng., pp. 1-10, 2021.
Naderializadeh, N. et al., "Resource Management in Wireless Networks via Multi-Agent Deep Reinforcement Learning," IEEE Transactions on Wireless Communications, vol. 20, No. 6, pp. 3507-3523 (Jun. 2021).
Niknam, S. et al., "Intelligent O-RAN for Beyond 5G and 6G Wireless Networks," arXiv:2005.08374v1, 7 pages (May 17, 2020).
O'Halloran, "Maturing O-RAN set to have 75% market share by 2030," ComputerWeekly.com, (Oct. 22, 2020).
Open Network Automation Platform (ONAP) Architecture White Paper, 19 pages (2019).
O-RAN Alliance Conducts First Global Plugfest to Foster Adoption of Open and Interoperable 5G Radio Access Networks. 2019.https://static1.squarespace.com/static/5ad774cce74940d7115044b0/t/5dfba8fb1326ae1bcf4a8b6f/1576773884092/O-RAN-2019.12.19-EC-C-PR-on-2019-Plugfest-v1.0.pdf. (Dec. 19, 2019).
O-RAN Alliance, "O-RAN Alliance Conducts First Global Plugfest to Foster Adoption of Open and Interoperable 5G Radio Access Networks," 3 pages (2020).
O-RAN Alliance, O-RAN Architecture Description, O-RAN.WG1. O-RAN-Architecture-Description-v05.00 Technical Specification, 36 pages (2021).
O-RAN Alliance, "O-RAN: Towards an Open and Smart RAN," White Paper, 19 pages (Oct. 2018).
O-RAN Alliance, "O-RAN Use Cases and Deployment Scenarios: Towards Open and Smart RAN," White Paper, 21 pages (Feb. 2020).
O-RAN Alliance, "O-RAN Working Group 2: AI/ML workflow description and requirements," O-RAN.WG2.AIML-v01.03 Technical Report, 58 pages (2021).
O-RAN Alliance, "O-RAN Working Group 3: Near-Real-time RAN Intelligent Controller, E2 Service Model (E2SM)," ORAN-WG3. E2SM-v01.00.00 Technical Specification, 27 pages (2020).
O-RAN Alliance, "O-RAN Working Group 3: Near-Real-time RAN Intelligent Controller; Architecture & E2 General Aspects and Principles," O-RAN.WG3.E2GAP-v01.01, 36 pages (2020).
O-RAN Working Group 1, "O-RAN Architecture Description—v2.00," O-RAN.WG1.O-RAN-Architecture-Description-v02.00 Technical Specification, Jul. 2020.
O-RAN Working Group 2, "O-Ran AI/ML workflow description and requirements-v1.01," O-RAN.WG2.AIML-v01.01 Technical Specification, Apr. 2020.
O-RAN Working Group 3, "O-RAN near-real-time RAN intelligent controller E2 service model (E2SM) KPM 1.0," ORAN-WG3. E2SM-KPM-v01.00.00 Technical Specification, Feb. 2020.
O'Shea and J. Hoydis, "An Introduction to Deep Learning for the Physical Layer," IEEE Trans. Cogn. Commun. Netw., vol. 3, No. 4, pp. 563-575, Dec. 2017.
O'Shea, T.J. et al., "Learning to Communicate: Channel Autoencoders, Domain Specific Regularizers, and Attention," 2016 IEEE International Symposium on Signal Processing and Information Technology (ISSPIT), 6 pages (2016).
Perenda, E. et al., "Learning the unknown: Improving modulation classification performance in unseen scenarios," IEEE Infocom 2021—IEEE Conference on Computer Communications, 10 pages (2021).
Polese, M. et al., "Machine Learning at the Edge: A Data-Driven Architecture With Applications to 5G Cellular Networks," IEEE Transactions on Mobile Computing, vol. 20, No. 12, pp. 3367-3382 (Dec. 2021).
M. Polese et al., "Machine learning at the edge: A data-driven architecture with applications to 5G cellular networks," IEEE Trans. Mob. Comput., pp. 1-16 (Jun. 2020).
Raychaudhuri, D. et al., "Challenge: COSMOS: A City-Scale Programmable Testbed for Experimentation with Advanced Wireless," MobiCom '20: Proceedings of the 26th Annual International Conference on Mobile Computing and Networking, Art. No. 14, pp. 1-13 (Sep. 21-25, 2020).
Sakurada, M. and Y. Takehisa, "Anomaly Detection Using Autoencoders with Nonlinear Dimensionality Reduction," MLSDA '14: Proceedings of the MLSDA 2014 $2^{nd}$ Workshop on Machine Learning for Sensory Data Analysis, pp. 4-11 (Dec. 2, 2014).
Schulman, J. et al., "Proximal Policy Optimization Algorithms," arXiv:1707.06347, 12 pages (Aug. 28, 2017).
Sichitiu, M. et al., "AERPAW Emulation Overview," WINTECH '20, pp. 1-8 (Sep. 21, 2020).
Sun, Y. et al., "Application of Machine Learning in Wireless Networks: Key Techniques and Open Issues," IEEE Communications Surveys & Tutorials, vol. 21, No. 4, Fourth Quarter 2019, 37 pages (Nov. 25, 2019).
TIP OpenRAN: Toward Disaggregated Mobile Networking: A Heavy Reading white paper produced for the Telecom Infra Project, Author: G. Brown, 12 pages (May 2020).
Vallis, D., Ampere Computing, "5G breaks from proprietary systems, embraces open source RANs," 11 pages (May 29, 2020).
Unwired Labs. 2020. OpenCelliD. https://opencellid.org (accessed Jul. 24, 2020).
U.S. Naval Research Laboratory. 2019. Multi-Generator (MGEN). https://www.nrl.navy.mil/itd/ncs/products/mgen (accessed Aug. 13, 2020).
U.S. Naval Research Laboratory, "MGEN Traffic Emulator." [Online]. Available: https://tinyurl.com/bccxc8yc (accessed Jun. 13, 2021).
Wang, S. et al., "Deep Reinforcement Learning for Dynamic Multichannel Access in Wireless Networks," IEEE Transactions on Cognitive Communications and Networking, vol. 4, No. 2, pp. 257-265 (Jun. 2018).
Wang, J. et al., "Spatiotemporal Modeling and Prediction in Cellular Networks: A Big Data Enabled Deep Learning Approach," IEEE INFOCOM 2017—IEEE Conference on Computer Communications, 9 pages (2017).
Wang, Z. et al., "Handover Control in Wireless Systems via Asynchronous Multiuser Deep Reinforcement Learning," IEEE Internet of Things Journal, vol. 5, No. 6, pp. 4296-4307 (Dec. 2018).

(56) References Cited

OTHER PUBLICATIONS

Wang, J. et al., "Thirty Years of Machine Learning: The Road to Pareto-Optimal Wireless Networks," IEEE Communications Surveys & Tutorials, vol. 22, No. 3, Third Quarter, pp. 1472-1514 (Aug. 21, 2020).

Wang, W. et al., "Generalized Autoencoder: A Neural Network Framework for Dimensionality Reduction," CVPR2014 Workshop paper, Open Access Version provided by the Computer Vision Foundation, pp. 490-497 (2014).

Xiong, Z. et al., "Deep Reinforcement Learning for Mobile 5G and Beyond," Fundamentals, Applications, and Challenges, IEEE Vehicular Technology Magazine, vol. 14, No. 2, pp. 44-52 (Jun. 2019).

Yang, Q. et al., "Federated Machine Learning: Concept and Applications," ACM Transactions on Intelligent Systems and Technology, vol. 10, No. 2, Article 12, pp. 12.1-12.19 (Jan. 2019).

Zhao, N. et al., "Deep Reinforcement Learning for User Association and Resource Allocation in Heterogeneous Cellular Networks," IEEE Transactions on Wireless Communications, vol. 18, No. 11, pp. 5141-5152 (Nov. 11, 2019).

Zhou, H. et al., "RAN Resource Slicing in 5G Using Multi-Agent Correlated Q-Learning," 2021 IEEE $32^{nd}$ Annual International Symposium on Personal, Indoor and Mobile Radio Communications (PIMRC), pp. 1179-1184 (2021).

Platform for Open Wireless Data-driven Experimental Research (POWDER). 2020. https://www.powderwireless.net (accessed Jul. 5, 2020).

S. Marek. 2020. 5G's Future Includes a Cloud-native Architecture Com-plete with Containers. https://www.lightreading.com/cloud-native-nfv/5gs-future-includes-a-cloud-native-architecture-complete-with-containers/d/d-id/762116 (Jul. 1, 2020).

XApp Framework. https://wiki.o-ran-sc.org/display/ORANSDK/xAppFramework. Accessed Jul. 2021.

O-RAN Software Community. Bronze release. https://wiki.o-ran-sc.org/pages/viewpage.action?pageId=14221635. Accessed Jul. 2021.

O-RAN Software Community. O-DU-L2 Documentation. https://docs.o-ran-sc.org/projects/o-ran-sc-o-du-12/en/latest/index.html. Accessed Jul. 2021.

The Status of Open Source for 5G. 2019. 5G Americas Whitepaper. https://www.5gamericas.org/wp-content/uploads/2019/07/5G_Americas_White_Paper_The_Status_of_Open_Source_for_5G_Feb_2019.pdf (Feb. 2019).

Ethus Research. 2020. USRP. https://www.ettus.com/products (accessed Jul. 21, 2020).

Canonical. 2020. Linux Containers (LXC). https://linuxcontainers.org (accessed Jul. 9, 2020).

L. Hardesty. 2020. Altiostar Joins Mavenir to Develop Open RAN Radios for U.S. Carriers. https://www.fiercewireless.com/wireless/altiostar-joins-mavenir-to-develop-open-ran-radios-for-u-s-carriers (Jun. 11, 2020).

M. Robuck. 2020. AT&T on Target for Virtualizing 75% of its Network by 2020. https://www.fiercetelecom.com/telecom/at-t-target-for-virtualizing-75-its-network-by-2020 (Jan. 3, 2020).

Platforms for Advanced Wireless Research (PAWR). 2020. https://www.advancedwireless.org (accessed Jul. 21, 2020).

Powder Deployment. 2020. https://www.powderwireless.net/area (accessed Aug. 6, 2020).

Colosseum. https://www.colosseum.net (accessed May 1, 2020).

3GPP, "5G performance measurements," Technical Specification (TS) 28.552, Jun. 2021, version 17.3.1.

Nuand. 2020. bladeRF. https://www.nuand.com (accessed Jul. 15, 2020).

\* cited by examiner

```
1.   import scope_api as sc, time
2.   while experiment_running:
3.       slice_metrics = sc.read_metrics(time_window)
4.       for slice, metric in slice_metrics.items():
5.           sc.set_mcs(metric['ue'], msc_level, 'dl')
6.           if metric['buffer'] > threshold:
7.               sc.set_slice(slice, 'proportional', metric['rbg']+2)
8.           else:
9.               sc.set_slice(slice, 'round-robin', metric['rbg']-2)
10.      time.sleep(timeout)
```

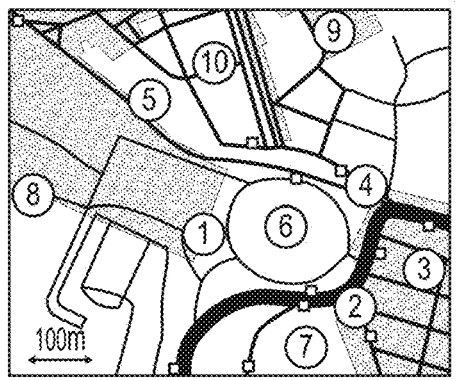
FIG. 9A — ROME SCENARIO 947
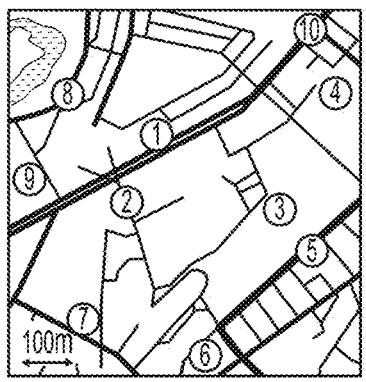
FIG. 9B — BOSTON SCENARIO 948
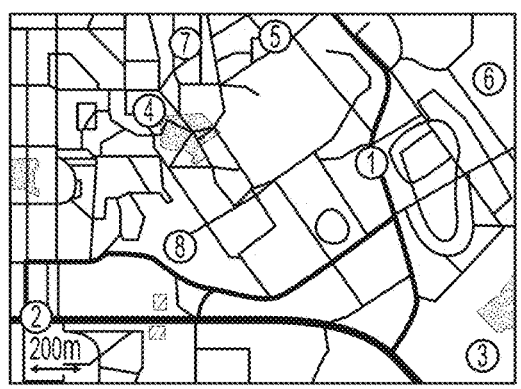
FIG. 9C — POWDER SCENARIO 949

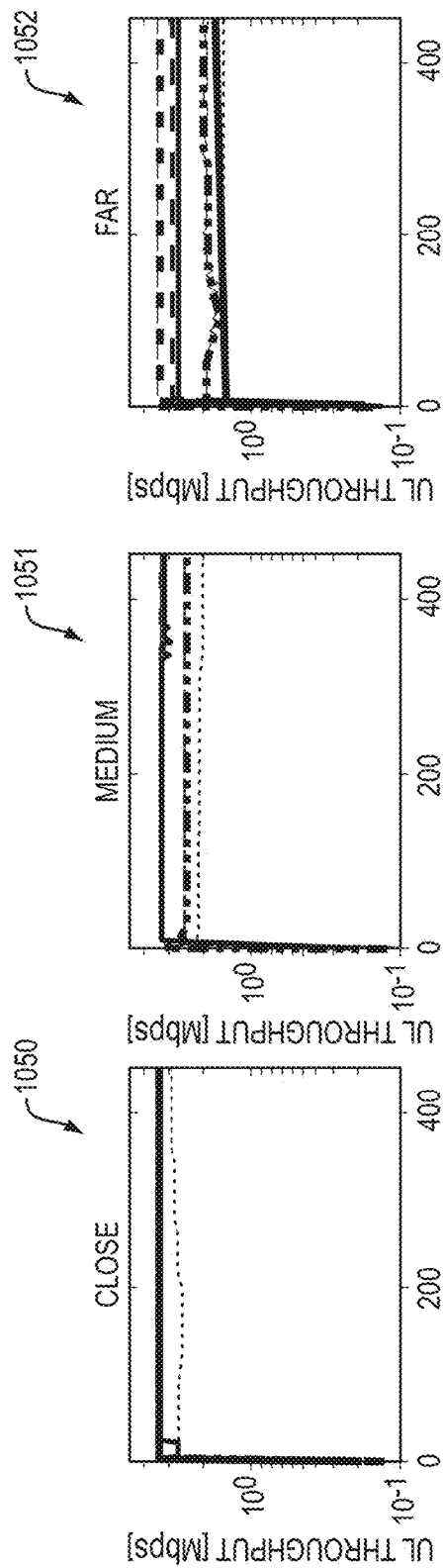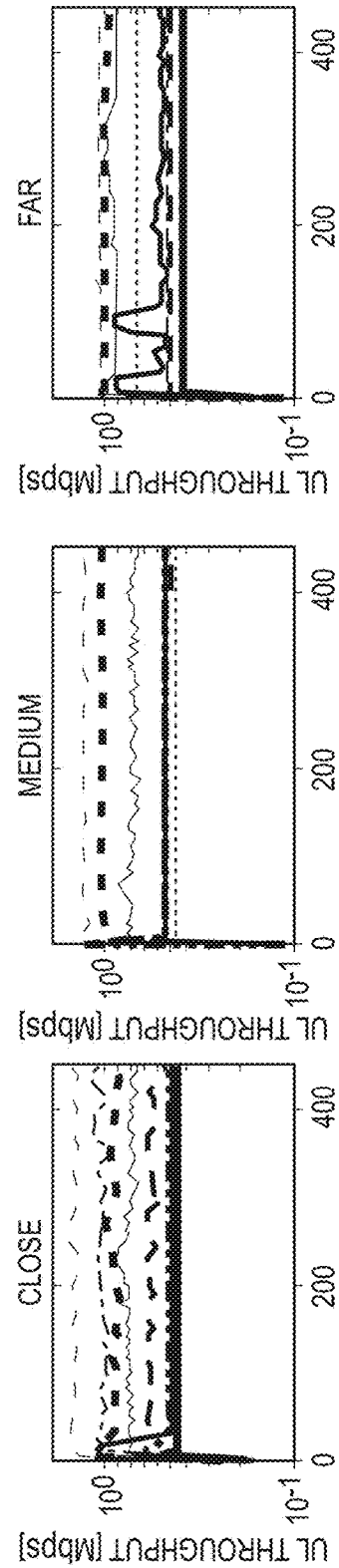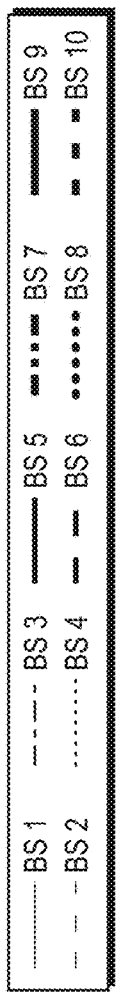

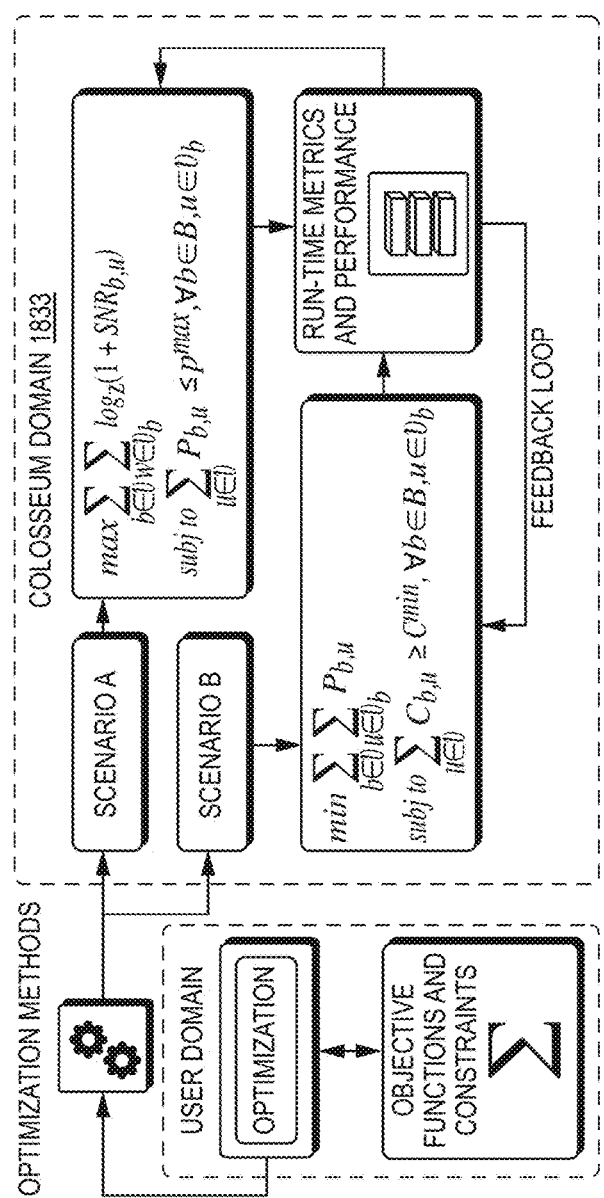
FIG. 18
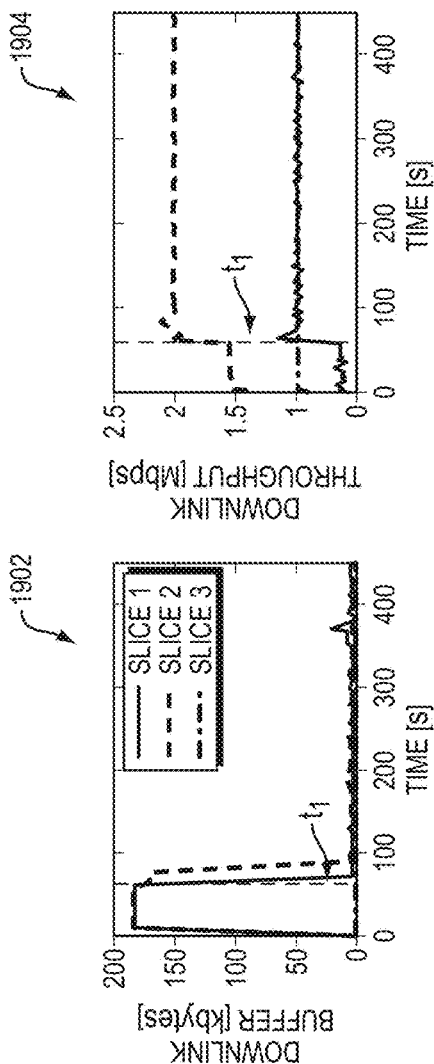
FIG. 19A
FIG. 19B

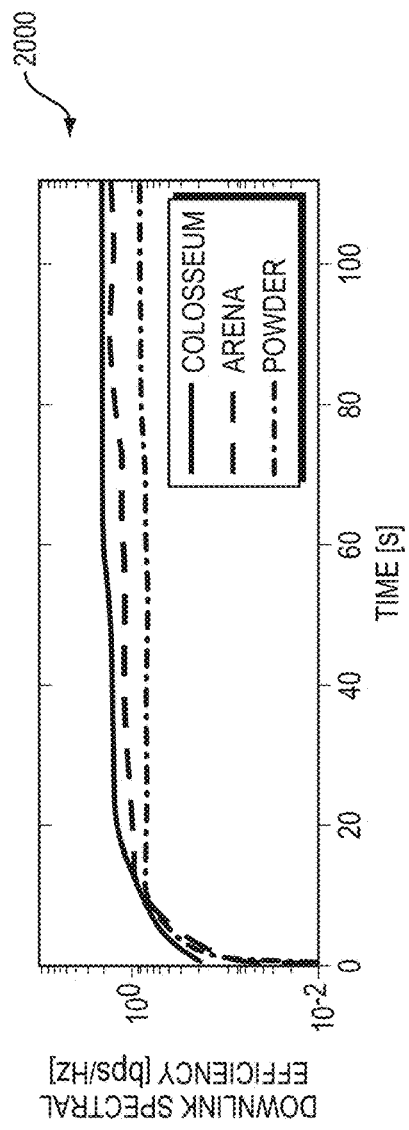
FIG. 20
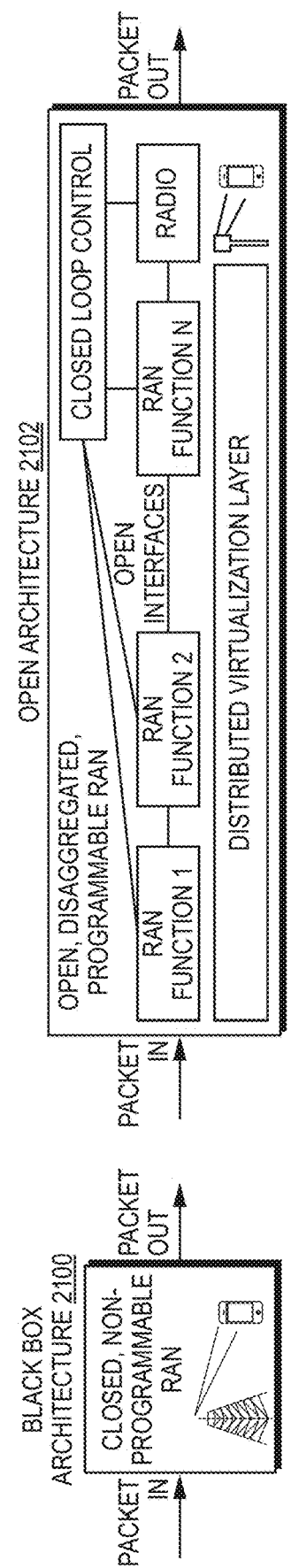
FIG. 21A
FIG. 21B

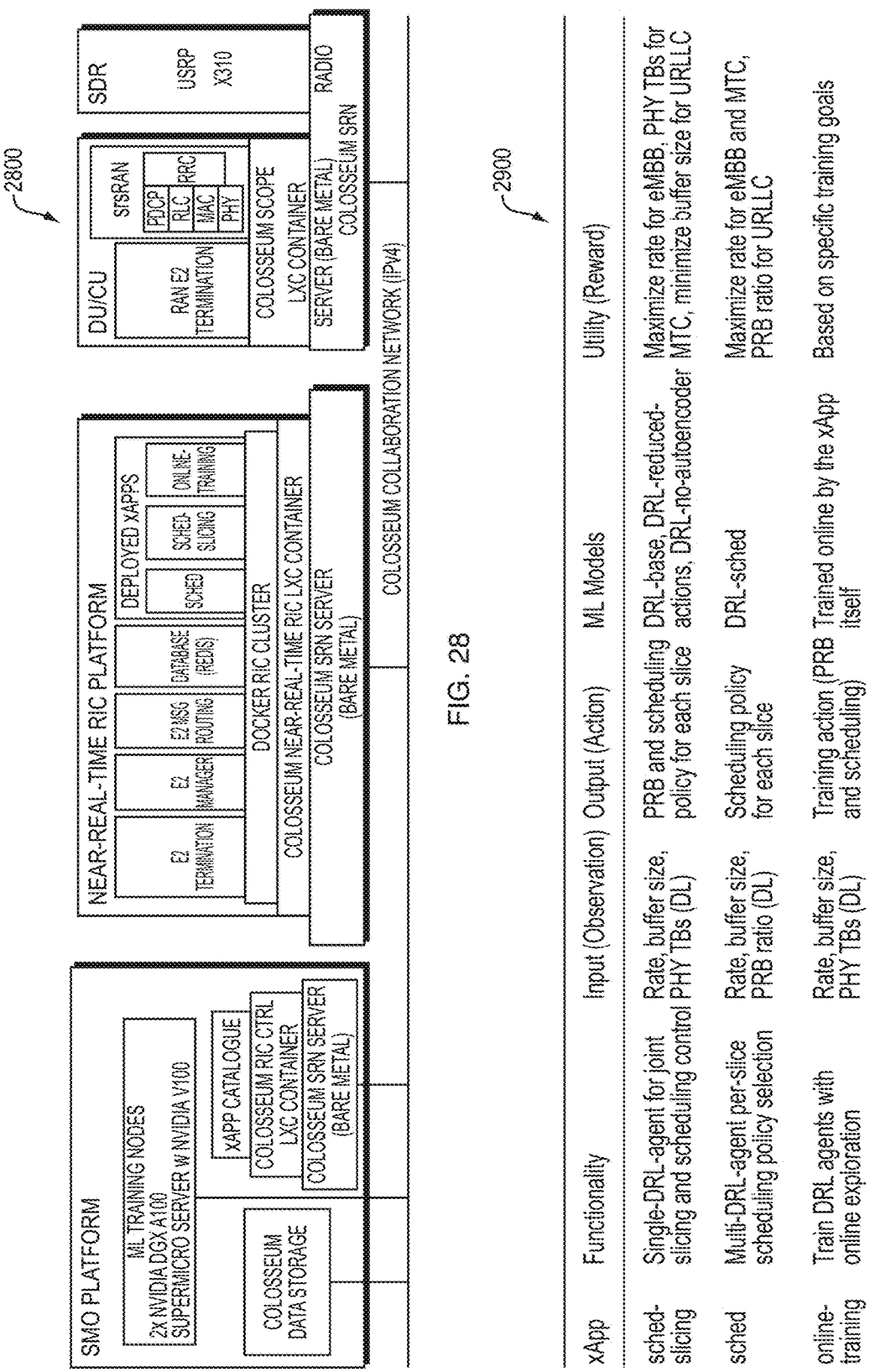

TABLE I: Catalogue of developed xApps.

| xApp | Functionality | Input (Observation) | Output (Action) | ML Models | Utility (Reward) |
|---|---|---|---|---|---|
| sched-slicing | Single-DRL-agent for joint slicing and scheduling | Rate, buffer size, PHY TBs (DL) | PRB and scheduling policy for each slice | DRL-base, DRL-reduced-actions, DRL-no-autoencoder | Maximize rate for eMBB, PHY TBs for MTC, minimize buffer size for URLLC |
| sched | Multi-DRL-agent per-slice scheduling policy selection | Rate, buffer size, PRB ratio (DL) | Scheduling policy for each slice | DRL-sched | Maximize rate for eMBB and MTC, PRB ratio for URLLC |
| online-training | Train DRL agents with online exploration | Rate, buffer size, PHY TBs (DL) | Training action (PRB and scheduling) | Trained online by the xApp itself | Based on specific training goals |

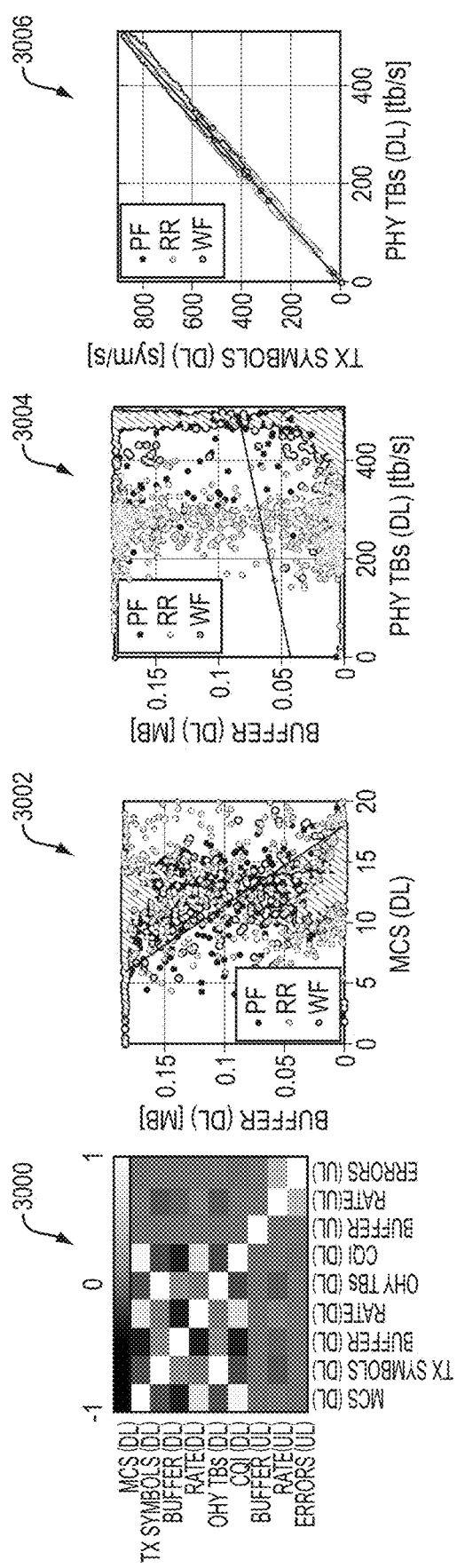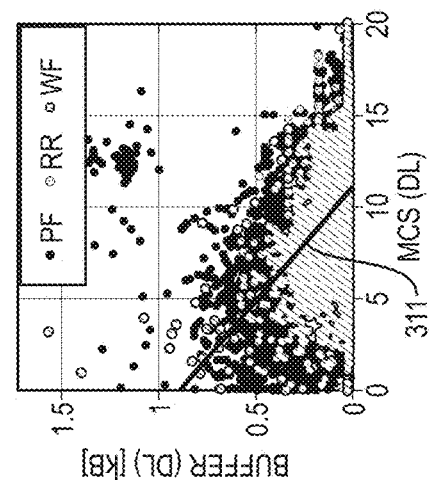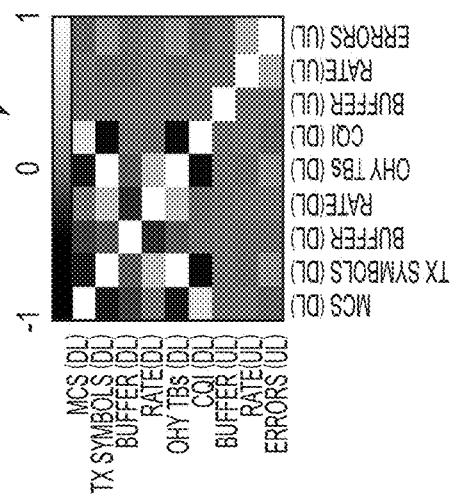
FIG. 30D
FIG. 30C
FIG. 30B
FIG. 30A
FIG. 31B
FIG. 31A

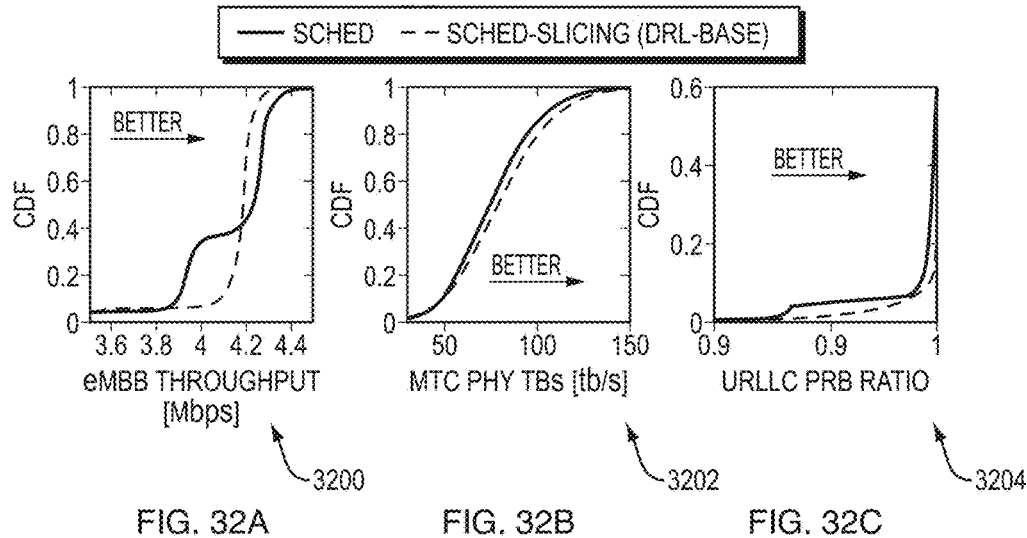
FIG. 32A    FIG. 32B    FIG. 32C
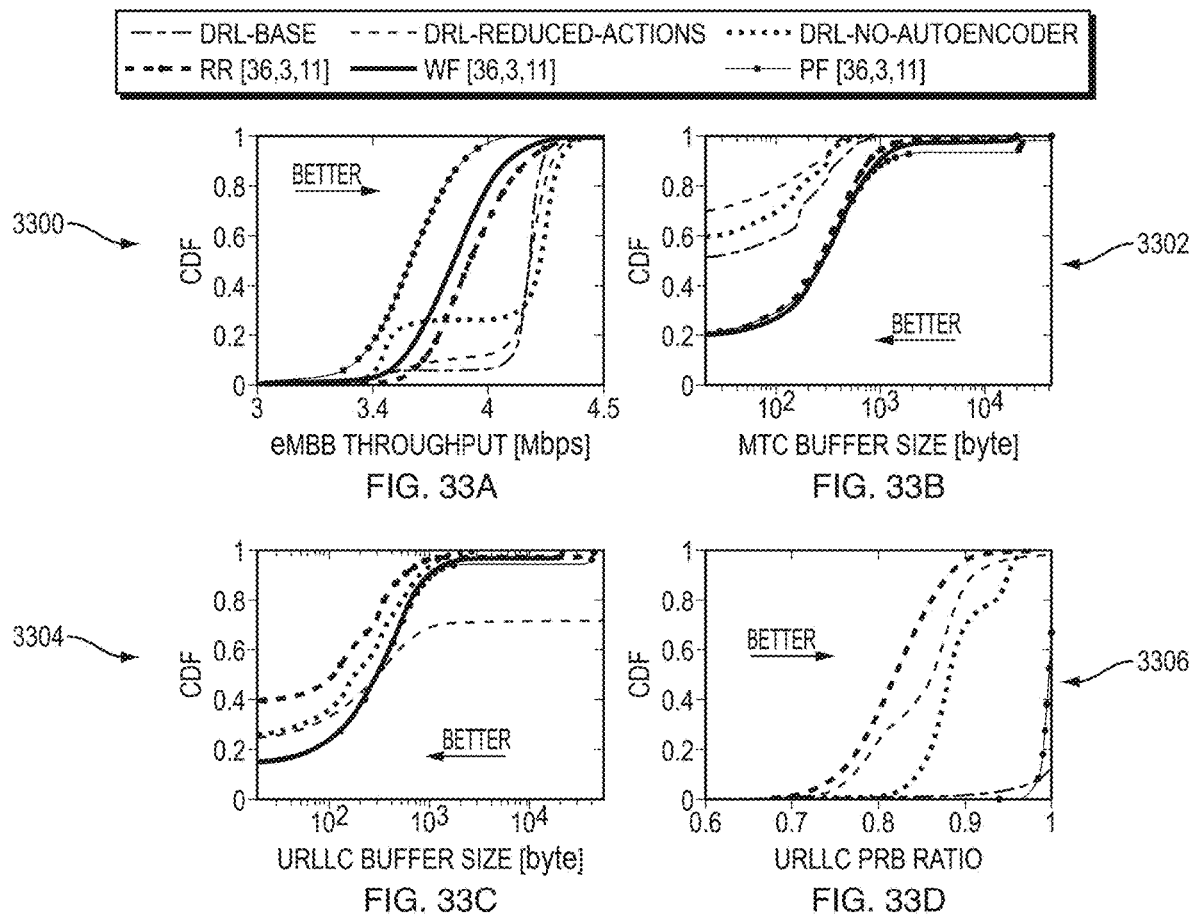
FIG. 33A    FIG. 33B
FIG. 33C    FIG. 33D

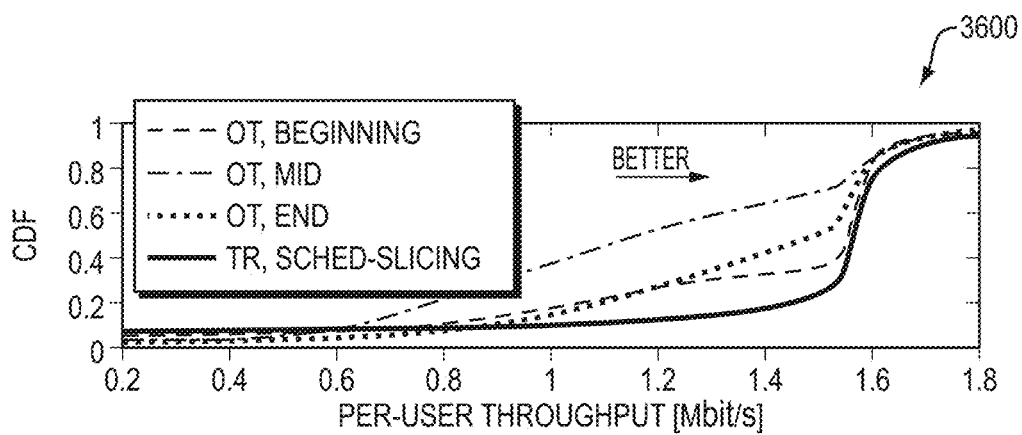
FIG. 36
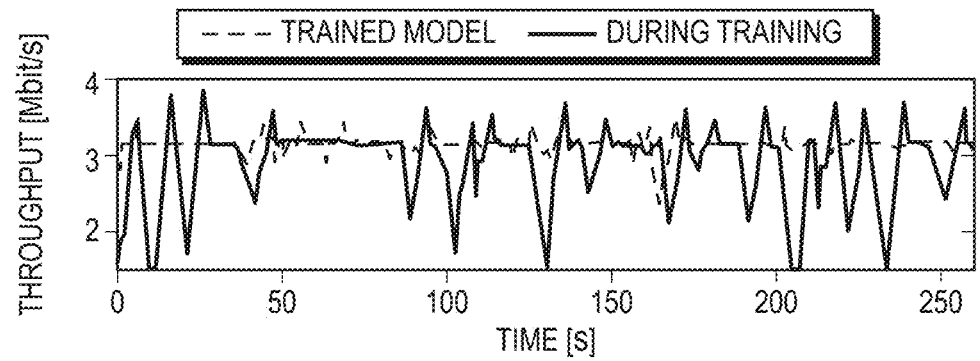
FIG. 37
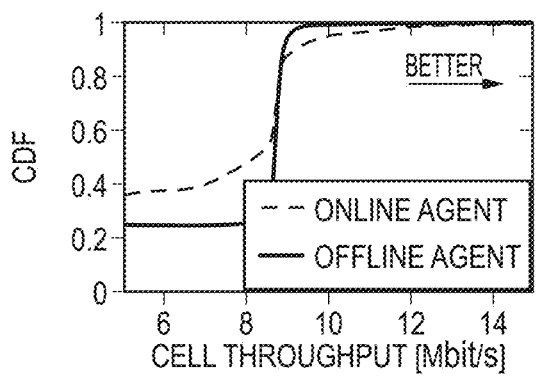 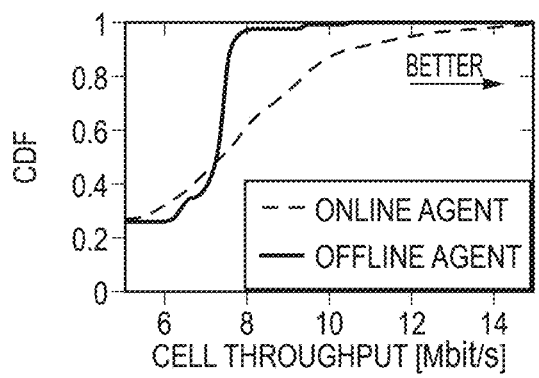
FIG. 38A  FIG. 38B

INTELLIGENCE AND LEARNING IN O-RAN FOR 5G AND 6G CELLULAR NETWORKS

RELATED APPLICATION

This application claims the benefit of U.S. Provisional Application No. 63/118,630, filed on Nov. 25, 2020. The entire teachings of the above application are incorporated herein by reference.

GOVERNMENT SUPPORT

This invention was made with government support under Grant Number 1923789 awarded by the National Science Foundation, Grant Number N00014-19-1-2409 awarded by the Office of Naval Research, and Grant Number N00014-20-1-2132 awarded by the Office of Naval Research. The government has certain rights in the invention.

BACKGROUND

A radio access network (RAN) Intelligent Controller (RIC) is a software-defined component of the Open Radio Access Network (O-RAN) architecture that's responsible for controlling and optimizing RAN functions. The RIC is a useful piece of the O-RAN disaggregation strategy, bringing multivendor interoperability, intelligence, agility, and programmability to radio access networks (RANs). The RIC enables the onboarding of third-party applications that automate and optimize RAN operations at scale while supporting innovative use cases that lower mobile operators' total cost of ownership (TCO) and enhance customers' quality of experience (QoE).

SUMMARY

According to an example embodiment, a radio access network (RAN) intelligent controller (RIC) comprises an interface to a RAN and further comprises a data-driven logic unit. The RAN may be deployed, for example, following an open RAN (O-RAN) architecture. The data-driven logic unit is configured to (i) produce, based on data received from the RAN via the interface, a representation describing a state of the RAN and (ii) based on the representation describing the state, instruct an action associated with at least one network element. The interface is configured to transmit a message based on the action instructed, the message to be routed to the at least one network element. The representation describing the state is based on a context of the RAN. The message transmitted enables re-configuration of the at least one network element. The re-configuration improves performance of the at least one network element within the context.

The context may include a geographical area, frequency of operation, or other condition of the RAN. The action instructed may include at least one instruction to alter at least one parameter of the at least one network element. The data received may include at least one key performance metric (KPM) or key performance indicator (KPI). For non-limiting example, the at least one KPM or KPI may be associated with throughput, service latency, quality of service (QoS), signal-to-noise ratio, telemetry, or a combination thereof.

The data-driven logic unit may include an autoencoder and a deep reinforcement learning (DRL) agent. The autoencoder may be configured to produce the representation describing the state. The DRL agent may be configured to instruct the action. The data-driven logic unit may be pre-trained, offline, and the data-driven logic unit may be capable of being trained, in real-time, based on the data received.

The RIC may be a near-real-time RIC. The at least one network element may be a base station, a central unit (CU) of a base station, a distributed unit (DU) of a base station, a radio unit (RU) of a base station, another network, other network element, or a combination thereof.

The data-driven logic unit may be included in an xApp. The xApp is a composite application deployed on the RIC.

The xApp may be a first xApp. A second xApp may be deployed on the RIC or on another controller. The first xApp and second xApp may include first and second respective instances of at least one shared layer, respectively. The first xApp may be configured to produce a newly trained version of the at least one shared layer by training the first respective instance of the at least one shared layer based on the data received. The first xApp may be further configured to communicate the newly trained version produced to the second xApp, causing the second xApp to, in turn, update the second respective instance of the at least one shared layer to the newly trained version.

Respective data-driven logic units of the first and second xApps may include respective autoencoders. The first and second respective instances of the at least one shared layer may be included in the respective autoencoders of the first and second xApps, respectively. The at least one shared layer may be associated, for non-limiting example, with a network slicing policy, transmission power or policy, scheduling policy, or other control action.

The data-driven logic unit may include a first machine learning component and a second machine learning component. The first machine learning component may be configured to produce the representation describing the state and the second machine learning component may be configured to instruct the action.

The first machine learning component may be an autoencoder. The second machine learning component may be a DRL agent. The DRL agent may be configured to process a specific type of data. The autoencoder may be configured to modify the data received by padding the data received in an event data is missing from the data received. The autoencoder may be further configured to decrease dimensionality of the data received, or decrease dimensionality of the data received and modified, to produce a reduced data set of the specific type of data. The autoencoder may be further configured to encode the reduced data set to produce the representation describing the state of the RAN.

The representation describing the state may be produced in a coded form discernible by the second machine learning component. The first machine learning component may include at least one neural network. A given neural network of the at least one neural network may be configured to decrease dimensionality of the data received to produce a reduced data set. The given neural network may be further configured to encode the reduced data set to produce the coded form.

The second learning component may be a DRL agent that includes an actor neural network and a value neural network. The actor neural network may be configured to take actions. The value neural network may be configured to score the actions taken by the actor network. The action instructed may be among the actions taken by the actor neural network.

The data-driven logic unit may include a plurality of machine learning components trained offline using synthetic data. The synthetic data may be obtained via emulation of a wireless network. The plurality of machine learning components may be further trained, in real-time, based on the data received from the RAN. The emulation may be based on different channels and network conditions.

The action instructed may be configured to control, for non-limiting example, at the at least one network element, slicing of resources, selection of a scheduling policy, load balancing, transmission power or policy, or a combination thereof. The data-driven logic unit may include an autoencoder and a DRL agent. The autoencoder may be configured to produce the representation describing the state. The RIC may further comprise at least one neural network or other type of machine learning component configured to produce a prediction or classification based on the representation. The DRL agent may be further configured to instruct the action based on the prediction produced, classification produced, or combination thereof. The classification may be associated with traffic and the prediction may associated with a load for non-limiting example.

According to another example embodiment, a computer-implemented method may comprise interfacing (transmitting/receiving messages), by a radio access network (RAN) intelligent controller (RIC), with a RAN. The computer-implemented method may further comprise producing, by the RIC, based on data received from the O-RAN via the interfacing, a representation describing a state of the O-RAN. The computer-implemented method may further comprise, based on the representation describing the state, instructing an action associated with at least one network element. The interfacing includes transmitting, by the RIC, a message based on the action instructed, the message to be routed to the at least one network element. The representation describing the state is based on a context of the O-RAN. The message transmitted enables re-configuration of the at least one network element. The re-configuration improves performance of the at least one network element within the context.

Further alternative method embodiments parallel those described above in connection with the example RIC embodiment.

It should be understood that example embodiments disclosed herein can be implemented in the form of a method, apparatus, system, or computer readable medium with program codes embodied thereon.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 9A-C are maps of example embodiments of large-scale 5G cellular scenario maps.

FIGS. 10A-F are graphs of example embodiments of downlink (DL) and uplink (UL) throughput in a Rome static scenario.

FIG. 18 is a block diagram of an example embodiment of an optimization use case.

FIGS. 19A and 19B are graphs of an example embodiment of an optimization use case for different classes of traffic.

FIG. 20 is graph of an example embodiment of results for SCOPE first prototyped on Colosseum, and then ported to the Arena testbed and POWDER platform.

FIG. 21A is block diagram of a black box architecture of a closed, non-programmable RAN.

FIG. 21B is a block diagram of an example embodiment of an open, programmable Radio Access Network (RAN) architecture.

FIG. 28 is a block diagram of an example embodiment of integration of the O-RAN infrastructure in Colosseum.

FIG. 29A is a table of an example embodiment of a catalogue of developed xApps.

FIGS. 30A-D are graphs of an example embodiment of correlation analysis for the eMBB slice with 36 PRBs and the slice-based traffic profile.

FIGS. 31A and 31B are graphs of an example embodiment of correlation analysis for the URLLC slice with 11 PRBs and the slice-based traffic profile.

FIGS. 32A-C are graphs of an example embodiment of a comparison between the sched and sched-slicing xApps, with the slice-based traffic profile.

FIGS. 33A-D are graphs of an example embodiment of a comparison between the different models of the sched-slicing xApp and baselines without DRL-based adaptation.

FIG. 36 is a graph of an example embodiment of CDF of the throughput for the eMBB slice during the online training (OT) and with the trained agent (TR) with the uniform traffic profile.

FIG. 37 is a graph of an example embodiment of an eMBB slice throughput during training and with the trained model.

FIGS. 38A and 38B are graphs of an example embodiment of throughput comparison between the offline- and online-trained models with two source traffic patterns.

DETAILED DESCRIPTION

A description of example embodiments follows.

Open radio access network (RAN) is a term for industry-wide standards for RAN interfaces that support interoperation between vendors' equipment. Open RAN (O-RAN) is not inherently open source. The O-RAN standards aim, instead, to undo the nature of the RAN market, where a handful of RAN vendors only offer equipment and software that is totally proprietary. The two most influential organizations working on O-RAN standards are the Telecom Infra Project (TIP) and the O-RAN Alliance.

TIP has its O-RAN standard that is based on the tenets of disaggregation of hardware and software, open interfaces, and flexibility. One of its main goals is to create a programmable, virtualized RAN architecture based on general-purpose processing platforms. The O-RAN Alliance's work is based on the core principles of openness and intelligence. Openness allows smaller players in the RAN market to launch their own services or customize their networks. The Alliance's solution to growing network complexity and demand is to embrace automation, artificial intelligence (AI), and machine learning to deploy, optimize, and operate the network.

As disclosed above, a radio access network (RAN) intelligent controller (RIC) is a useful piece of the O-RAN disaggregation strategy, bringing multivendor interoperability, intelligence, agility, and programmability to radio access networks (RANs). An example embodiment of RIC is disclosed below, with regard to FIG. 1.

Figure 1:
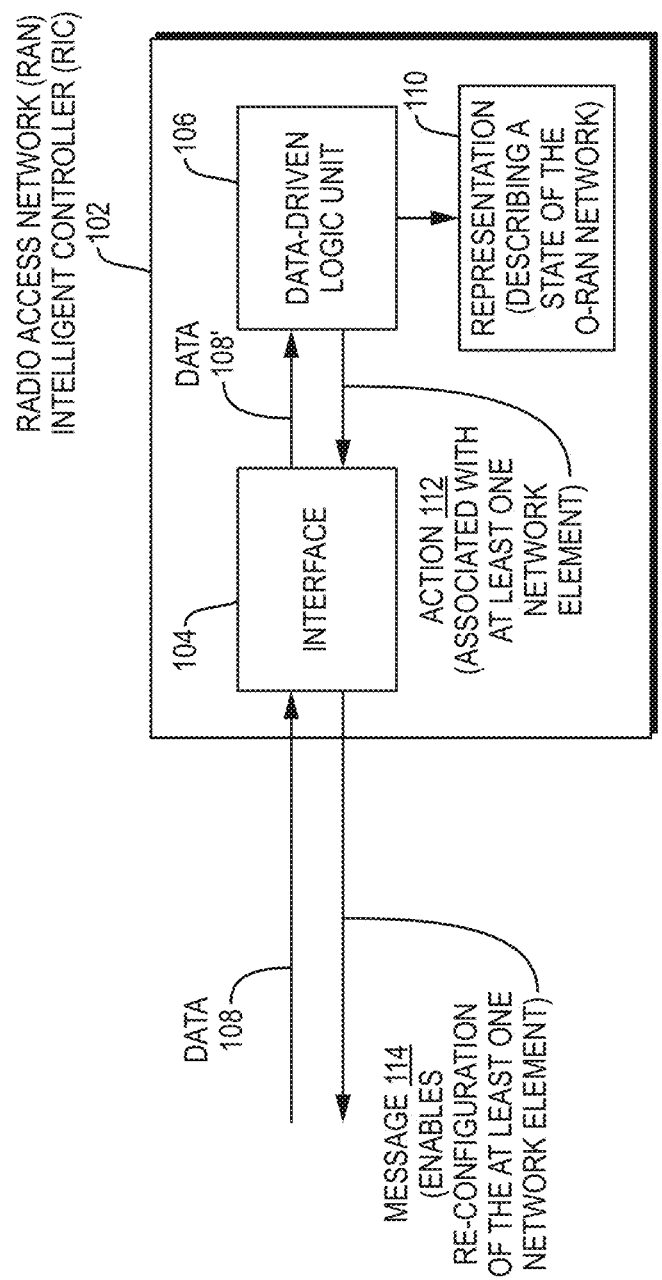
FIG. 1 is a block diagram of an example embodiment of a radio access network (RAN) intelligent controller (RIC).

FIG. 1 is a block diagram of an example embodiment of a radio access network (RAN) intelligent controller (RIC) 102. The RIC 102 comprises an interface 104 to a RAN (not shown) and further comprises a data-driven logic unit 106. For non-limiting example, the interface 104 may be an intermediate interface that is interposed between at least one other interface (not shown) and the data-driven logic unit 106, such as the interface 204 disclosed further below with regard to FIG. 2. Continuing with reference to FIG. 1, the interface 104 and the at least one other interface may, in combination, enable the RIC 102 to interface with the RAN. For non-limiting example, the at least one other interface may include an O-RAN E2 interface (not shown) that communicatively couples the interface 104 with the RAN. The RAN may be deployed following the open RAN architecture. The data-driven logic unit 106 is configured to (i) produce, based on data 108' received from the RAN via the interface 104, a representation 110 describing a state of the RAN and (ii) based on the representation 110 describing the state, instruct an action 112 associated with at least one network element (not shown). The interface 104 may produce the data 108' by transforming the data 108 received from the RAN. Such transformation may be implemented via Abstract Syntax Notation One (ASN. 1) decoding, for non-limited example. The interface 104 is configured to transmit a message 114 based on the action 112 instructed, the message 114 to be routed to the at least one network element. The representation 110 describing the state is based on a context of the RAN. The message 114 that is transmitted enables re-configuration of the at least one network element. The re-configuration improves performance of the at least one network element within the context.

The RIC 102 may be a near-real-time RIC. The at least one network element may be a base station, a central unit (CU) of a base station, a distributed unit (DU) of a base station, a radio unit (RU) of a base station, another network, other network element, or a combination thereof.

The context may include a geographical area, frequency of operation, or other condition of the RAN. The action 112 instructed may include at least one instruction to alter at least one parameter of the at least one network element. The data 108' received may include at least one key performance metric (KPM) (not shown) or key performance indicator (KPI) (not shown). For non-limiting example, the at least one KPM or KPI may be associated with throughput, service latency, quality of service (QoS), signal-to-noise ratio, telemetry, or a combination thereof. The data-driven logic unit 106 may include an autoencoder and a deep reinforcement learning (DRL) agent, as disclosed below with regard to FIG. 2.

Figure 2:
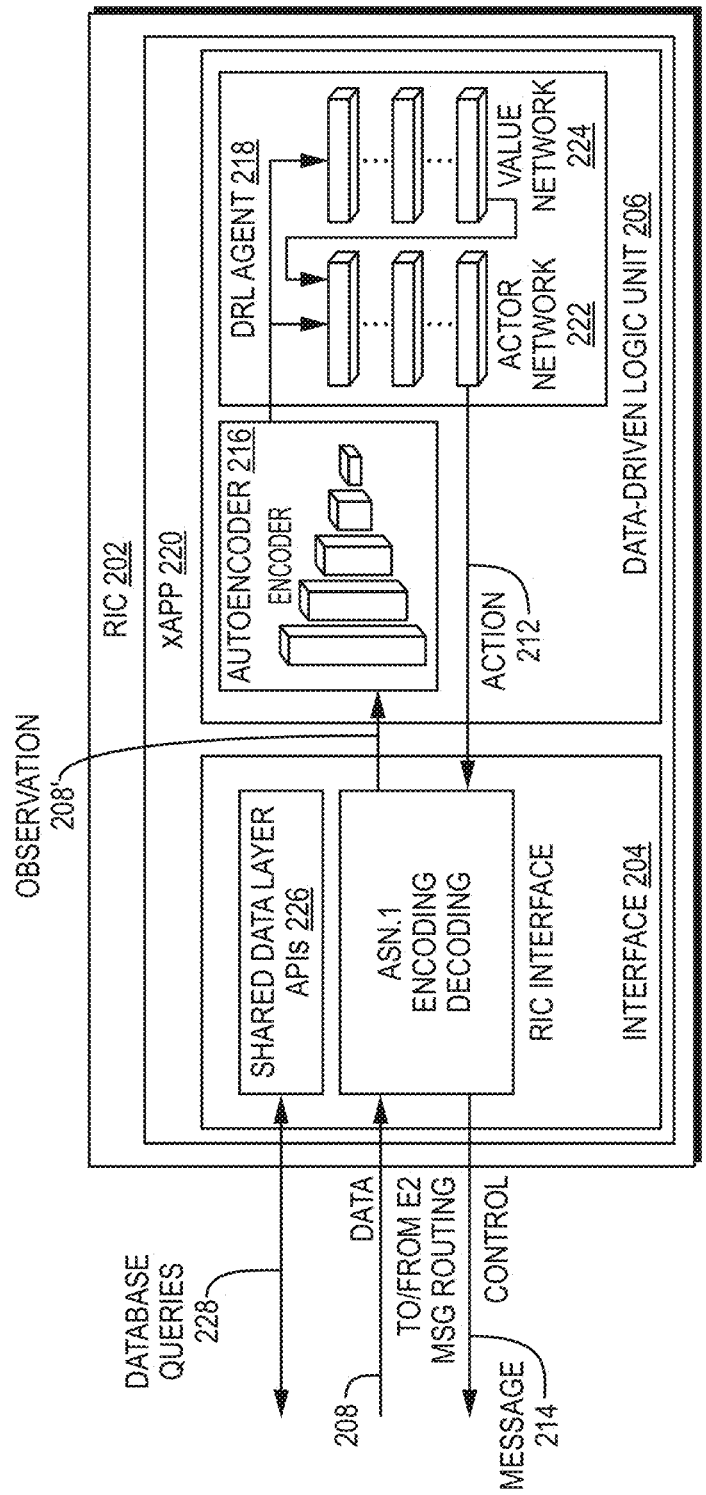
FIG. 2 is a block diagram of another example embodiment of a RIC.

FIG. 2 is a block diagram of another example embodiment of a RIC 202. The RIC 202 may be employed as the RIC 102 of FIG. 1, disclosed above. The RIC 102 comprises an interface 204 to a RAN (not shown) and a data-driven logic unit 206. It should be understood that the interface 204, also referred to interchangeably herein as a RIC interface, is not coupled to the RAN, directly. The interface 204 may be interposed between at least one other interface (not shown) and the data-driven logic unit 206. The interface 204 and the at least one other interface may, in combination, enable the RIC 202 to interface with the RAN. For non-limiting example, the at least one other interface may include an O-RAN E2 interface (not shown) that communicatively couples the interface 204 with the RAN. The data-driven logic unit 206 is configured to produce, based on data 208' received from the RAN via the interface 204, a representation, such as the representation 110, disclosed above, that describes a state of the RAN. The data 208' may also be referred to interchangeably herein as an observation.

The data-driven logic unit 206 is further configured to, based on the representation describing the state, instruct an action 212 associated with at least one network element (not shown). The interface 204 may produce the data 208' by transforming the data 208 received from the RAN, as disclosed above. The interface 204 is configured to transmit a message 214 based on the action 212 instructed. The message 214 is to be routed to the at least one network element. The representation is based on a context of the RAN. The message 214 that is transmitted enables re-configuration of the at least one network element. The re-configuration improves performance of the at least one network element within the context.

In the example embodiment of FIG. 2, the data-driven logic unit 206 includes an autoencoder 216 and a deep reinforcement learning (DRL) agent 218. The autoencoder 216 may be configured to produce the representation describing the state. The DRL agent 218 may be configured to instruct the action 212. The data-driven logic unit 206 may be pre-trained, offline, and the data-driven logic unit 206 may be capable of being trained, in real-time, based on the data received. As disclosed in the example embodiment of FIG. 2, the data-driven logic unit 206 is included in the xApp 220. The xApp 220 is a composite application deployed on the RIC 202.

The autoencoder 216 may be referred to interchangeably herein as a first machine learning component. The DRL agent 218 may be referred to interchangeably herein as a second machine learning component. The DRL agent 218 may be configured to process a specific type of data of the data 208'. The autoencoder 216 may be configured to modify the data 208' by padding the data 208' received in an event data is missing from the data 208' received. The autoencoder may be further configured to decrease dimensionality of the data 208' received, or decrease dimensionality of the data 208' received and modified, to produce a reduced data set (not shown) of the specific type of data for the DRL agent 218. The autoencoder 216 may be further configured to encode the reduced data set to produce the representation describing the state of the RAN.

The representation describing the state may be produced in a coded form discernible by the second machine learning component, that is, the DRL agent 218. The first machine learning component, that is, the autoencoder 216, may include at least one neural network (not shown). A given neural network (not shown) of the at least one neural network may be configured to decrease dimensionality of the data 208' received to produce the reduced data set. The given neural network may be further configured to encode the reduced data set to produce the coded form.

The second learning component, that is, the DRL agent 218, includes an actor neural network 222 and a value neural network 224. The actor neural network 222 may be configured to take actions. The value neural network 224 may be configured to score the actions taken by the actor network 222. The action 212 instructed may be among the actions taken by the actor neural network 222.

The data-driven logic unit 206 may include a plurality of machine learning components trained offline using synthetic data (not shown). The synthetic data may be obtained via emulation of a wireless network (not shown). The plurality of machine learning components may be further trained, in real-time, based on the data 208 received from the RAN. The emulation may be based on different channels and network conditions associated, for non-limiting example, with operating an urban environment (not shown), rural environment (not shown), or other kind of environment.

The action 212 instructed may be configured to control, for non-limiting example, at the at least one network element, slicing of resources, selection of a scheduling policy, load balancing, transmission power or policy, or a combination thereof. The autoencoder 216 may be configured to produce the representation describing the state. The RIC 202 may further comprise at least one neural network (not shown) or other type of machine learning component configured to produce a prediction or classification based on the representation. The DRL agent 218 may be further configured to instruct the action 218 based on the prediction produced, classification produced, or combination thereof. The classification may be associated with traffic and the prediction may associated with a load for non-limiting example.

According to an example embodiment, the interface 204 may include shared data layer APIs 226. Such APIs may be employed to perform database queries 228 to query a database (not shown) for parameters associated with the at least one network element for non-limiting example. Such database queries 228 may, for non-limiting example, be employed to identify a base station being controlled by the RIC 202 and a performance metric associated with the base station, for non-limiting example.

According to an example embodiment, the xApp 220 may be a first xApp of a plurality of xApps, as disclosed below with regard to FIG. 3.

Figure 3:
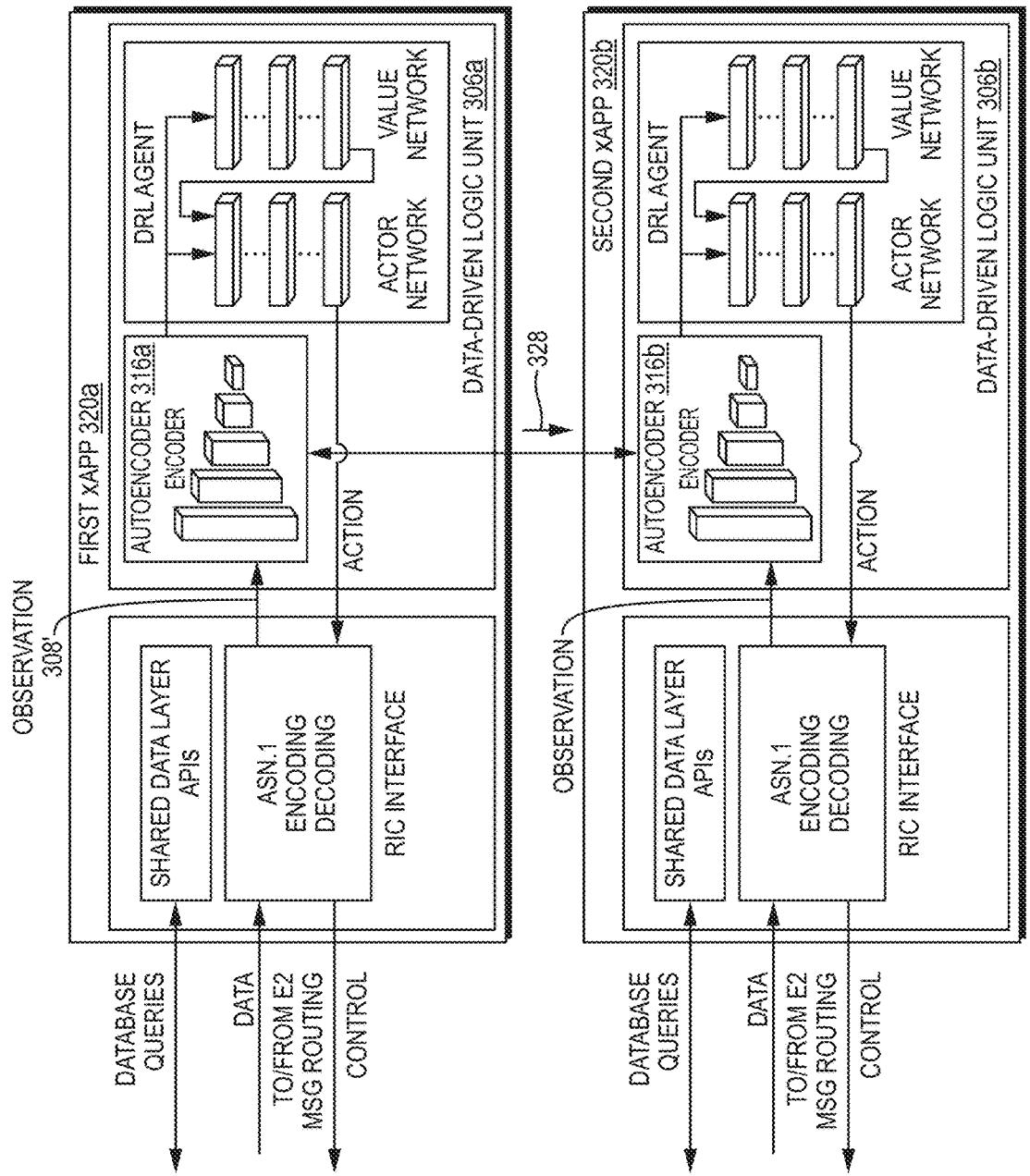
FIG. 3 is a block diagram of an example embodiment of a first xApp and a second xApp.

FIG. 3 is a block diagram of an example embodiment of a first xApp 320a and a second xApp 320b. With reference to FIG. 2 and FIG. 3, the first xApp 320a may be employed as the xApp 220 of the RIC 202. The second xApp 320b may be deployed on the RIC 202 or on another controller (not shown). The first xApp 320a and second xApp 320b may include first and second respective instances of at least one shared layer (not shown), respectively. The first xApp 320a may be configured to produce a newly trained version 328 of the at least one shared layer by training the first respective instance of the at least one shared layer based on the data 308' received. The first xApp 320a may be further configured to communicate the newly trained version 328 produced to the second xApp 320b, causing the second xApp 320b to, in turn, update the second respective instance of the at least one shared layer to the newly trained version 328.

Respective data-driven logic units (306a, 306b) of the first and second xApps (320a, 320b) may include respective autoencoders (316a, 316b). The first and second respective instances of the at least one shared layer may be included in the respective autoencoders (316a, 316b) of the first and second xApps (320a, 320b), respectively. The at least one shared layer may be associated, for non-limiting example, with a network slicing policy, transmission power or policy, scheduling policy, or other control action. With reference back to FIG. 2, the RIC 202 may be configured to perform a computer-implemented method, such as disclosed below with regard to FIG. 4.

Figure 4:
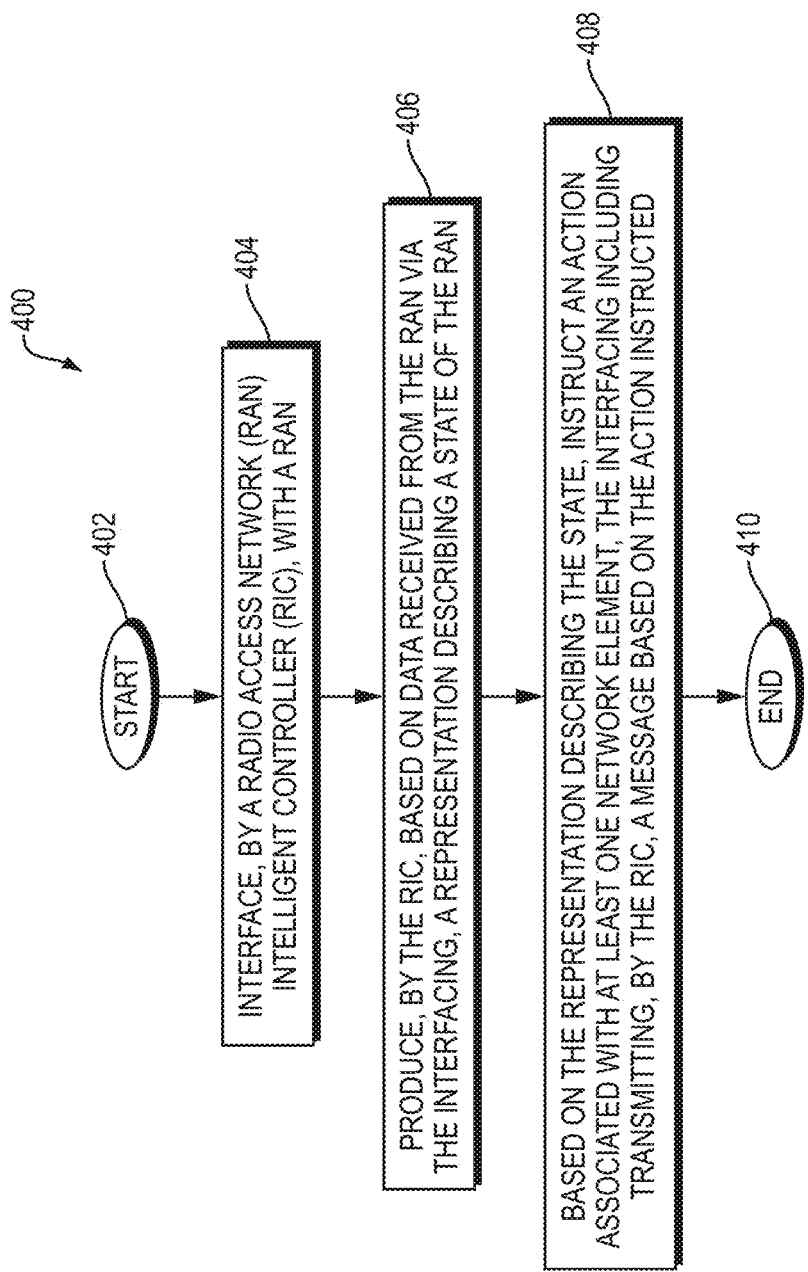
FIG. 4 is a flow diagram of an example embodiment of a computer-implemented method.

FIG. 4 is a flow diagram 400 of an example embodiment of a computer-implemented method. The computer-implemented method begins (402) and comprises interfacing (transmitting/receiving), by a radio access network (RAN) intelligent controller (RIC), with a RAN (404). The computer-implemented method further comprises producing, by the RIC, based on data received from the RAN via the interfacing, a representation describing a state of the RAN (406). The computer-implemented method further comprises, based on the representation describing the state, instructing an action associated with at least one network element, the interfacing including transmitting, by the RIC, a message based on the action instructed, the message to be routed to the at least one network element (408). The representation describing the state is based on a context of the RAN. The message transmitted enables re-configuration of the at least one network element. The re-configuration improves performance of the at least one network element within the context. The computer-implemented method thereafter ends (410) in the example embodiment.

Additional details and example embodiments are disclosed below.

Disclosed herein is an example embodiment of an open Radio Access Network (O-RAN) data-driven closed-control loop in a large scale experimental testbed using open source, programmable Radio Access Network (RAN) and RAN Intelligent Controller (RIC) components. This involves a Deep Reinforcement Learning (DRL) agent running as a RIC xApp. The DRL agent is able to dynamically select the optimal configuration of the base stations of the network, and of the network slices instantiated on them (e.g., slices configuration and scheduling policy to execute at each slice) based on the performance metrics sent by the base stations at run-time. Communication between O-RAN and the base stations controlled by it happens through the O-RAN E2 interface. Further, an example embodiment of a pipeline to deploy artificial intelligence and machine learning algorithms on 5G cellular containers is disclosed. The pipeline enables the training, testing and validation of such models through open API calls. Some of the functionalities that it are possible to control and optimize through data-driven approaches include, for non-limiting example, network slicing policies, scheduling policies (for each slice or for the network as a whole), and per-user transmission strategies. The developed pipeline also includes data collection tools, such as dataset generation functions for recording cellular performance and metrics, and facilitate data analytics and dataset creation.

Through the O-RAN E2 interface, an example embodiment of a DRL agent running on a RIC xApp is fed with real-time performance measurements related to the network slices instantiated on the base stations of the network controlled by O-RAN. According to an example embodiment, data goes through an autoencoder for dimensionality reduction, the output is then used by the agent that identifies the state of the system and uses a fully connected neural network to determine the best scheduling policy for the corresponding slice together with the configuration of the slice. The reward of the agent depends on the specific slice and the corresponding Key Performance Indicators (KPI) requirements. After computing the optimal strategies, these are sent through the O-RAN E2 interface to each base station, which implements them to improve the performance of the network. Further, an example embodiment of a pipeline to deploy artificial intelligence and machine learning algorithms on 5G cellular containers is disclosed. The pipeline enables the training, testing, and validation of such models through open APIs calls. Some of the functionalities that are possible to control and optimize through data-driven approaches include, for non-limiting example, network slicing policies, scheduling policies (for each slice or for the network as a whole) and per-user transmission strategies. The developed pipeline also includes data collection tools, such as dataset generation functions for recording cellular performance and metrics, and facilitate data analytics and dataset creation.

An example embodiment provides automated network control through a DRL agent running in the form of RIC xApps within the O-RAN framework. An example embodiment optimally selects configurations for each network slice instantiated on the network base stations based on performance metrics sent by the base stations. An example embodiment communicates the found optimal configurations to the base stations controlled by O-RAN through the O-RAN E2 interface.

An example embodiment disclosed herein as prototyped on the Colosseum testbed using the open source components offered by O-RAN RIC and srsLTE base stations is disclosed and enables seamless communication between xApp, O-RAN RIC components, and source base stations. According to the example embodiment, the O-RAN RIC and srsLTE base station communicate through the O-RAN E2 interface.

An example embodiment provides pipelines for the deployment of machine learning and artificial intelligence methods on 5G containers, automatic collection of run-time performance metrics relative to the cellular network, and facilitates data analytics and dataset creation.

Example Advantages

The traditional approach for cellular networks involved a rigid separation among the different entities that contributed to the network deployment, i.e., telecom vendors, operators, and chipset manufacturers. The performance optimization was mostly implemented by vendors during the equipment design process. As a result, the final appliances sold to operators (e.g., core network elements, or base stations) merely included a finite set of possible configurations, leaving the operators with little to no room for controlling the network, and limited decision capabilities mostly circumscribed to deployment choices and network coverage. Such a closed and inflexible approach prevents agile control of the network, often results in sub-optimal performance and, most importantly, severely hinders the deployment of data-driven solutions. Indeed, the latter require large amounts of data, need coordination from multiple Radio Access Network (RAN) components, and mandate programmability of each network element, so that control policies computed by Artificial Intelligence (AI) and Machine Learning (ML) methods can be effectively enforced in real-time.

Further disclosed herein is an O-RAN data-driven closed-control loop in a large scale experimental testbed using open source, programmable Radio Access Network (RAN) and RAN Intelligent Controller (RIC) components. This involves a Deep Reinforcement Learning (DRL) agent running as a RIC xApp. The DRL agent is able to dynamically select the optimal configuration of the base stations of the network, and of the network slices instantiated on them (e.g., slices configuration and scheduling policy to execute at each slice) based on the performance metrics sent by the base stations at run-time. Communication between O-RAN and the base stations controlled by it happens through the E2 interface.

Disclosed herein are pipelines developed for the deployment of machine learning and artificial intelligence methods on 5G containers, and automatic collection of run-time performance metrics relative to the cellular network, facilitating data analytics and dataset creation. This is particularly useful for optimization/machine learning based on closed-control loops.

An example embodiment allows a RIC to dynamically and automatically adapt the operation of 5G and 6G cellular networks to the current network conditions and traffic environments and improve performance of cellular users.

Example Uses

The technology disclosed herein has a potential to be implemented within O-RAN and in next-generation cellular networks to significantly simplify network management and improve performance in general.

With this technology telecom operators can automatically optimize the performance of the base stations of the network, as a whole or for each network slice, based on the real-time traffic demands and Quality-of-Service (QoS) requirements.

The O-RAN market size is expected to significantly increase in the upcoming years. The O-RAN market size is expected to reach $69.5 billion in 2030 (https://tinyurl.com/y2rpuhul). Recently the U.S. House unanimously passed a $750 million bill to fund and support the evolution of Open RAN 5G systems (https://tinyurl.com/y53sdpsz) which are a focus of this disclosure.

Example Applications

An example embodiment provides control and optimization of 5G and 6G cellular networks. An example embodiment cooperatively managing cellular networks in a multi-operator fashion. An example embodiment provides an automated solution to reduce manual intervention and, thus, reduces maintenance and operating expenditure, as disclosed further below.

SCOPE: Open and Softwarized Prototyping for 5G Experimental Research

Network softwarization will be the cornerstone of upcoming generations of cellular networks, 5G and beyond. Despite recent progress and products, however, deployment and use of softwarized 5G networks is still lagging behind. One reason is the lack of experimental platforms and testbeds where new solutions can be reliably prototyped and rigorously validated before deployment on commercial hardware. An example embodiment disclosed herein is introduced and referred to as "SCOPE," an open and softwarized prototyping environment for future cellular networks. The softwarized cellular open prototyping environment (i.e., SCOPE) is made up of two main components: (i) A ready-to-use, portable open source container for instantiating softwarized and programmable cellular networks, and (ii) a set of APIs to control and reprogram key functionalities of the cellular protocol stack in real-time, without having to redeploy the network. SCOPE features tools that facilitate data analytics, including dataset generation functions to record run-time network performance for training machine learning algorithms, or implementing real-time optimization methods. An example embodiment demonstrates the versatility and platform-independence of SCOPE by integrating it into Colosseum—the world's largest wireless network emulator—and porting it to real-world testbeds, such as the outdoor POWDER platform from the PAWR program, and the indoor testbed Arena. Researchers can use SCOPE on Colosseum to test and validate their solutions over a variety of 5G scenarios of an example design disclosed herein. These include large-scale real-world cellular deployments with diverse topology, mobility patterns, channel characteristics and traffic profiles. Disclosed herein is a showcase of SCOPE containers for practical proto-typing of machine learning and optimization algorithms on real-world outdoor and indoor testbeds.

1 Introduction

The stringent data-rate and latency requirements of applications for new 5th generation (5G) systems has recently pushed Telco Operators (TOs) to drastically redefine the structure of cellular networks (D. Brake. 2020. "A U.S. National Strategy for 5G and Future Wire-less Innovation," https://itif.org/publications/2020/04/27/us-national-strategy-5g-and-future-wireless-innovation, Brown. 2020. "TIP OpenRAN: Toward Disaggregated Mobile Networking," https://cdn.brandfolder.io/D8DI15S7/as/qc19tk-54bsw-305pae/TIP_OpenRAN_-Heavy_Reading_May_2020-_White_Paper.pdf., S. Marek. 2020. 5G's Future Includes a Cloud-native Architecture Complete with Containers. https://www.lightreading.com/cloud-native-nfv/5gs-future-includes-a-cloud-native-architecture-complete-with-containers/d/d-id/762116, M. Robuck. 2020. "AT&T on Target for Virtualizing 75% of its Net-work by 2020," https://www.fiercetelecom.com/telecom/at-t-target-for-virtualizing-75-its-network-by-2020. The Status of Open Source for 5G. 2019. 5G Americas Whitepaper. https://www.5gamericas.org/wp-content/uploads/2019/07/5G_Americas_White_Paper_The_Status_of_Open_Source_for_5G_Feb_2019.pdf). A number of consortia, including the O-RAN Alliance and the Linux Foundation, have been promoting and developing solutions grounded on openness and softwarization principles. The aim is that of breaking the imposed vendor lock-in, urging equipment manufacturers to produce open, "white-box" hardware that can be programmed and reconfigured in real-time, and seamlessly integrated with multi-vendor components via open—yet standardized—software interfaces (L. Hardesty. 2020. "Altiostar Joins Mavenir to Develop Open RAN Radios for U.S. Carriers," https://www.fiercewireless.com/wireless/altiostar-joins-mavenir-to-develop-open-ran-radios-for-u-s-carriers, D. Vallis. 2020. "5G Breaks from Proprietary Systems, Embraces Open Source RANs," https://www.5gtechnologyworld.com/5g-breaks-from-proprietary-systems-embraces-open-source-rans)

The core of this pivotal transformation from traditional in-flexible architectures to white-box programmable solutions stands on the ability to control all components of the cellular network via software, also known as cellular network softwarization (Hewlett Packard Enterprise. 2020. "HPE Speeds Up 5G Adoption with Cloud Native 5G Core Software Stack," Available as-a-Service. https://www.hpe.com/us/en/newsroom/press-release/2020/03/hpe-speeds-up-5g-adoption-with-cloud-native-5g-core-software-stack-available-as-a-service.html, O-RAN Alliance Conducts First Global Plugfest to Foster Adoption of Open and Interoperable 5G Radio Access Networks. 2019. https://static1.squarespace.com/static/5ad774cce74940d7115044b0/t/5dfba8fb1326ae1bcf4a8b6f/1576773884092/0-RAN-2019.12.19-EC-C-PR-on-2019-Plugfest-v1.0.pdf, Rakuten. 2020. How Elegant Software Can Make 5G Networks More Resilient. https://rakuten.today/blog/5g-network-reliability-lightreading.html). This new paradigm enables TOs to: (i) Achieve swift control of the network and its functionalities by abstracting and orchestrating them as virtual network functions; (ii) implement differentiated service strategies through the deployment of network slices tailored to specific traffic classes and users, and (iii) design and deploy custom algorithms to optimize network behavior in real-time according to current network conditions and application requirements (e.g., traffic demand and quality of service).

Softwarization is being actively pursued by researchers from academia and industry alike. A tangible example is O-RAN, a framework developed by the O-RAN Alliance where softwarization is used to horizontally disaggregate and virtualize functionalities that were typically implemented in single "black-box" hardware components (O-RAN Alliance White Paper. 2018. O-RAN: Towards an Open and Smart RAN. https://www.o-ran.org/resources). Traditional Radio Access Network (RAN) functions are now abstracted and controlled via software and open interfaces, resulting in a modular and programmable design that offers unprecedented flexibility. For example, Base Stations (BSs) can be controlled by O-RAN RAN Intelligent Controller (RIC) and divided into separate units—i.e., 3rd Generation Partnership Project (3GPP) Central Unit (CU) and Distributed Unit (DU)—executing different RAN functionalities (3GPP. 2018. Study on CU-DU Lower Layer Split for NR. Technical Report (TR) 38.816. 3rd Generation Partnership Project (3GPP). http://www.3gpp.org/DynaReport/38816.htm Version 15.0.0).

Softwarization is also key to overcome the limitations that have beset the design and testing of cellular solutions, constraining them to proof-of-concepts in small laboratory setups, hard to implement on production-grade equipment. Nowadays, software such as srsLTE (I. Gomez-Miguelez, et al., 2016. "srsLTE: An Open-source Platform for LTE Evolution and Experimentation," In Proc. of ACM Intl. Workshop on Wireless Network Testbeds, Experimental evaluation & Characterization (WiNTECH). New York City, N.Y., USA) and OpenAirinterface (F. Kaltenberger, et al., 2020. "OpenAirInterface: Democratizing Innovation in the 5G Era. Computer Networks," 107284 (May 2020)) allows researchers to swiftly instantiate 4G- and 5G-compliant protocol stacks on inexpensive off-the-shelf Software-defined Radios (SDRs).

All these efforts have considerably sped-up the development and technological advancement of softwarized cellular networks. However, a number of limitations still need to be overcome. First of all, these software packages are often hard to setup as they require specific dependencies and dedicated operating systems. Furthermore, developing use cases beyond toy-examples is not straightforward, as most functionalities (e.g., scheduling and resource allocation) are baked in the source code. This makes it hard for average users to add new capabilities or to modify existing ones, even for relatively simple tasks such as implementing a new scheduler. Overall, despite providing the expert user with fine-grained control over network elements and functionalities, these software packages offer no provision for efficient and reliable testing and validation of newly developed algorithms and software components. To reach the production chain and to eventually be deployed, these algorithms and software components must be proven efficient, reliable and robust in a wide range of application scenarios, with diverse traffic demand, infrastructure deployments and Quality of Service (QoS) requirements. These testing procedures are paramount to ensure that unexpected behaviors do not jeopardize the performance, stability, and security of a production network.

In principle, TOs could test new software solutions either on portions of their network, or in smaller laboratory setups. As owners of the infrastructure, the former option might be the most obvious. However, it is neither trivial nor cost-effective as testing new solutions might induce undesirable network behavior and cause unforeseen outages that could result in Service Level Agreements (SLAs) violations and financial loss. On the other hand, tests performed in controlled lab setups can only capture a limited number of Radio Frequency (RF) scenarios and small-scale deployment configurations, which limits their effectiveness and extent. To facilitate testing at scale, in the last few years programs such as Platforms for Advanced Wireless Research (PAWR) by the U.S. National Science Foundation have been fostering the creation of large wireless testing sites ("Platforms for Advanced Wireless Research (PAWR)," 2020. https://www.advancedwireless.org). The PAWR platforms provide their users a controlled environment with uniform access to a relatively large set of hardware (e.g., SDRs) and software resources. This enables repeatable experiments at scale on realistic wireless networking scenarios. However, using these platforms for reliable design and prototyping of production-ready solutions might not be straightforward. For instance, the environment surrounding the SDRs can vary rapidly and unpredictably. As such, the same experiment run at different times might produce substantially different results, making it hard to ascertain if poor performance is caused by mediocre design or environmental impairments.

An example embodiment disclosed herein addresses the key issues of repeatable, at scale, experimental evaluation of solutions for future softwarized cellular networks by presenting a new portable, ready-to-use software environment called SCOPE (for Softwarized Cellular Open Prototyping Environment). SCOPE is a full-fledged experimental toolkit with unique features, disclosed below.

Open and Portable Implementation.

SCOPE provides an open source implementation of a 3GPP-compliant softwarized cellular BS. An example embodiment of the open BS is developed by significantly extending srsLTE. Specifically, an example embodiment adds key 5G functionalities such as RAN slicing, along with a set of open Application Programming Interfaces (APIs) to control the open BS via software at run-time. An example embodiment of the APIs includes functionalities to change scheduling, network slicing, and transmission parameters (e.g., Modulation and Coding Scheme (MCS) and power control) in real-time without the need to recompile and redeploy the BSs. Moreover, SCOPE includes a data collection module with dataset generation functions that record network performance at run-time and facilitate data analytics. To foster SCOPE utilization, an example embodiment is a ready-to-deploy Linux Containers (LXC) (Canonical. 2020. "Linux Containers (LXC)," https://linuxcontainers.org) instance of SCOPE that can be instantiated on LXC-enabled Linux machines. An example embodiment shows how SCOPE can be seamlessly ported and instantiated on substantially different experimental testbeds such as Colosseum (Colosseum. 2020. https://www.colosseum.net), POWDER ("Platform for Open Wireless Data-driven Experimental Research (POWDER)," 2020. https://www.powderwireless.net) and Arena (L. Bertizzolo, et al., 2020. "Arena: A 64-antenna SDR-based Ceiling Grid Testing Platform for Sub-6 GHz 5G-and-Beyond Radio Spectrum Research," submitted to Computer Networks (COMNET) (2020)).

Prototyping RF and Traffic Scenarios.

To facilitate prototyping of novel solutions for softwarized cellular networks, an example embodiment integrates SCOPE in Colosseum—the world's largest wireless network emulator—and includes a set of real-world RF and traffic scenarios that SCOPE users can use to test and validate their solutions. Colosseum is made up of 256 Universal Software Radio Peripheral (USRP) X310 SDRs (Ettus Research. 2020. "USRP," https://www.ettus.com/products), which can simultaneously emulate up to 65,536 100 MHz-RF channels. It also features accurate reproduction of propagation effects of the wireless channel in a variety of different conditions (e.g., mobility, fading) and network deployments (e.g., rural, urban, indoor), as if devices were operating in the real RF environment. An example embodiment is capable to generate and control traffic from the open BSs to mobile User Equipments (UEs), and vice versa. These features enable SCOPE users to specify the position of devices, the conditions of the wireless channel between each pair of devices, and traffic patterns.

Reproducibility and Repeatability.

Each scenario is executed in a deterministic way. This means that while channel coefficients and traffic change over time during an experiment, all experiments executed in the same scenario will experience the very same channel and traffic conditions. This way, an example embodiment of a system disclosed herein can be used to prototype and harden solutions by experimenting at scale in repeatable environments before testing them in the field.

Further details of SCOPE are disclosed in the following sections, organized as follows. Section 2 presents an overview of SCOPE experiments. The open RAN implementation of SCOPE, its capabilities and APIs are described in Section 3. The integration of SCOPE into Colosseum is presented in Section 4. A selection of RF and traffic scenarios developed for 5G cellular networks is presented in Section 5. Section 6 showcases possible use cases of SCOPE, including machine learning and optimization applications, and demonstrates SCOPE portability to different testbeds. Section 7 provides a survey of works and Section 8 presents future directions. Conclusions are drawn in Section 9.

2 SCOPE Experiments at a Glance

Figures 5A, 5B:
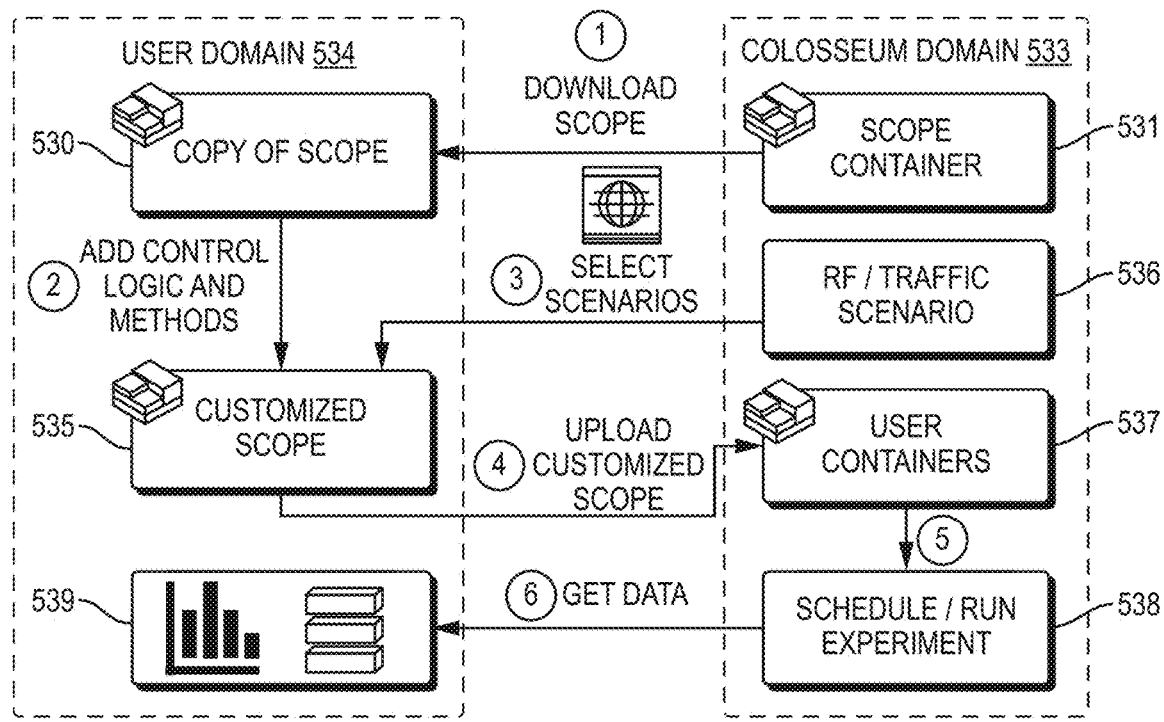
FIG. 5A is a block diagram of an example embodiment of a high-level lifetime of Softwarized Cellular Open Prototyping Environment (SCOPE) experiments.
FIG. 5B is a listing of an example embodiment of SCOPE APIs in use.

At a high-level, the lifetime of an experiment with SCOPE is illustrated in FIG. 5A, disclosed below.

FIG. 5A is a block diagram of an example embodiment of a high-level lifetime of SCOPE experiments. For the sake of completeness, a step-by-step summary of SCOPE utilization within Colosseum is provided for non-limiting example. It should be understood that SCOPE can be instantiated on any LXC-enabled testbed.

Users first download a copy 530 of the SCOPE container 532 (Section 3), which will be publicly available on Colosseum 533 (step 1 in FIG. 5A). Then, on their local machine (user domain 534 in the FIG. 5A), users add the desired control logic and methods to the container by leveraging SCOPE APIs, which enable to control of key functionalities of the softwarized BS at run-time (Section 3.3). This way, a "customized" instance 535 of SCOPE is created (step 2 in FIG. 5A). Then, users can select 5G RF and traffic scenarios to run in their experiment (Section 5) from the set of available Colosseum scenarios, visible through a dedicated web Graphical User Interface (GUI) (step 3 in FIG. 5A). Upon selecting the desired scenario configuration 536 (e.g., network topology, mobility, traffic demand), researchers upload their customized SCOPE container 535 (i.e., SCOPE with the user-defined control logic) to the user container 537 on Colosseum 533 (step 4). Then (step 5 in FIG. 5A), they can schedule 538 an experiment (through the web GUI) specifying how many nodes should be instantiated.

Each node, in Colosseum denoted as Standard Radio Node (SRN), includes a GPU-enabled server connected to one USRP X310. SRNs are fully programmable and serve as virtualized environments running LXC. This makes it possible to operate any SRN as either compute-only node (e.g., CUs, RIC) or compute-and-transmit (e.g., UEs, BSs, DUs/ radio units). This is as easy as issuing different commands (e.g., for BS or UE) to the container running on different SRNs.

As soon as the above configuration is completed, Colosseum deploys the containers on the selected SRNs, thus starting the experiment. During the experiment, SCOPE runs the BSs and UEs in the selected scenario, as well as the user control logic and methods. Network run-time metrics are saved in CSV format in the metrics and performance dataset. Users can either interface at run-time with the generated dataset (e.g., using it as a feedback loop) or download the dataset 539 at the end of the experiment to refine their control logic (step 6 in FIG. 5A).

3 SCOPE: A Ready-to-Use Softwarized 5G Container

SCOPE was designed to facilitate the development of innovative and adaptive solutions for next-generation softwarized and open 5G systems. SCOPE, which has been realized in the form of an LXC container, is a flexible and ready-to-use prototyping toolkit that allows users to effortlessly instantiate platform-independent and softwarized cellular networks.

The main components of the SCOPE container are: (i) A softwarized cellular protocol stack of BSs, UEs and core network; (ii) a data collection module for artificial intelligence and machine learning applications, and (iii) a set of open APIs that allow users to interface with, and control, the two previous components in real-time.

Users can instantiate SCOPE on any LXC-enabled Linux system (e.g., Colosseum, POWDER and Arena, as disclosed further below in Sections 4 and 6.3) to control the network BSs and their configuration in real-time with a few lines of code thanks to a set of developed high-level open APIs (Section 3.3). Indeed, such APIs make it possible to control key functionalities of the cellular protocol stack at run-time, something that would usually require recompilation of the source code and redeployment of the BSs. Moreover, such APIs allow to interface with the data collection module to get a feedback loop on the network behavior in real time.

3.1 Softwarized Protocol Stack

Softwarized BSs, UEs, and core network, are based on the open source LTE implementation offered by srsLTE (which began transitioning toward 5G NR compatibility in the latest releases) (I. Gomez-Miguelez, et al., 2016. "srsLTE: An Open-source Platform for LTE Evolution and Experimentation," In Proc. of ACM Intl. Workshop on-Wireless Network Testbeds, Experimental evaluation & Characterization (WiNTECH). New York City, N.Y., USA). BS and HE applications can be interfaced with SDRs (e.g., NI USRPs, Lime Microsystems LimeSDR (Lime Microsystems. 2020. "LimeSDR," https://limemicro.com/products/boards/) and Nuand bladeRF (Nuand. 2020. "bladeRF," https://www.nu-and.com)), which are used as RF front-ends.

An example embodiment extends srsLTE, considerably, by adding new functionalities not offered in its standard implementation. These include network slicing capabilities, additional Medium Access Control (MAC)-layer scheduling policies, and the ability to fine-tune Physical (PHY)-layer parameters at run-time. The most relevant functionalities introduced by SCOPE are described in the remainder of this section.

Network Slicing. An example embodiment adds network slicing capabilities to srsLTE BSs. The developed network slicing implementation supports the coexistence of multiple slices tailored to specific traffic classes and UEs on the same shared infrastructure. An example embodiment of the implementation makes it possible to slice spectrum resources available at each BS and to dictate the resource allocation for each slice of the network. In SCOPE, this is achieved by specifying how many downlink Resource Block Groups (RBGs) (and, thus, Physical Resource Blocks (PRBs)) are allocated to each slice. To facilitate the setup and instantiation of network slices, SCOPE APIs enable users to specify the association among UEs and slices according to QoS requirements. Moreover, they also allow to assign different scheduling policies to each slice, and to modify them at run-time. This feature enables researchers to define slice-specific control strategies, which is extremely useful to evaluate how specific resource allocations affect different slices and the services they provide.

MAC-layer Scheduling. By default, srsLTE implements a round-robin scheduling method. This strongly limits the degrees of freedom researchers can vary in their experiments. An example embodiment disclosed herein extends srsLTE by implementing two additional, and fairer, MAC-layer scheduling methods in SCOPE: Water-filling and proportional scheduling. The scheduling policy can be specified and reconfigured at run-time for either the whole network, or on a per-slice basis through SCOPE APIs.

By combining scheduling and slicing capabilities, users can control the performance of each UE and the experienced QoS levels. This effectively captures the case of TOs offering different SLAs and subscription levels to UEs. Finally, since SCOPE code will be open source, users will be able to implement additional scheduling methods.

PHY-layer Capabilities. At the PHY layer, an example embodiment adds the capability to fine-tune per-user downlink power and MCS (both in uplink and downlink). The former is obtained by selecting the percentage of the maximum transmission power that shall be assigned to downlink signals for the selected UEs. The latter is an integer number in the range [0,28] that can be used to change modulation scheme and coding rates of downlink and uplink transmissions on a per-user basis. The relationship between MCS index, modulations and coding rate is defined by Tables 7.1.7.1-1, 7.1.7.1-1A and Table 8.6.1-1 in: 3GPP. 2020. "Evolved Universal Terrestrial Radio Access (E-UTRA); Physical layer procedures," Technical Specification (TS) 36.213. 3rd Generation Partnership Project (3GPP). http://www.3gpp.org/DynaReport/36213.htm Version 16.2.0.

3.2 Data Collection Module

Machine learning is rapidly reshaping the way users design and operate cellular networks. Unfortunately, one of the issues that has plagued the research community for years is the almost complete lack of large-scale datasets to train machine learning models. Indeed, TOs are usually not willing to provide real data to the research community due to business and privacy concerns, thus, substantially slowing down the research in this field. Only recently, the release of open source implementations for cellular networks has enabled the research community to generate their own datasets. However, this is not an easy task as testbeds are usually small-scale and can only capture the network behavior in limited conditions and setups. This makes it hard to train models that can generalize across diverse network deployments and conditions. SCOPE aims at solving this issue by including a data collection module that enables users to create large-scale datasets over a wide number of realistic RF and traffic scenarios.

An example embodiment extends srsLTE basic report functionalities to log detailed statistics on the performance of each UE. These metrics (e.g., throughput, MCS, buffer size, slice PRBs, etc.) are extracted at the BS-side every 250 ms and stored in a CSV-formatted dataset. This allows, for instance, user-generated optimization and machine learning algorithm to interface with this dataset through SCOPE APIs to implement closed-loop optimization routines (Section 3.3).

3.3 Open APIs

An example embodiment of SCOPE APIs developed and written in Python are shown in Table 1. They allow SCOPE users to reconfigure at run-time network slicing, scheduling and PHY-layer parameters (Section 3.1), and to interact with the metrics and performance dataset (Section 3.2).

TABLE 1

SCOPE Python APIs.

| Function | Description |
|---|---|
| enable_slicing | Enables/disables network slicing globally |
| set_slice_users | Set UE-slice associations |
| get_slice_users | Get UE-slice associations |
| set_slice_resources | Sets resources allocated to the slice |
| set_slice_scheduling | Sets slice scheduling policy |
| set_slice | Sets slice scheduling and/or resources |
| set_scheduling | Sets global scheduling of the BS |
| set_mcs | Sets UE downlink/uplink MCS |
| set_power | Sets scaling factor for UE downlink signals |
| read_metrics | Reads metrics from dataset |
| get_metric | Returns value of a specific metric |

Network slicing can be enabled/disabled globally for the whole network (enable_slicing). If enabled, SCOPE APIs allow to set/get the UEs associated to each slice of the network (set/get_slice_users). The behavior of each slice can be configured in terms of allocated PRBs—which reflects the portion of spectrum available to the slice—and scheduling policy (set_slice_resources, set_slice_scheduling). Additionally, PRBs and scheduling of each slice can also be jointly set (set_slice). Besides allowing users to set the scheduling policy for each slice, SCOPE APIs also allow to set the global scheduling policy for the whole network (set_scheduling).

The PHY-layer configuration can be tuned by setting the downlink/uplink MCS of selected UEs (set_mcs), which directly impacts on the signal modulation and coding rate (see Section 3.2 and 3GPP. 2020. Evolved Universal Terrestrial Radio Access (E-UTRA); Physical layer procedures. Technical Specification (TS) 36.213. 3rd Generation Partnership Project (3GPP). http://www.3gpp.org/DynaReport/36213.htm Version 16.2.0)). Additionally, the power level of signals for selected UEs can be tuned as well (set_power). Finally, SCOPE APIs allow interactions with the dataset generated by the data collection module of the BSs (Section 3.2). Specifically, they allow to read and get metrics values for the specified time window (read_metrics and get_metric).

FIG. 5B is a listing 501 of an example embodiment of SCOPE APIs in use. In the listing 501, SCOPE APIs are used to tune the resources of each slice based on the run-time performance read from the dataset. The listing assumes the user has downloaded SCOPE container, customized the control logic via SCOPE APIs, and started an experiment, (Section 2).

While SCOPE experiment is running (line 2 of the listing 501), the user calls SCOPE read_metrics API to read the performance metrics of each slice from the generated dataset and for the specified time_window (line 3 of the listing 501). Metrics are stored in a Python dictionary (slice_metrics) that can be accessed iteratively (line 4 of the listing 501). Then, users can call SCOPE set_mcs API to set a specific mcs_level for all UEs of the slice (line 5 of the listing 501). Note that SCOPE APIs also allow selection of MCS levels on a per-UE basis.

The listing 501 also shows how easy it is for SCOPE users to implement control logic policies. For non-limiting example, users can change scheduling and network slicing policies when the metrics reported in SCOPE dataset meet certain conditions. For instance, if the size of the transmission buffer (metrics['buffer']) is above/below a threshold (lines 6 and 8 of the listing 501), the resources of each slice, e.g., scheduling policy and allocated RBGs, can be changed accordingly (set_slice, lines 7 and 9 of the listing 501). Finally, the method waits for a timeout (line 10 of the listing 501) before reading the metrics from the dataset again.

4 Integrating SCOPE in Colosseum

To facilitate experimentation and prototyping of new solutions for 5G softwarized cellular systems, an example embodiment integrates SCOPE in the Colosseum network emulator. A system overview is shown in FIG. 6, disclosed below.

Figure 6:
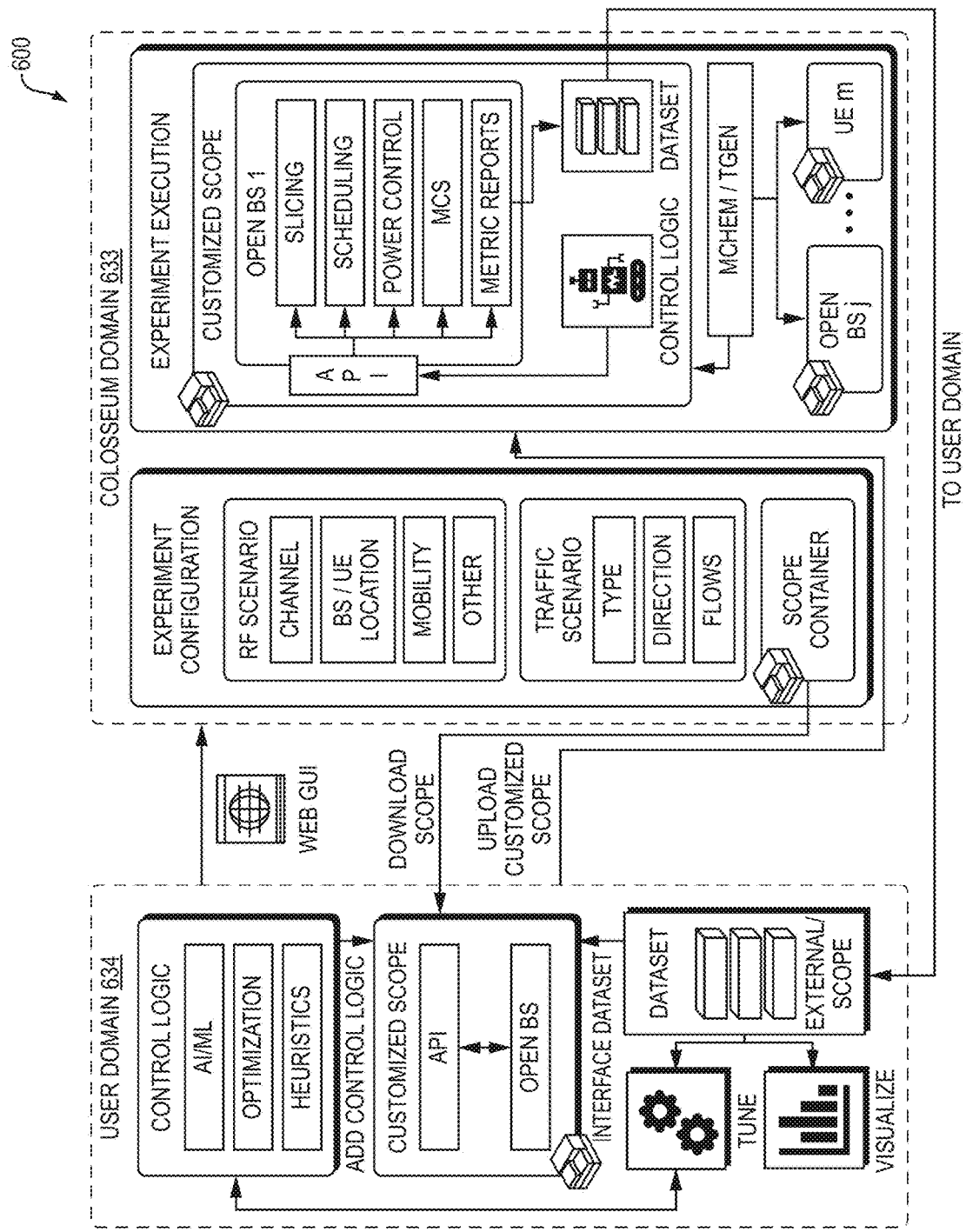
FIG. 6 is a block diagram of an example embodiment of SCOPE integration in Colosseum.

FIG. 6 is a block diagram of an example embodiment of SCOPE integration in Colosseum. The block diagram includes a system overview 600 which distinguishes between two main parts: (i) User domain 634, and (ii) Colosseum domain 633.

User Domain. The user domain, running on the user local machine, is where researchers download the SCOPE container and use its APIs to implement their custom methods (Section 3). Here SCOPE users interface with Colosseum to run their experiments and test their customized SCOPE containers. Specifically, users access Colosseum via a dedicated web GUI, select the scenarios they want to run on Colosseum to evaluate their solutions, and eventually visualize and process the obtained results. Thanks to the storage and computational capabilities of the SRNs, SCOPE allows users to collect large amounts of data (e.g., instantaneous through-put, transmission queue status, Channel Quality Information (CQI), number of PRBs allocated to each network slice, to name a few for non-limiting example). Additionally, SCOPE allows users to automatically generate datasets that can be leveraged to train machine learning and artificial intelligence models, or to design novel optimization and heuristic solutions for cellular applications.

Colosseum Domain. The operations executed in the Colosseum domain can be divided in two different phases: (i) The experiment configuration, and (ii) the experiment execution.

During the experiment configuration, users set up the experiment to run on Colosseum. Specifically, they select the desired RF and traffic scenarios and the duration of the experiment. Among others, they can specify which nodes act as BSs and which as UEs. After creating a customized instance of SCOPE with user-defined control logic, users can upload it on Colosseum. They now enter the experiment execution phase, where specified experiments are actually run.

Experiments can be conveniently scheduled and started through Colosseum web-based GUI. Once the experiment begins, the user-customized SCOPE container is automatically deployed on Colosseum SRNs, and the RF and traffic scenarios of choice are executed by Colosseum Massive Channel Emulator (MCHEM) and Traffic Generator (TGEN) (Section 4.1).

SCOPE has been designed particularly to foster closed-loop and adaptive network control, and to enable intelligence in the network. To this aim, SCOPE embeds a data collection module, which gathers the network run-time metrics in a dataset at run-time (see Section 3.2). This dataset acts as a feedback loop on the network performance and can be used to evaluate the impact of control decisions on each node.

When the experiment is over, SCOPE stops the scenario execution and all the results collected during the experiment—which are stored in the metrics and performance dataset—are transferred to the user directory on Colosseum. This makes it possible to process results and save the dataset for future applications (e.g., to train machine learning methods).

4.1 Creating 5G Scenarios

This section provides details on how an example embodiment was designed and implemented 5G cellular scenarios in Colosseum. An overview of ready-to-use 5G scenarios designed for SCOPE will be given in Section 5, disclosed further below. Components of such 5G scenarios is disclosed below with regard to FIG. 7.

Figure 7:
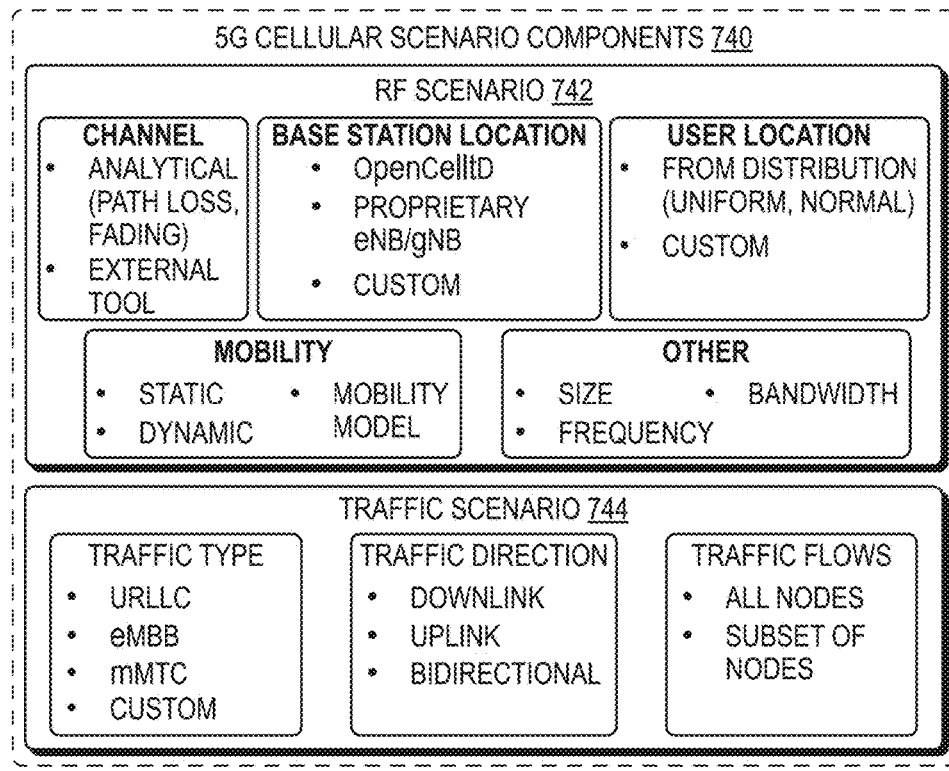
FIG. 7 is a block diagram of an example embodiment of 5G cellular scenario components.

FIG. 7 is a block diagram of an example embodiment of 5G cellular scenario components 740. Each scenario in FIG. 7 includes two macro-blocks: The RF scenario 742, and the traffic scenario 744.

RF Scenario. It specifies the channel conditions that each node experiences throughout the entire duration of the experiment. For each and every SRN, the scenario defines channel impulse responses that model path loss, fading, and multi-path effects. These channel coefficients are updated every millisecond and can be generated in different ways. Specifically, SCOPE supports scenarios whose channel coefficients are generated via analytical models, ray tracer software or obtained via real-world measurement campaigns and channel sounders. These coefficients are then fed to MCHEM, which applies the pre-defined channel conditions to signals to and from each SRN. To better understand how RF channels are emulated in Colosseum, FIG. 8, disclosed below, gives a high-level overview of MCHEM channel emulation procedures.

Figure 8:
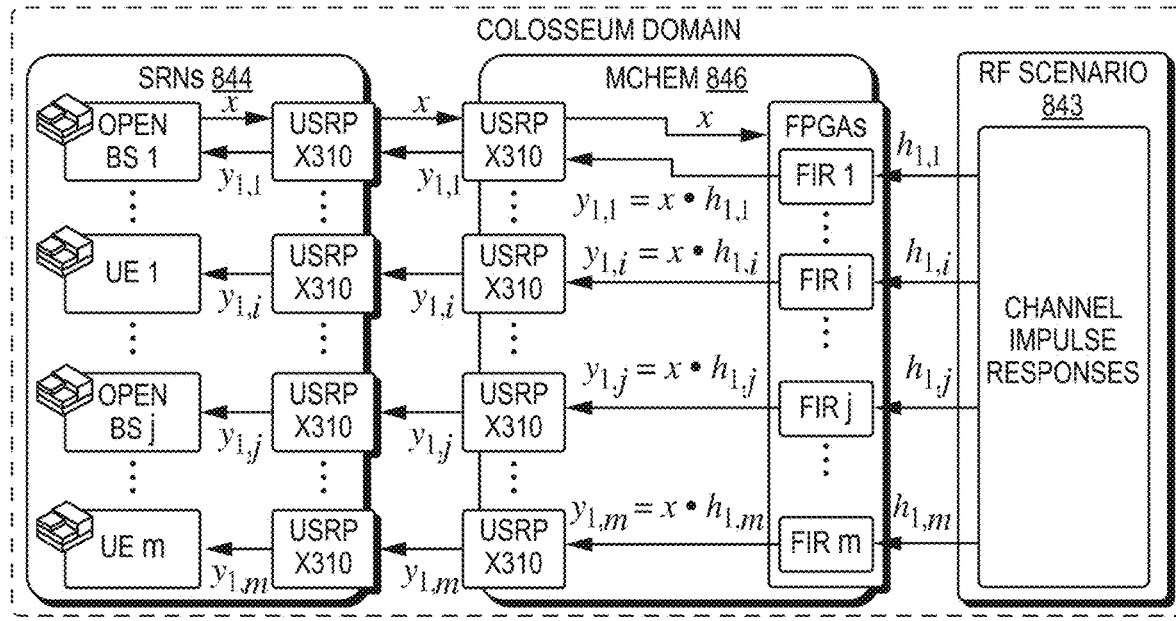
FIG. 8 is a block diagram of an example embodiment of emulation of Radio Frequency (RF) scenarios in Colosseum Massive Channel Emulator (MCHEM).

FIG. 8 is a block diagram of an example embodiment of emulation of RF scenarios 842 in MCHEM 843. When a signal x is generated by one of the SRNs 844 of the experiment (e.g., open BS 1 in FIG. 8), this gets transmitted by the USRP X310 of the SRN and received by the USRP X310 of MCHEM, which is coupled to it via low-noise and low-loss SMA cables as shown in FIG. 8. The latter sends x to MCHEM Field Programmable Gate Arrays (FPGAs) (for non-limiting example), where signal processing operations take place. Specifically, these FPGAs are fed with the channel impulse responses corresponding to the RF scenario in use. These impulse responses, namely $h_{k,n}$, with k, n $\in[1,M]$ identifying the transmitting and receiving nodes, and M being the number of nodes in the experiment, are convoluted to x by the FPGAs via Finite Impulse Response (FIR) filters. Then, the resulting signals $y_{k,n} = x * h_{k,n}$ are transmitted to the corresponding SRNs. It is worth mentioning that MCHEM forwards the convoluted signals $y_{k,n}$ to multiple SRNs and not just the intended receiver as disclosed in FIG. 8. This way, Colosseum makes it possible to emulate interference among each and every node of the network, thus realistically reflecting what would happen in an over-the-air cellular deployment.

Since channel conditions vary based on the location of the nodes, RF scenarios specify the position of each node for each time instant as shown in FIG. 7. This makes it possible to run experiments on different cellular deployment configurations that mimic real-world cellular topologies. The location of BSs—both 4G (eNBs) and 5G (gNBs)—can be specified via GPS coordinates, which can be either generated randomly, through statistical models, or extracted from open source 4G/5G datasets such as OpenCelliD (Unwired Labs. 2020. OpenCelliD. https://opencellid.org). Similarly, the location of UEs can be specified via GPS coordinates according to diverse probability distribution, e.g., uniform or normal distributions, or historical data from TOs, if available.

Additionally, scenarios can specify user mobility, which in SCOPE can be static, i.e., the users do not move for the entire duration of the experiment, or dynamic, in which case the mobility model and speed can also be specified. Finally, RF scenarios allow to select the size of the emulated environment, RF frequency, and channel bandwidth.

Traffic Scenario. It specifies and configures the traffic flows among BSs and users (FIG. 7). Traffic scenarios are handled by Colosseum TGEN system, which relies upon Multi-Generator (MGEN), an open source software to generate and control realistic TCP/UDP IP traffic (U.S. Naval Research Laboratory. 2019. "Multi-Generator (MGEN)," https://www.nrl.navy.mil/itd/ncs/products/mgen). MGEN supports a variety of different classes of traffic with diverse QoS requirements, data rates and type of service. This way, MGEN can be used to generate Ultra Reliable and Low Latency Communication (URLLC), enhanced Mobile Broad-band (eMBB) and Massive Machine Type Communications (mMTC) traffic, which—as discussed in Section 3—makes it possible to assign specific traffic classes to each slice of the network and devise control policies tailored to each slice. Finally, traffic scenario also specifies the direction of the traffic, e.g., downlink, uplink or bidirectional, and allowed traffic flows, i.e., which nodes exchange traffic in the experiments.

5 Large-Scale 5G Networks

For non-limiting example, 15 RF cellular scenarios were designed in three different urban setups: (i) Rome, Italy; (ii) Boston, US, and (iii) Salt Lake City, US (Platform for Open Wireless Data-driven Experimental Research (POWDER) scenario). For the Rome and Boston scenarios, the locations of the cellular BSs reflect real cell tower deployments extracted from the OpenCelliD database (Unwired Labs. 2020. "OpenCelliD," https://opencellid.org). In the POWDER scenario, instead, locations of the BSs mirror those of the rooftop BSs deployed in the Salt Lake City platform (POWDER Deployment. 2020. https://www.powderwireless.net/area). Each scenario includes from 8 to 10 BSs and up to 40 UEs whose location and mobility patterns can be selected by SCOPE users when setting up an experiment. The following UE distribution configurations were considered: (i) Close (UEs are randomly distributed within 20 m from the serving BS); (ii) medium, (within 50 m), and (iii) far, (within 100 m). Additionally, for non-limiting example, three different mobility configurations were implemented: (i) Static, in which UEs do not move for the entire duration of the experiment; (ii) moderate, in which they move at an average speed of 3 m/s, and (iii) fast, in which the average speed of the UEs is 5 m/s. In all of the above cases, UEs follow a random waypoint mobility model. A graphical overview of the generated cellular scenarios is given in FIGS. 9A-C, disclosed below.

FIGS. 9A-C are maps of example embodiments of large-scale 5G cellular scenario maps, in which the numbered circles represent the locations of the cellular BSs on the map. FIG. 9A is a map of an example embodiment of a Rome scenario 947, FIG. 9B is a map of an example embodiment of a Boston scenario 948, and FIG. 9C is map of an example embodiment of a POWDER scenario 949. The Rome, Boston, and POWDER scenarios are disclosed below.

Rome scenario. It captures the dynamics of the city center of Rome, Italy. A total of 50 radio nodes are involved: 10 BSs and 40 UEs. This scenario is the densest among the designed ones and it covers an area of 0.5 $km^2$ as shown in FIG. 9A.

Boston scenario. It captures the dynamics of downtown Boston, US. A total of 50 nodes are involved: 10 BSs and 40 users. This scenario covers an area of 0.95 $km^2$ as shown in FIG. 9B.

POWDER scenario. It mirrors the setup of the rooftop BSs deployed in the POWDER platform in Salt Lake City, US ("POWDER Deployment,". 2020. https://www.powder-wireless.net/area). A total of 40 nodes are involved: 8 BSs and 32 UEs. This scenario is the sparsest with an area of 3.6 $km^2$ as shown in FIG. 9C.

Along with the RF scenario, non-limiting relevant traffic scenarios were designed (Section 4.1). Given the ever-increasing popularity of video streaming platforms and social networks, dedicated traffic scenarios that model uplink and downlink video streaming traffic flows among UEs and BSs were generated. In TGEN, this is done by configuring MGEN to generate 1400 bytes-long UDP packets with the rate of 83.66 pkt/s (see Section 4.1 and (U.S. Naval Research Laboratory. 2019. Multi-Generator (MGEN). https://www.nrl.navy.mil/itd/ncs/products/mgen)). The maximum duration of the scenarios may be set to 10 minutes for non-limiting example. However, all scenarios can be restarted and re-executed for as long as necessary.

5.1 Scenario Analysis

Results are disclosed below with were obtained by executing SCOPE in the above scenarios with specific focus on (i) providing insights on how different topologies, distributions and mobility patterns affect network performance, and (ii) demonstrating the repeatability of SCOPE experiments.

The default SCOPE container configuration was considered where all users generate the same traffic, belong to the same slice, which uses a round-robin scheduling method (see Section 6 for more complex non-limiting examples). For each scenario, downlink/uplink throughput and spectral efficiency were measured for different distances and mobility. In all the considered cases, BSs use a bandwidth of 3 MHz (15 PRBs).

Single runs of the Rome scenario varying the distance among BSs and UEs are analyzed first. Then, the performance and reproducibility of SCOPE results are evaluated.

Single experiments. To give a better understanding of what running SCOPE experiments looks like, results pertaining to single experiment runs (one for each distance among BSs and UEs) in the Rome scenario with static UEs are shown in FIGS. 10A-F. The considered distances are: Close 1051, medium 1052, and far 1053, as described earlier in this section.

FIGS. 10A-F are graphs of example embodiments of downlink (DL) and uplink (UL) throughput in the Rome static scenario. The measured downlink and uplink throughput is shown in FIGS. 10A-F. FIGS. 10A-C show that as the distance among BSs and UEs increases, the gap among the downlink throughput of different BSs becomes larger. This is due to channel artifacts, e.g., path loss and fading, which become more significant at greater distances among UEs and BSs. Similarly, the uplink throughput (FIGS. 10D-F) decreases as the distance between BSs and UEs increases.

Reproducibility of results. To demonstrate that SCOPE results do not vary significantly across multiple repetitions of the same experiment, more than 60 repetitions were performed—for a duration of more than 10 hours of experiments—varying the distance among BSs and UEs, and the mobility of UEs.

To present the results, violin plots in FIGS. 11A-B, disclosed below, are used to show both the Probability Density Function (PDF) and distribution of the data measurements across several realizations (shaded areas in the figures), as well as their median (white dots). The black boxes show the 95% confidence intervals.

Static case. Results for static cellular scenarios are shown in FIGS. 11A and 11B, disclosed below.

Figure 11A:
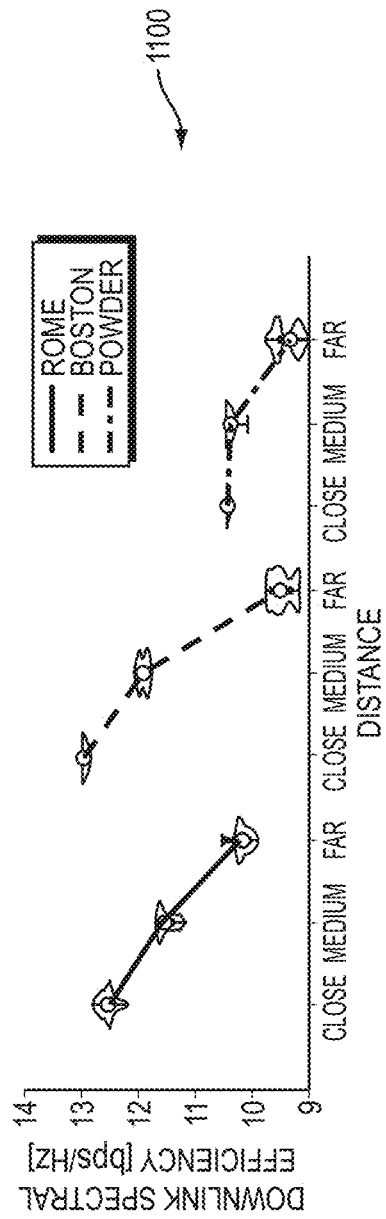
FIGS. 11A and 11B are graphs of example embodiments of spectral efficiency in static cellular scenarios.
Figure 11B:
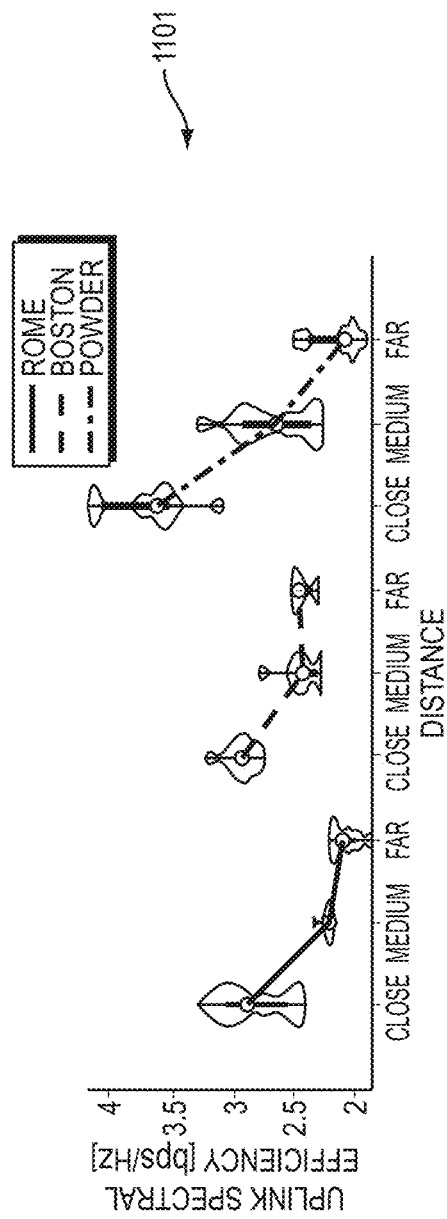

FIGS. 11A and 11B are graphs with violin plots of example embodiments of spectral efficiency in static cellular scenarios. FIG. 11A shows the download spectral efficiency 1100 while FIG. 11B shows the uplink spectral efficiency 1101. In this case, that is, the static case, UEs do not move and they are placed at different distances from the BSs (close, medium, and far).

Metrics for downlink and uplink performance are shown in FIG. 11A and FIG. 11B, respectively. As expected, the spectral efficiency decreases for both downlink and uplink as the UEs are placed further away from the BSs. However, in all cases data are distributed around the median (white dots in the figures), and exhibit tight 95% confidence intervals (black boxes in the figures).

Figures 12A, 12B:
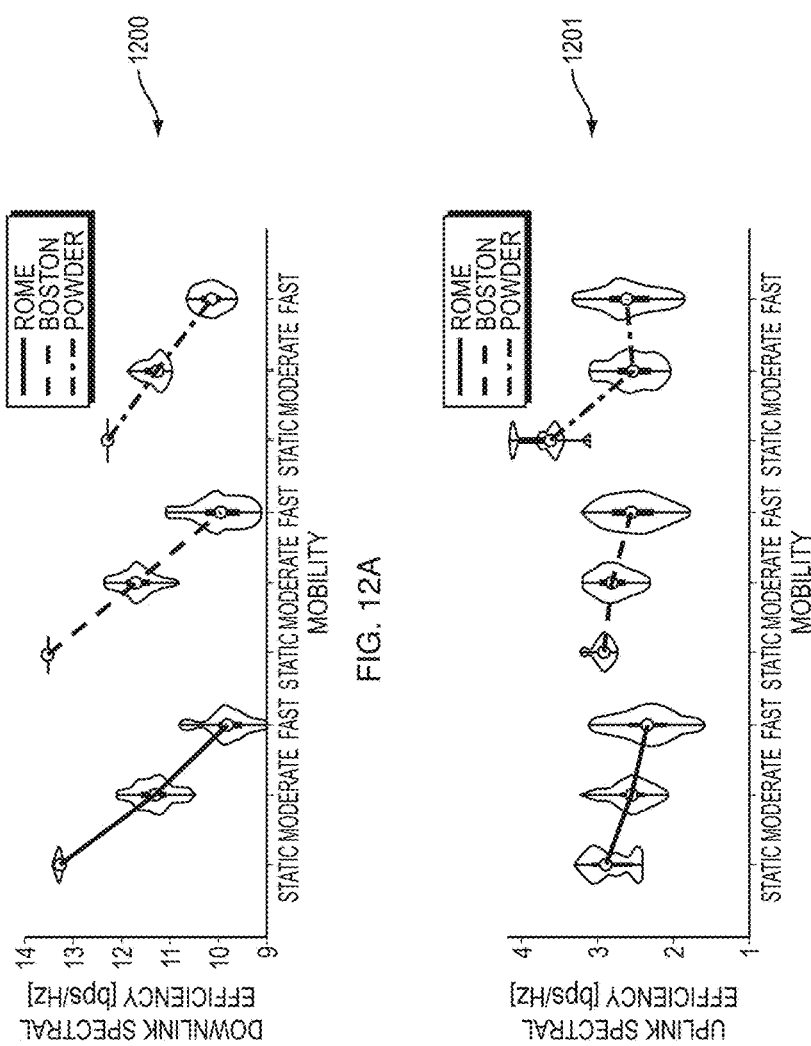
FIGS. 12A and 12B are graphs of example embodiments of spectral efficiency in dynamic cellular scenarios.

Dynamic case. FIGS. 12A and 12B, disclosed below, show the above metrics in the case of mobile nodes (static, moderate, and fast UE mobility).

FIGS. 12A and 12B are graphs with violin plots of example embodiments of spectral efficiency in dynamic cellular scenarios. The downlink performance 1200 of the network is shown in FIG. 12A, while FIG. 12B shows the uplink performance 1201. As such, FIG. 12A shows the download spectral efficiency while FIG. 12B shows the uplink spectral efficiency. Since the higher the speed, the more likely UEs are to move away from the serving BS, a drop in the performance can be observed as the speed increases. However, as for the static case (FIG. 11A and FIG. 11B), the data shown by the violins are distributed around the median (white dots) with small 95% confidence intervals (black boxes). This demonstrates that several realizations of the experiments achieve comparable results.

6 SCOPE Use Cases

In this section, SCOPE application use cases are provided and non-limiting examples of interest to the research community. Machine learning applications are described in Section 6.1, and optimization and heuristics in Section 6.2. Finally, Section 6.3 demonstrates how SCOPE can be ported on the Arena (L. Bertizzolo, et al., 2020. "Arena: A 64-antenna SDR-based Ceiling Grid Testing Platform for Sub-6 GHz 5G-and-Beyond Radio Spectrum Research," submitted to Computer Networks (COMNET) (2020)) and POWDER ("Platform for Open Wireless Data-driven Experimental Research (POW-DER)," 2020. https://www.powderwireless.net) testbeds.

6.1 Machine Learning

Figure 13A:
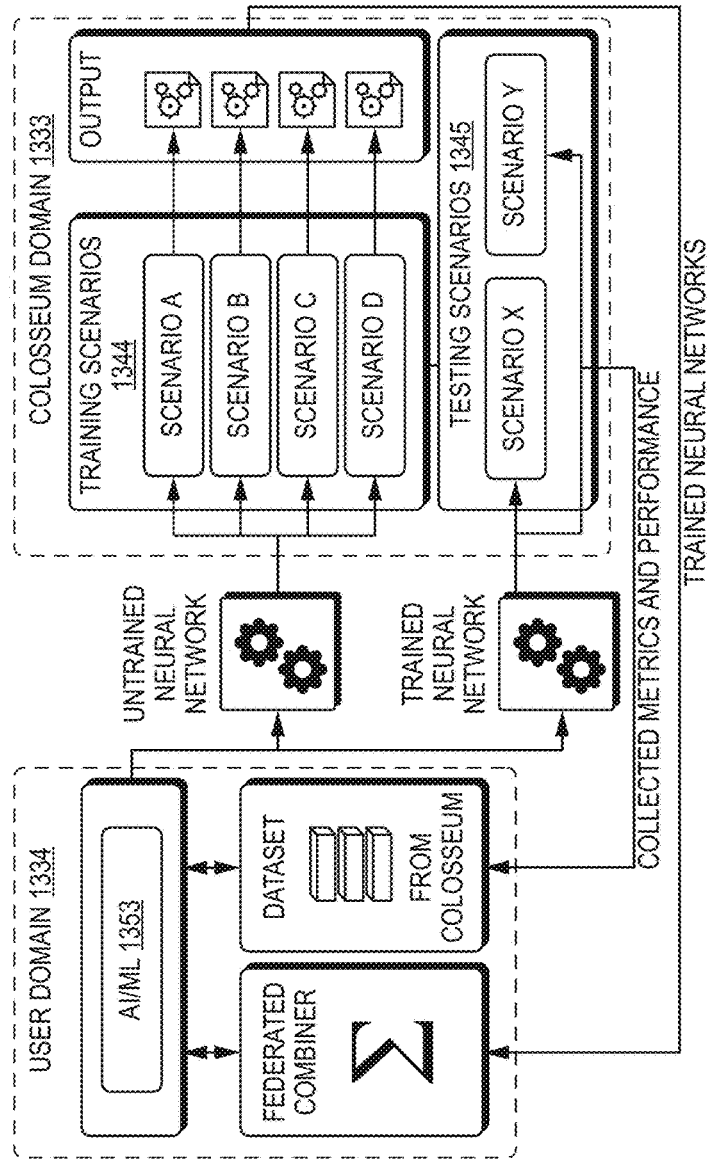
FIG. 13A is a block diagram of an example embodiment of a machine learning use case.

The first use case is that of a researcher utilizing SCOPE to implement machine learning-based control methods for cellular networks as disclosed in FIG. 13A.

FIG. 13A is a block diagram of an example embodiment of a machine learning use case. In the user domain 1334, artificial intelligence and machine learning methods (AI/ML) 1353 are designed and interfaced with SCOPE through its open APIs (Section 3). The resulting version of the SCOPE container, which includes the user-defined control logic, is then transferred in Colosseum 1333, where it can be used to run experiments.

Being able to run experiments on multiple scenarios enables a variety of machine learning applications. In a first phase, for example, neural networks can be trained on a subset of the available scenarios (training scenarios 1344 in FIG. 13A) leveraging the metrics and performance dataset generated by SCOPE. This way, researchers can train multiple copies of the same neural network on different scenarios and then use federated learning techniques to combine weights and develop more general models (Q. Yang, et al., 2019. "Federated machine learning: Concept and applications," ACM Trans. on Intelligent Systems and Technology (TIST) 10, 2 (2019), 1-19).

After the training, the network can be tested on a completely different set of scenarios (testing scenarios 1345 in the FIG. 13A). This makes it possible to validate the generalization capabilities of the trained model, and eventually fine-tune its weights, if necessary. Finally, after the devised methods work as expected, the trained model can be exported from SCOPE and deployed on production cellular networks or any other LXC-enabled testbed.

Figure 13B:
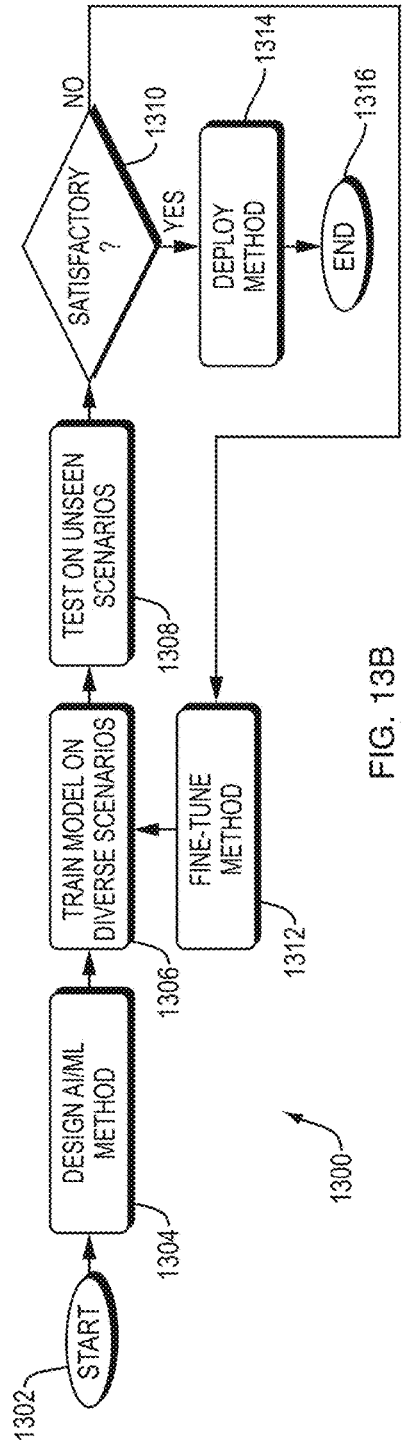
FIG. 13B is a flow diagram of an example embodiment of another computer-implemented method.

FIG. 13B is a flow diagram 1300 of an example embodiment of a computer-implemented method in accordance with FIG. 13A, disclosed above. The computer-implemented method starts (1302) and designs an AI/ML method (1304). The method trains a model on diverse scenarios (1306). The computer-implemented method tests the model on unseen (unknown, new) scenarios (1308). The computer-implemented method checks (1310) whether the AI/ML method works as expected. If no, the computer-implemented method fine tunes the AI/ML method (1312) and returns to training the model (1306). If, however, the AI/ML method does work as expected, the AI/ML method is deployed (1314) and the computer-implemented method thereafter ends (1316) in the example embodiment.

SCOPE for Deep Reinforcement Learning. To provide a practical example of how SCOPE can be used to proto-type machine learning methods, an example embodiment implements a simple yet effective Deep Reinforcement Learning (DRL) algorithm (N. C. Luong, et al., 2019. "Applications of Deep Reinforcement Learning in Communications and Networking: A Survey," IEEE Communications Surveys & Tutorials 21, 4 (May 2019), 3133-3174, V. Mnih, et al., 2015. "Human-level control through deep reinforcement learning," Nature 518, 7540 (February 2015), 529-533).

Figure 14:
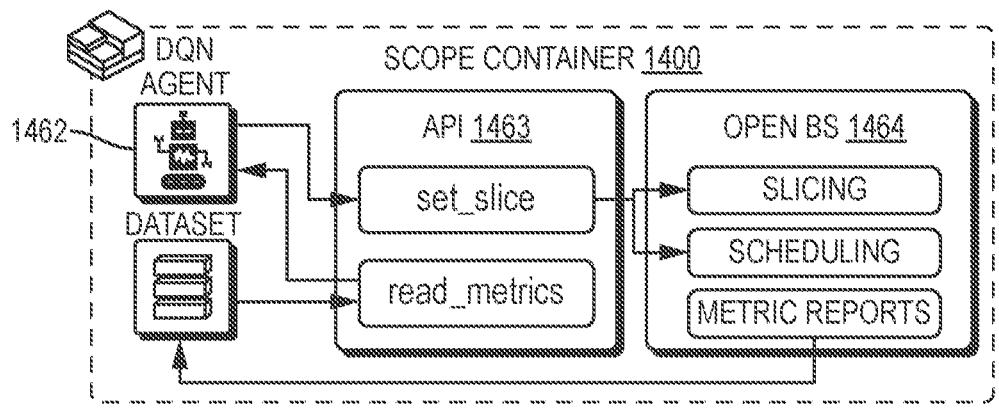
FIG. 14 is a block diagram of an example embodiment of a deep Q-network (DQN) agent.

As shown in FIG. 14, disclosed below, a Deep Q-Network (DQN) agent—a well-established DRL solution for problems with discrete actions (V. Mnih, et al., 2013. "Playing Atari with Deep Reinforcement Learning," arXiv preprint arXiv:1312.5602 (2013))—that reads periodically the metrics stored in the BS dataset was trained. Then, the agent selects slicing and scheduling strategies at run-time with the final goal of maximizing the throughput of the network. The agent is executed on each BS of the network.

FIG. 14 is a block diagram of an example embodiment of a deep Q-network (DQN) agent 1462 in a scope container 1400. A network with two different slices was considered. In the example embodiment, the DQN agent 1462 is required to select how many PRBs to allocate to each slice and which scheduling method should be used to serve the UEs of the slice (2 per slice). The actions taken by the agent are, then, enforced via SCOPE APIs 1463, which reconfigure the BSs 1464 in real-time. The state of the agent is generated by periodically reading the dataset entries corresponding to the most recent 30 s of the experiment. These are, then, fed to an autoencoder trained to create a latent representation (and thus with lower dimension) of the state of the system (W. Wang, et al., 2014. "Generalized autoencoder: A neural network framework for dimensionality reduction," In Proc. of IEEE Conf. on Computer Vision and Pattern Recognition Work-shops. 490-497.) The downlink throughput during the training of the agent was measured, as disclosed in FIG. 15.

Figure 15:
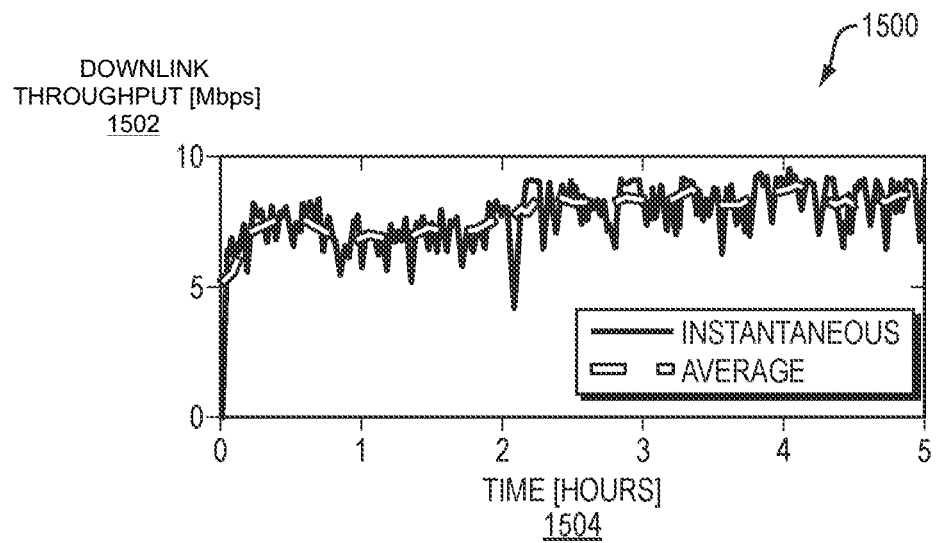
FIG. 15 is a graph of an example embodiment of downlink throughput of the DQN agent as a function of training time.

FIG. 15 is a graph of an example embodiment of downlink throughput 1502 of the DQN agent as a function of training time 1504. The number of downlink packets to transmit to the UEs, PRBs and scheduling policy of each slice, and spectral efficiency are shown in two snapshots of experiments disclosed further below with reference to FIGS. 16A-C and FIGS. 17A-C. In the first snapshot (FIGS. 16A-C) the agent makes decision on the scheduling policy of each slice; decisions on slicing resources and scheduling policy in the second snapshot (FIGS. 17A-C).

Training results are shown in FIG. 15. At the beginning of the experiment, the agent is initialized with random weights. This means that actions computed in the first training period are taken at random and potentially sub-optimal. As the training goes on, the agent learns how to effectively select strategies that achieve higher throughput values. After 2 hours of training, for instance, the agent is already capable of selecting actions that result in improved performance.

Figures 16A, 16B:
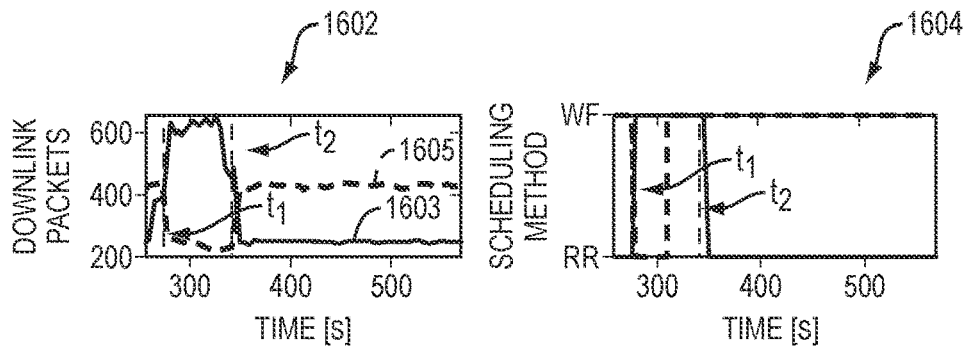
FIGS. 16A-C are graphs of example embodiments of a machine learning use case with scheduling decision policies.
Figure 16C:
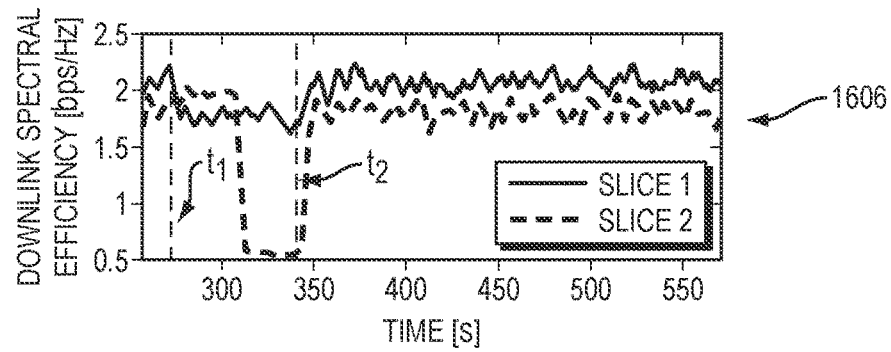
Figures 17A, 17B:
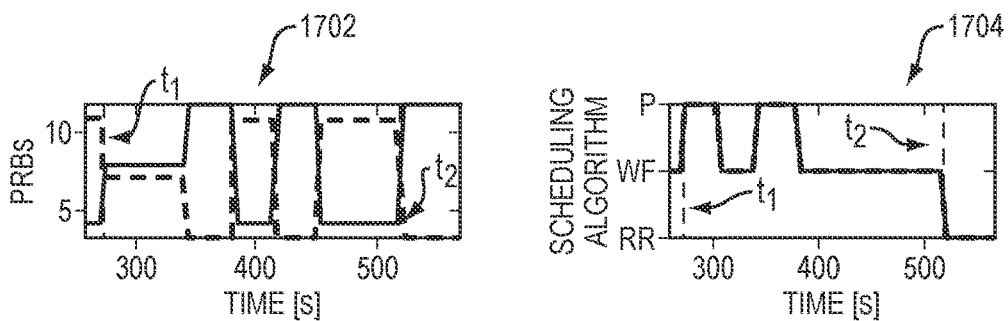
FIGS. 17A-C are graphs of example embodiments of another machine learning use case with scheduling and slicing decision policies.
Figure 17C:
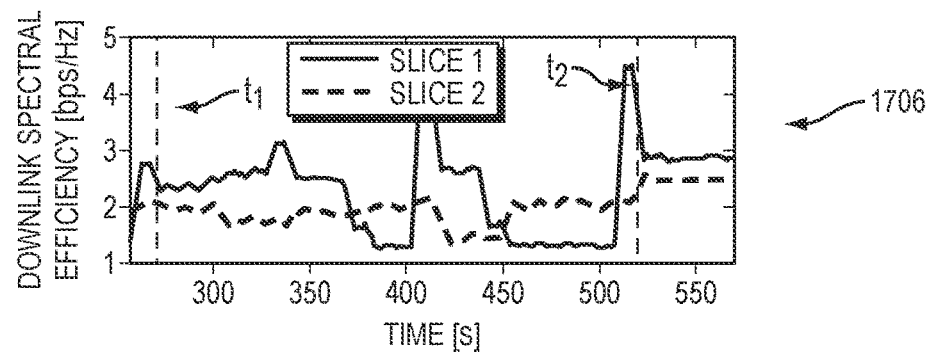

FIGS. 16A-C are graphs of example embodiments of a machine learning use case with scheduling decision policies. FIGS. 16A-C show the first snapshot, disclosed above, in which the action space of the DQN agent is limited to scheduling decisions for each slice only (i.e., no decisions on resource allocation). FIG. 16A shows the downlink packets over time, FIG. 16B shows the scheduling method selected for the slices over time, and FIG. 16C shows the downlink spectral efficiency over time.

At the beginning of the snapshot, the DQN agent selects the round-robin (RR in FIG. 16B) and waterfilling (WF) scheduling methods for slices 1 and 2, respectively. As the number of packets for the UEs of slice 1 increases (solid line 1603 in the graph 1602 of FIG. 16A), the agent changes the scheduling policy of the slice from round-robin to a fairer waterfilling ($t_1$, see graph 1604 FIG. 16B). This action allows the network to maintain a good level of spectral efficiency, (FIG. 16C). On the other hand, the scheduling method of slice 2, which sees a 20 s decrease in the packet arrivals for the UEs (dashed line 1605 in the graph 1602 of FIG. 16A) is changed from waterfilling to round-robin, and changed back to waterfilling shortly after. Finally, as the burst of packets for the UEs of slice 1 finishes, the scheduling policy of the slice is changed back to round-robin ($t_2$). It can be observed that the brief decrease in spectral efficiency of slice 2 (see graph 1606 of FIG. 16C) corresponds to a short time window with fewer packet arrivals (see FIG. 16A).

The second snapshot is shown in FIGS. 17A-C, disclosed below.

FIGS. 17A-C are graphs of example embodiments of another machine learning use case with scheduling and slicing decision policies. The PRB allocation for slice 1 and slice 2 over time is shown in the graph 1702 FIG. 17A. Selection of the scheduling method for slice 1 and slice 2 over time is shown in the graph 1704 FIG. 17B. The downlink spectral efficiency over time for slice 1 and slice 2 is shown in the graph 1706 of FIG. 17C. This time the DQN agent makes decisions on both PRBs allocation (FIG. 17A), thus, affecting the slice resources, and scheduling policy (FIG. 17B) of the two slices. Both decisions reflect on the downlink spectral efficiency (FIG. 17C), which the agent tries to balance among the two slices.

When the experiment starts, both slices are served via the waterfilling scheduling method (WF in FIG. 17B). Then, at instant $t_1$, the DQN agent observes the state of the network and modifies the resource allocation of each slice. As a result, the PRBs of slice 1 are increased, while those of slice 2 decreased (FIG. 17A). Additionally, the agent selects the proportional scheduling method for both slices (P in FIG. 17B). On the one hand, this causes the downlink spectral efficiency of slice 1 to increase (FIG. 17C). On the other hand, slice 2 achieves the same spectral efficiency utilizing fewer resources. Similar decisions are made throughout the experiment to balance the spectral efficiency of the two slices. Finally, at time $t_2$, the DQN reallocates the PRBs of the two slices (11 PRBs for slice 1, and 4 for slice 2, recall that the BS uses 15 PRBs), and sets their scheduling policies to round-robin (RR in FIG. 17B). This results in the two slices achieving similar, i.e., fair, levels of spectral efficiency.

6.2 Optimization and Heuristics

A major issue with many optimization methods and heuristics is that they often rely upon analytical models, assumptions and approximations that do not accurately reflect the real network behavior. SCOPE can help researchers refining these models and assessing their accuracy in real-world applications. A possible non-limiting use case is shown in FIG. 18.

FIG. 18 is a block diagram of an example embodiment of an optimization use case. Similar to the machine learning use case (Section 6.1), SCOPE can be customized to include optimization- and heuristic-based control logic. This control logic can leverage SCOPE APIs to interface with the BSs and control their configuration at run-time. This customized version of SCOPE can, then, be uploaded to Colosseum 1833 and used to test different optimization/heuristic objectives. At the experiment run-time, the user methods can leverage SCOPE metrics and performance dataset to have feedback on the behavior of the network. Then, decisions can be made on the policies of the cellular network (e.g., scheduling and slicing), with subsequent run-time reconfiguration of the BSs. Finally, when the user policies reach a satisfactory behavior, they can be reliably deployed on commercial cellular networks.

For the sake of illustration, in FIGS. 19A and 19B shown the down-link buffer size and throughput obtained by implementing and testing a heuristic method on SCOPE. The case in which BSs serve three slices with different classes of traffic, UEs and QoS requirements are considered: (1) One HE generating URLLC traffic with low-latency requirements; (2) two UEs and handles Mobile Broadband (MBB) traffic with high data rates, and (3) one UE generating mMTC traffic with loose latency and data rate requirements.

FIGS. 19A and 19B are graphs of an example embodiment of the optimization use case for different classes of traffic: URLLC (slice 1), MBB (slice 2), and mMTC (slice 3). The graph 1902 of FIG. 19A shows the downlink transmit buffer size over time for each slice while the graph 1904 of FIG. 19B shows the downlink throughput over time for each slice. The heuristic method periodically reads data from SCOPE dataset and tunes the slice resources accordingly. Specifically, slice 1 (URLLC) is given additional resources when the BS has more packets to transmit to the UEs (i.e., when the size of the transmission buffer increases) to enable prompt communications. On the other hand, slice 2 (MBB) is allocated more resources when the available bandwidth of the slice saturates. Finally, due to its loose performance requirements, slice 3 (mMTC) is served with fixed scheduling policies and is allocated two PRBs for the entire duration of the experiment.

As soon as the experiment starts, there is a surge in the traffic handled by slices 1 and 2, which causes an increase in the downlink buffer (FIG. 19A). Following the above policy, resources of both slices are increased at time $t_1$ to prevent congestion of the transmission buffers. Additionally, the scheduling policy of slice 2 is also changed from round-robin to a fairer waterfilling. Because of this, at time $t_1$ a prompt decrease in the buffer size of both slices and an increase of throughput is observed (FIG. 19A and FIG. 19B, respectively).

6.3 SCOPE Portability

This section showcases how SCOPE can be ported to different testbeds. First, an instance of SCOPE with a BS serving up to 5 UEs on Colosseum was prototyped. Then, such instance was ported to Arena (L. Bertizzolo, et al., 2020. "Arena: A 64-antenna SDR-based Ceiling Grid Testing Platform for Sub-6 GHz 5G-and-Beyond Radio Spectrum Research," submitted to Computer Networks (COMNET) (2020).)—an indoor office testbed—and POW-DER ("Platform for Open Wireless Data-driven Experimental Research (POW-DER)," 2020. https://www.powderwireless.net.)—an outdoor large-scale platform part of the PAWR program ("Platforms for Advanced Wireless Research (PAWR)," 2020. https://www.advancedwireless.org). In these two testbeds the BS serves 2 UEs located at an average distance of 4.5 m for Arena, and 345 m for POWDER. Moreover, while on Arena antennas of devices (USRPs X310) are all at the same height, i.e., hung off the ceiling, on POWDER the BS (USRP X310) is located on the rooftop of a 30 m-tall building and serves ground-level UEs (USRPs B210).

In this experiment, the downlink spectral efficiency of the BS was measured. Results are shown in FIG. 20.

FIG. 20 is graph 2000 of an example embodiment of results for SCOPE first prototyped on Colosseum, and then ported to the Arena testbed and POWDER platform. As can be appreciated from FIG. 20, even if SCOPE was prototyped and fine-tuned on Colosseum, it achieves comparable results when ported on two very different real-world testbeds—one indoor, Arena, and one large-scale outdoor, POWDER. Moreover, SCOPE not only manages to adapt to diverse environments, but also to the different number of UEs. This demonstrates the feasibility of prototyping solutions with SCOPE on Colosseum before testing them in the field on real-world testbeds, such as Arena and POWDER for non-limiting example.

7 Related Work

Few solutions exist that consider network slicing implementations for cellular, using srsLTE specifically. Garcia-Aviles et al. propose a multi-slice service-orchestration frame-work (G. Garcia-Aviles, et al., 2018. "POSENS: A Practical Open Source Solution for End-to-End Network Slicing," IEEE Wireless Communications 25, 5 (October 2018), 30-37) and implement it on a small-scale prototype (G. Garcia-Aviles, et al., 2020. "Experimenting with Open Source Tools to Deploy a Multi-service and Multi-slice Mobile Network. Computer Communications," 150 (January 2020), 1-12.), while Ayala-Romero et al. devise a deep learning approach which jointly allocated computational and radio resources (A. Ayala-Romero, et al., "VrAIn: A Deep Learning Approach Tailoring Computing and Radio Resources in Virtualized RANs," In Proc. of ACM Intl. Conf. on Mobile Computing and Networking (MobiCom) (Los Cabos, Mexico).

A proof of concept of RAN slicing on the 5G-EmPOWER platform is given by Coronado et al. (E. Coronado, et al., 2019. "5G-EmPOWER: A Software-Defined Networking Platform for 5G Radio Access Networks," IEEE Transactions on Network and Service Management 16, 2 (June 2019), 715-728.). The provided implementation, however, only manages to accommodate a single BS and two UEs. Koutlia et al. describe an experimental testbed with slicing support (K. Koutlia, et al., 2019. "Design and Experimental Validation of a Software-Defined Radio Access Network Testbed with Slicing Support," Wireless Communications and Mobile Computing (June 2019), 1-17). However, its focus is on policy enforcement, slice provisioning and admission control. Moreover, slices are statically allocated and they cannot be reconfigured at run-time.

Finally, a centralized and cloud-based slicing framework based on network function virtualization is developed by Marinova et al. (Marinova, et al., 2020. "End-to-end Network Slicing for Future Wireless in Multi-region Cloud Platforms," Computer Networks 177, 107298 (August 2020), 1-10). Although this work allows the reconfiguration of the cellular network parameters at run-time, this requires restarting and redeploying the BSs of the network, with subsequent re-attachment of UEs. This operation causes a network downtime in the order of tens of seconds, hardly acceptable given the sub-millisecond latency requirements of 5G networks. Furthermore, no open APIs are offered to interface user-defined control logic.

SCOPE differentiates itself from the above literature work by providing open APIs for real-time reconfiguration of cross-layer network functionalities, as well as a portable and platform-independent containerized implementation. This allows SCOPE to be seamlessly instantiated on heterogeneous testbeds and platforms, and to adapt to their underlying physical infrastructure.

8 Road Ahead: SCOPE Integration with O-RAN and ONAP

In the last few years, several industry consortia have been focusing on developing solutions to redesign and revolutionize cellular networks. The most noteworthy of these solutions are O-RAN, which disaggregates network functionalities and enables their virtualized execution on different hardware components (O-RAN Alliance White Paper. 2018. "O-RAN: Towards an Open and Smart RAN," https://www.o-ran.org/resources.), and Open Network Automation Platform (ONAP), which orchestrates both the physical and virtual network infrastructure (ONAP. 2019. "Architecture Overview," https://www.onap.org/wp-content/uploads/sites/20/2019/07/ONAP_CaseSolution_Architecture_062519.pdf).

One of the main components introduced by O-RAN is the RAN Intelligent Controller (RIC), which enables centralized control of the RAN. This is divided in two parts: The non-real-time RIC and the near-real-time RIC. The non-real-time RIC performs control operations involving a larger time-granularity, such as the training of artificial intelligence methods on metrics and performance measurements from the RAN. The near-real-time RIC, instead, makes control-loop decisions at tighter time-scales interfacing with RAN primitives and APIs. This component can also host third-party applications, called xApps, which interact with the RAN APIs to control the 3GPP CU and DU.

There is, however, no open source cellular implementation that also includes the 3GPP functional split. Moreover, the latest O-RAN releases only provide implementation examples of basic network functionalities, thus, not allowing the integration of third-party components, such as SCOPE. However, it is worth mentioning that, although not being O-RAN-compliant, SCOPE is O-RAN-ready. Indeed, SCOPE APIs seamlessly interface with the RAN by using similar routines and structures as the ones defined at a high level for O-RAN xApps. This way, SCOPE will be able to swiftly interface both with future O-RAN releases and open source implementations of 3GPP CUs and DUs.

Finally, one of the most notable features that will be introduced by future releases of ONAP is its integration with O-RAN. This will include specifications to orchestrate RAN elements, such as CUs and DUs (ONAP. 2020. "Mobility Standards Harmonization with ONAP," https://wiki.onap.org/display/DW/MOBILITY+STANDARDS+ HARNIONIZATION+WITH+ONAP.). There are plans to extend SCOPE and integrate it with ONAP and O-RAN, thus, making it able to perform orchestration, virtualization and control of the 5G RAN.

9 Conclusions

As disclosed above, SCOPE is a softwarized cellular open prototyping toolkit for virtualized 5G networks. An example embodiment of SCOPE provides: (i) a ready-to-use portable open source container that can be configured to operate as open BS or UE, and (ii) a set of APIs to control and reprogram key functionalities of the cellular protocol stack at run-time, without requiring redeployment of the network. SCOPE includes data collection tools, such as dataset generation functions for recording cellular performance and metrics, and facilitate data analytics. As disclosed above, SCOPE was integrated in the Colosseum network emulator, which enables at scale repeatable experimentation over a large number of cellular deployments, channel and traffic conditions, which were also designed for realistic 5G scenarios. As disclosed above, the versatility and flexibility of SCOPE was demonstrated by porting it to real-world testbeds, both indoor (Arena) and outdoor (POWDER). Researchers can use SCOPE on Colosseum to design, implement, and test novel control solutions on large-scale real-world 5G scenarios of the design disclosed herein with different topology, mobility patterns, channel and traffic characteristics. Finally, the above disclosure discussed how SCOPE can be used for practical prototyping of machine learning, optimization and heuristic methods. Intelligence and learning in O-RAN for nextG cellular networks is disclosed below.

Intelligence and Learning in O-RAN for nextG Cellular Networks

Future cellular networks will be natively cloud-based and built upon programmable, virtualized, and disaggregated architectures. The separation of control plane functions from the hardware fabric and the introduction of standardized control interfaces will enable the definition of custom closed-control loops, which will ultimately enable embedded intelligence and real-time analytics, thus, effectively realizing the vision of autonomous and self-optimizing networks. This following disclosure explores the nextG disaggregated architecture proposed by the O-RAN Alliance. Within this architectural context, the disclosure discusses potential, challenges, and limitations of data-driven sequential optimization approaches to network control over different time scales. The following disclosure also provides the first large-scale demonstration of the integration of O-RAN compliant software components with an open-source full-stack softwarized cellular network. Experiments conducted on Colosseum, the world's largest wireless network emulator, demonstrate closed-loop integration of real-time analytics and control through deep reinforcement learning agents. The following disclosure demonstrates, for the first time, real-time RAN control through an xApp running on a near real-time RAN Intelligent Controller (RIC). The xApp controls scheduling decisions for multiple co-existing network slices in real-time by leveraging the O-RAN open interfaces to gather data collected at the edge of the network.

I. Introduction

The fifth (5G) and sixth generations (6G) of cellular networks will undoubtedly accelerate the transition from inflexible and monolithic network architectures to agile disaggregated architectures based on softwarization and virtualization, as well as on openness and re-programmability of network components (L. Bonati et al., "Open, Programmable, and Virtualized 5G Networks: State-of-the-Art and the Road Ahead," Computer Networks, vol. 182, pp. 1-18, December 2020).

Open, disaggregated, and flexible architectures are expected to become enablers of new functionalities, including the ability to: (i) provide on-demand virtual network slices to isolate different mobile virtual network operators or diverse network services and run-time traffic requirements to be provided on the same physical infrastructure; (ii) split network functions on multiple software and hardware components, possibly provided by multiple vendors; (iii) capture and expose network analytics not accessible in old-monolithic-architectures, and (iv) control the entire network physical infrastructure in real time via third party software applications and open interfaces.

In this context, the O-RAN Alliance—a consortium of industry and academic institutions—is working to realize a vision where telecom operators use standardized interfaces to open multi-vendor infrastructures to deliver high performance services to their mobile subscribers (O-RAN Working Group 1, "O-RAN Architecture Description—v2.00," O-RAN.WG1.O-RAN-Architecture-Description—v02.00 Technical Specification, July 2020). O-RAN embraces the 3rd Generation Partnership Project (3GPP) functional split, where the base station functionalities are divided across multiple network nodes, which facilitates the execution of diverse networking processes at different points of the network.

In the control plane, O-RAN enables RAN optimization with closed-control loops, i.e., autonomous action and feedback loops between the RAN components and their controllers. Overall, O-RAN envisions three control loops, operating at timescales that range from 1 ms—for Transmission Time Interval (TTI)-level control of transmission strategies and beamforming—to hundreds or thousands of milliseconds—to handle network slicing, traffic forecasting and hand-over management. O-RAN specifies how these loops can operate and interact through open interfaces, and has introduced additional architectural components, such as the RAN Intelligent Controllers (RICs), which allow operators to implement and deploy custom control logic.

Thanks to the above architecture design, O-RAN enables the development, training and deployment of data-driven and learning-based solutions in 5G and 6G RANs.

The introduction of programmable, closed-control loops through O-RAN could empower the life-cycle of typical Machine Learning (ML) and Artificial Intelligence (AI) solutions, from data collection and model training phase, to the actual online inference and optimization process.

The path toward a practical implementation of the envisioned data-driven, open, programmable and virtualized 5G and 6G networks is still being defined. Relevant aspects are in fact yet to be discussed in detail, including the exact functionalities and parameters that can be controlled on each network component, where to place the intelligence, how to validate and train data-driven control loop solutions, and where to store—and how to access—data generated by the RAN to make it available to AI methods while keeping the overhead at bay.

The following disclosure provides a systematic discussion on how data-driven, closed-control loop solutions can be implemented in 5G and 6G RANs. The disclosure focuses on the opportunities opened by the O-RAN architecture, including its functional split, the open interfaces and their role in the advancement of intelligent and programmable wireless networks. Differently from prior work introducing O-RAN architectures, principles and requirements (L. Bonati et al., "Open, Programmable, and Virtualized 5G Networks: State-of-the-Art and the Road Ahead," Computer Networks, vol. 182, pp. 1-18, December 2020), (S. Niknam et al., "Intelligent O-RAN for Beyond 5G and 6G Wireless Networks," arXiv:2005.08374 [eess.SP], May 2020), this disclosure also investigates the limitations of the current O-RAN specifications, and the challenges associated to data-driven policies throughout the whole RAN architecture. Core issues of data-driven policies are disclosed, i.e., the need for data collection, for development and testing platform, and the disclosure analyzes how large-scale experimental testbeds will play a vital role in this context. In fact, these testbeds, which include the PAWR platforms (J. Breen et al., "POWDER: Platform for Open Wireless Data-driven Experimental Research," in Proceedings of ACM WiNTECH, September 2020), (D. Raychaudhuri et al., "Challenge: COSMOS: A City-Scale Programmable Testbed for Experimentation with Advanced Wireless," in Proceedings of ACM MobiCom, London, United Kingdom, September 2020), (M. Sichitiu et al., "AERPAW Emulation Overview," in Proceedings of ACM WiNTECH, London, United Kingdom, September 2020), Colosseum,1 and Arena (L. Bertizzolo et al., "Arena: A 64-antenna SDR-based Ceiling Grid Testing Platform for Sub-6 GHz 5G-and-Beyond Radio Spectrum Research," Computer Networks, November 2020), offer the opportunity to generate massive datasets under a variety of network configurations and Radio Frequency (RF) conditions.

The following disclosure further provides a demonstration—possibly the first of its kind—of an O-RAN data-driven control loop in a large scale experimental testbed using open source, programmable RAN and RIC components. An example embodiment of an O-RAN system is deployed on Colosseum, and shows how a Deep Reinforcement Learning (DRL)-based closed-control loop improves throughput and resource utilization for three different slices of four base stations serving 40 User Equipments (UEs).

The following disclosure is organized as follows. First, the enablers of disaggregated and programmable 5G and 6G networks are presented. Then, a discussion of how intelligent control methods can be embedded at different layers of the protocol stack is presented, including how experimental testbeds will be crucial to the development of data-driven solutions. An experimental evaluation is provided and conclusions are drawn.

II. Disaggregation and Programmability

The introduction of data-driven, learning-based, programmable closed-control loops in mobile networks is being enabled by a paradigm shift in their design and deployment where the networking ecosystem is moving from a closed—"black-box"—monolithic architecture disclosed further below in FIG. 21A, to an open, disaggregated, and programmable approach, as disclosed in FIG. 21B further below.

The trend to move to such an open, disaggregated, and programmable approach is discussed further below in this section along with the architecture of next-generation open cellular networks. The integration of data-driven control will be instead described in the next section.

The traditional approach for cellular networks involved a rigid separation among the different entities that contributed to the network deployment, i.e., telecom vendors, operators, and chipset manufacturers (L. Bonati et al., "Open, Programmable, and Virtualized 5G Networks: State-of-the-Art and the Road Ahead," Computer Networks, vol. 182, pp. 1-18, December 2020). The performance optimization was mostly implemented by vendors during the equipment design process. As a result, the final appliances sold to operators (e.g., core network elements, or base stations) merely included a finite set of possible configurations, leaving the operators with little to no room for controlling the network, and limited decision capabilities mostly limited to deployment choices and network coverage. Such a closed and inflexible approach prevents agile control of the network, often results in sub-optimal performance and, most importantly, severely hinders the deployment of data-driven solutions (L. Bonati et al., "Open, Programmable, and Virtualized 5G Networks: State-of-the-Art and the Road Ahead," Computer Networks, vol. 182, pp. 1-18, December 2020). Indeed, the latter require large amounts of data, need coordination from multiple RAN components (M. Polese et al., "Machine Learning at the Edge: A Data-Driven Architecture with Applications to 5G Cellular Networks," IEEE Transactions on Mobile Computing, pp. 1-16, June 2020), and mandate programmability of each network element, so that control policies computed by AI and ML methods can be effectively enforced in real-time.

In the last 15 years, wired networks have made significant progress to enable programmability and closed-control loops through Software-defined Networking (SDN) and domain-specific languages (N. McKeown et al., "OpenFlow: Enabling Innovation in Campus Networks," ACM SIGCOMM Computer Communication Review, vol. 38, no. 2, pp. 69-74, March 2008). These allow a software-based definition of the behavior of switches and routers. On the other hand, cellular networks—bound by standard specifications—have lagged behind and only recently—mainly thanks to the efforts of the O-RAN Alliance and of the Open Networking Foundation—the discussion on how to define interfaces to enable programmability has picked up steam.

FIG. 21A is block diagram of a black box architecture 2100 of a closed, non-programmable RAN.

FIG. 21B is a block diagram of an example embodiment of an open, programmable Radio Access Network (RAN) architecture 2102. As detailed in FIG. 21B, the main characteristics of future open and programmable cellular architectures will heavily rely on three main ingredients: disaggregation of network elements and virtualization of their functionalities, open interfaces, and the integration of closed-control loops. Specifically, virtualization abstracts the software from the underlying hardware, enabling shared network operating systems running on top of a general-purpose infrastructure (L. Bonati et al., "CellOS: Zero-touch Softwarized Open Cellular Networks," Computer Networks, vol. 180, pp. 1-13, October 2020). In this way, the once monolithic base stations can be split into multiple virtual RAN functions, which can run in datacenters at the edge of the network, or be co-located with the radio unit deployed on the ground.

These ingredients are already finding their way into the standardization ecosystem. For example, the 3GPP already envisions a Next Generation Node Base (gNB) that is split into a Central Unit (CU), implementing the higher layers of the protocol stack, a Distributed Unit (DU), providing lower layers functionalities, and a Radio Unit (RU), with the lower part of the physical layer and the RF components. Each component and function is then connected one to another through well-defined and open interfaces that are standardized, for instance, by the 3GPP and the O-RAN Alliance (O-RAN Working Group 3, "O-RAN Near-Real-time RAN Intelligent Controller Architecture & E2 General Aspects and Principles—v1.01," O-RAN.WG3.E2GAP—v01.01 Technical Specification, July 2020.)

Disaggregation and openness are revolutionizing the way cellular networks are designed and operate. Indeed, they make it possible to adopt multi-vendor and operator-developed solutions for each specific network function, thus, fostering the development of custom and innovative solutions at each and every layer of the wireless protocol stack. For this reason, open interfaces are designed and standardized not only to provide seamless integration of network components, but also to support the integration of closed-control loops. An example that is worth being mentioned is the O-RAN RICs which, among others, perform control tasks in concert with the CUs and DUs of the network. In the next section, a discussion of how these ingredients can be used to deploy data-driven control in cellular networks is provided.

III. Intelligent Wireless Architectures

Openness, programmability, and disaggregation are indeed enablers for data-driven applications, but alone they are only a first step toward the seamless integration of AI and ML-based control loops in cellular networks.

Typically, data-driven approaches involve several well-established routines, ranging from data collection, processing, training, model deployment, to closed-loop control. This section illustrates how O-RAN is steering 5G deployments to bring intelligence to the network, but it also discusses possible extensions to other control-loops that are not currently considered by O-RAN.

Figure 22:
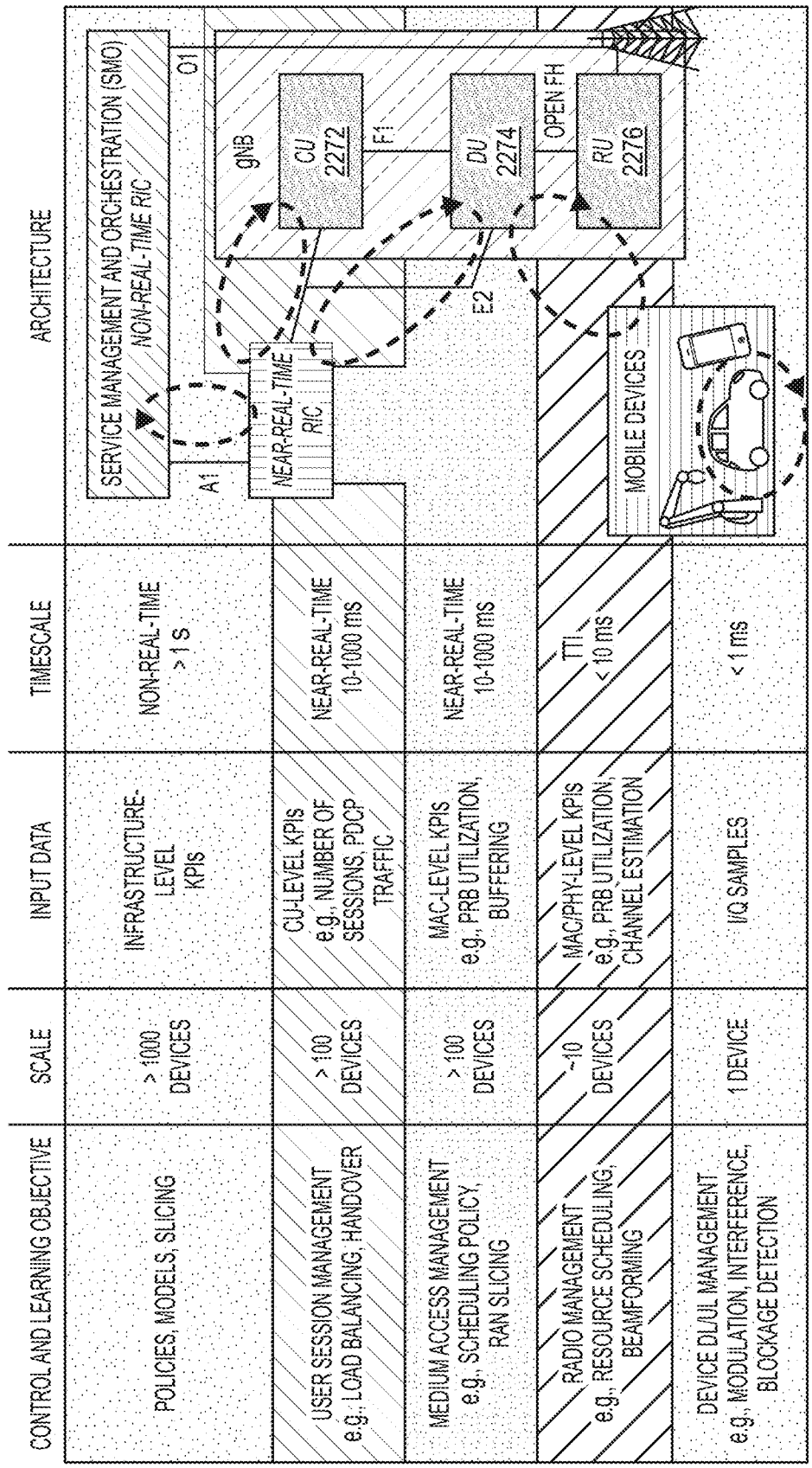
FIG. 22 is a table of characteristics associated with an example embodiment of learning-based closed-control loops in an open RAN (O-RAN) architecture.

FIG. 22 is a table 2200 of characteristics associated with an example embodiment of learning-based closed-control loops in an open RAN architecture. FIG. 22 provides an overview of how the intelligence can be embedded at different layers and in different nodes in a wireless network. Each closed-control loop optimizes RAN parameters and operations at different scales in terms of timing requirements and number of users, and uses diverse input data generated at different locations of the network. In this context, the O-RAN Alliance is also standardizing the data-driven workflow for these control loops. Presently, O-RAN only considers non- and near-real-time loops, while the TTI-level loop is left for future studies. FIG. 22 also reports an additional inference timescale not considered by O-RAN, i.e., below 1 ms, for those control objectives where raw I/Q samples are processed to perform AI-driven physical layer tasks. Even though this latter class of control objectives has proved beneficial for some applications (e.g., modulation and interference recognition (T. O'Shea and J. Hoydis, "An Introduction to Deep Learning for the Physical Layer," IEEE Trans. Cogn. Commun. Netw., vol. 3, no. 4, pp. 563-575, October 2017)), this control loop is out of the scope of the O-RAN architecture, as it requires device- and/or RUs-level standardization.

Besides the time scale, the effectiveness of data-driven approaches also depends on how data is handled, starting from data aggregation at the RAN (where data is generated) to the point where it is processed for model training and inference. However, collecting and moving data might result in significant overhead and latency costs. Hence, data-driven architectures must cope with tradeoffs between centralized approaches—providing a comprehensive view of the state of the network at the cost of overhead and latency—and distributed ones—which operate at the edge only, gather data from a small number of sources but enjoy low latency.

In this context, the O-RAN ML specifications (O-RAN Working Group 2, "O-RAN AI/ML Workflow Description and Requirements—v1.01," O-RAN.WG2.AIML—v01.01 Technical Specification, April 2020) introduce operational guidelines for the deployment of ML and AI in the network. These include practical considerations on how, where and when models can be trained, tested, and eventually deployed in the network. First, ML/AI models are made available to operators via a marketplace system similar to that of the well-established Network Function Virtualization (NFV) Management and Orchestration (MANO) architecture, where models are stored into a catalog together with details on their control objectives, required resources, and expected inputs and outputs. Second, any data-driven application and model needs to be trained offline, to avoid inefficiencies—or even outages—to the RAN. Although this embeds an additional layer of safety and reliability into RAN operations, it also limits the effectiveness of ML/AI approaches—especially online ones—as all models must always be pre-trained in advance on static data.

To better highlight the potential and limitations of the approach proposed by O-RAN, the following section analyzes the role of each node in the O-RAN ML pipeline, the data that is available at each level, and what could be done to extend it to fully implement the data-driven approaches illustrated in FIG. 22.

A. Non-Real-Time Control Loop

The O-RAN Alliance defines as non-real-time a control loop that operates on a timescale of at least one second. As shown in FIG. 22, this involves the coordination between the non-real-time RIC and the near-real-time RIC through the AI interface. This control loop manages the orchestration of resources at the infrastructure level, making decisions and applying policies that impact thousands of devices. These actions can be performed using data-driven optimization methods processing data from multiple sources, and inference models deployed on the non-real-time RIC itself.

Practical examples of non-real-time data-driven control include instantiating and orchestrating network slices, as well as selecting which pre-trained inference models in the catalog should be deployed to accomplish operator intents and decide in which instances of the near-real-time RIC these models should be executed. The above decisions can be made according to a variety of factors, ranging from computational resources and data availability to minimum performance requirements to comply with Service Level Agreements (SLAs). Moreover, since the non-real-time RIC is endowed with Service Management and Orchestration (SMO) capabilities, this control loop can also handle the association between the near-real-time RIC and the DUs/CUs. This is particularly useful, for instance, in virtualized systems where DUs and CUs are dynamically instantiated on-demand to match the requests and load of the RAN.

B. Near-Real-Time Control Loops

Near-real-time control loops operate on a timescale between 10 ms and 1 s. As shown in FIG. 22, they run between the near-real-time RIC and two components of the gNBs: the CU 2272 and the DU 2274. Because one near-real-time RIC is associated to multiple gNBs, these control loops can make decisions affecting hundreds or thousands of UEs leveraging user-session aggregated data and Medium Access Control (MAC)/physical layer Key Performance Indicators (KPIs). Machine learning-based methods are implemented as external applications, i.e., xApps, and are deployed on the near-real-time RIC to deliver specific services such as inference, classification, and prediction pipelines to optimize the per-user quality of experience, controlling load balancing and handover processes, or the resource scheduling and beamforming design.

C. Sub-TTI Control Loops

A fundamental part of the operations of cellular networks involves actions at a sub-10 ms—or even sub-ms—time scale. In O-RAN, these are labeled as sub-TTI control loops, and mainly concern interactions between elements in the DU. Control loops at a similar timescale, however, could also be envisioned to operate between the DU 2272 and the RU 2276, or at the UEs (although these cases are not natively covered by O-RAN). Moreover, the deployment of ML models in the DU itself is not currently addressed by the O-RAN specifications and is left for future extensions.

Data-driven approaches at the lower layers of the protocol stack or at the device are extremely powerful and can be used, for instance, for data-driven scheduling decisions (S. Chinchali et al., "Cellular Network Traffic Scheduling With Deep Reinforcement Learning," in AAAI, 2018, pp. 766-774), and feedback-less detection of physical layer parameters (e.g., modulation and coding method) (T. O'Shea and J. Hoydis, "An Introduction to Deep Learning for the Physical Layer," IEEE Trans. Cogn. Commun. Netw., vol. 3, no. 4, pp. 563-575, October 2017).

IV. Open RAN Dataset Factories

As mentioned previously, online ML models could potentially introduce disruptive behaviors in the RAN especially in the first stages of the training process. For this reason, O-RAN requires all ML models to be trained and validated offline before their deployment, and allows on-line learning only if the model is loaded with pre-trained weights already. Training and testing of methods and data-driven closed-control loop policies, however, require large amounts of input data from different scenarios, with varying traffic patterns, requirements and user behaviors, so that the data-driven policy can better generalize once deployed in a real network. The development of O-RAN data-driven approaches, thus, requires wireless data factories that can capture such diverse environments.

In this context, wireless large-scale testbeds will play a vital role in the development, training, and testing of data-driven solutions. To this end, the U.S. National Science Foundation Platforms for Advanced Wireless Research (PAWR) program has, so far, overseen the development of three city-scale testbeds that already provide wireless data generation tools open and available to the research community at large (L. Bonati et al., "Open, Programmable, and Virtualized 5G Networks: State-of-the-Art and the Road Ahead," Computer Networks, vol. 182, pp. 1-18, December 2020). POWDER, deployed Salt Lake City, covers a campus area of 6 km2 with state-of-the-art Software-defined Radios (SDRs) and massive Multiple Input, Multiple Output (MIMO) radios, together with compute, storage, and cloud facilities (J. Breen et al., "POWDER: Platform for Open Wireless Data-driven Experimental Research," in Proceedings of ACM WiN-TECH, September 2020). This testbed already provides a partial integration with the O-RAN near-real-time RIC. COSMOS, in New York City, has capabilities to test ultra-high capacity (i.e., mmWave) and low-latency wireless networks, with an edge cloud deployment (D. Raychaudhuri et al., "Challenge: COSMOS: A City-Scale Programmable Testbed for Experimentation with Advanced Wireless," in Proceedings of ACM MobiCom, London, United Kingdom, September 2020). Finally, AER-PAW is currently being deployed in the Research Triangle in North Carolina, and will focus on aerial wireless communications (M. Sichitiu et al., "AERPAW Emulation Overview," in Proceedings of ACM WiNTECH, London, United Kingdom, September 2020).

In this disclosure, a fourth wireless research platform is leveraged, i.e., Colosseum, the world-largest wireless network emulator with hardware-in-the-loop. Colosseum includes 128 USRP X310 SDRs that can be used to run generic protocol stacks, all connected in a mesh topology through additional 128 USRPs X310 of the Massive Channel Emulator (MCHEM). The latter emulates realistic wireless environments, i.e., RF scenarios. Specifically, the wireless channel between each pair of devices is modeled through complex-valued Finite Impulse Response (FIR) filter taps. This way, scenarios are able to capture effects such as path loss, multipath, and fading as if the SDRs were operating in the real wireless environment. Finally, Colosseum is equipped with an edge datacenter, with 900 TB of storage and the capability of processing RF data at a rate of 52 TB/s, putting it in a privileged position to collect data and test ML algorithms on heterogeneous networks and devices.

V. Use Case: Scheduling Control in Sliced 5G Networks Through O-RAN RIC

This section showcases an example of a data-driven closed-loop control implemented using the O-RAN near-real-time RIC and an open cellular stack on Colosseum. A multi-slice 5G scenario is considered in which users request three different traffic types, i.e., high capacity Enhanced Mobile Broadband (eMBB), Ultra Reliable and Low Latency Communication (URLLC), and Machine-type Communications (MTC). The base stations serve each slice with a dedicated—and independent—scheduling policy, selecting among proportionally fair (PF), waterfilling (WF), and round robin (RR) (L. Bonati et al., "CellOS: Zero-touch Softwarized Open Cellular Networks," Computer Networks, vol. 180, pp. 1-13, October 2020). Also considered is the case where RAN slicing is in place and the number of Physical Resource Blocks (PRBs) allocated to each slice varies over time (S. D'Oro, F. Restuccia, and T. Melodia, "The Slice is Served: Enforcing Radio Access Network Slicing in Virtualized 5G Systems," in Proceedings of IEEE INFOCOM, Paris, France, May 2019). The feasibility of an example embodiment of a closed-control loop is demonstrated where a DRL agent running in an xApp on the near-real-time RIC selects the best-performing scheduling policy for each RAN slice.

Figure 23:
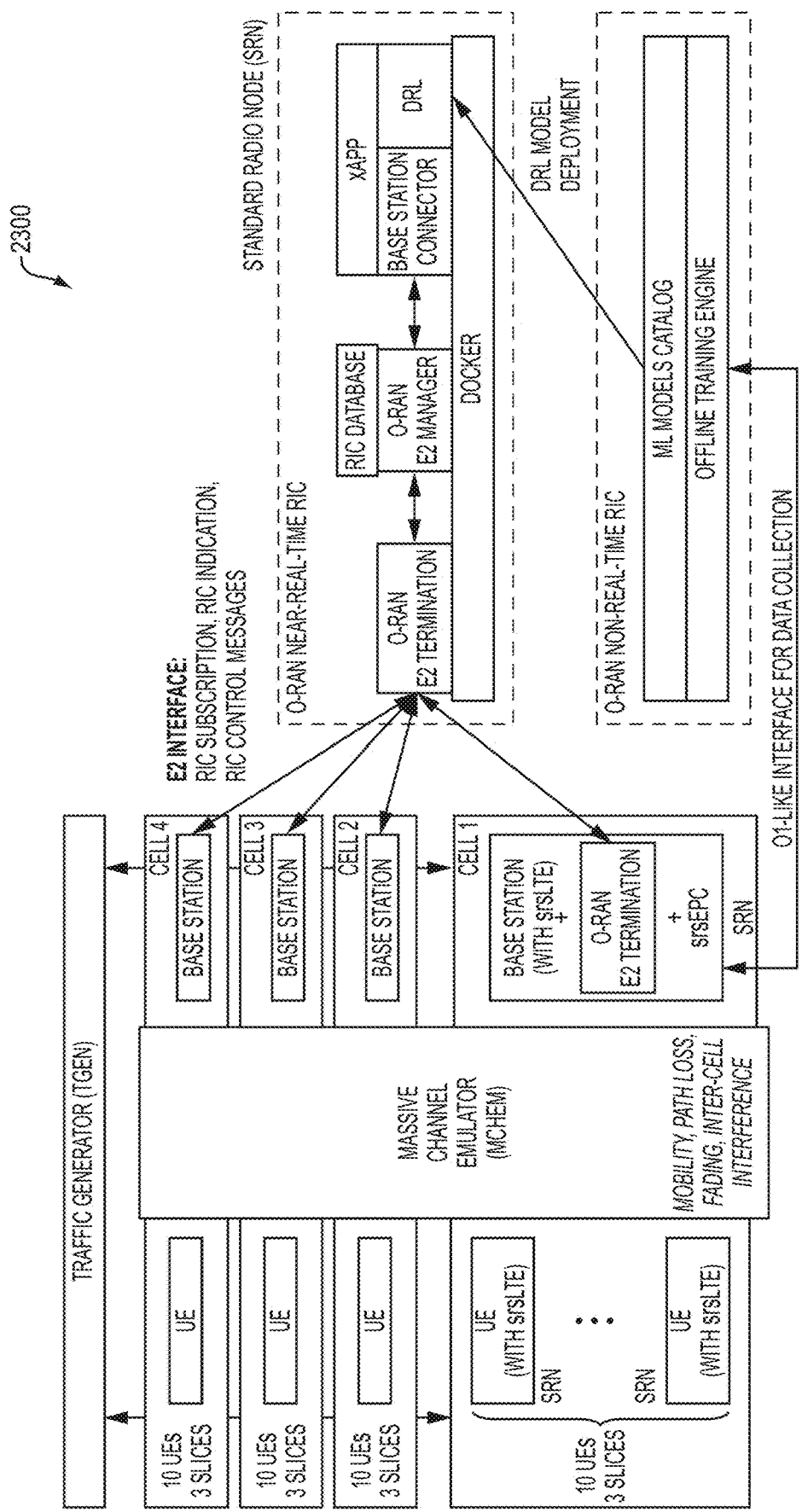
FIG. 23 is a block diagram of an example embodiment of O-RAN integration in Colosseum.

FIG. 23 is a block diagram of an example embodiment of O-RAN integration in Colosseum.

Experimental Setup. FIG. 23 details the O-RAN integration 2300 in Colosseum. A 5G cellular network with 4 base stations each serving 10 UEs in a dense urban scenario in Rome, Italy was emulated. Base stations and UEs have been implemented through srsLTE, an open-source framework which an example embodiment extended to include network slicing capabilities and additional scheduling policies (L. Bonati et al., "CellOS: Zero-touch Softwarized Open Cellular Networks," Computer Networks, vol. 180, pp. 1-13, October 2020). The scenario covered an area of 0.11 km2 and involved pedestrian user mobility. Traffic among base station and UEs is generated through Colosseum Traffic Generator (TGEN), configured to send different traffic types, i.e., eMBB, URLLC and MTC, to different slices of the RAN. For each base station, the UE-slice allocation is as follows: eMBB and URLLC slices serve 3 UEs each, while MTC slices serve 4 UEs. The case in which the RIC runs one xApp for each base station is considered, each containing 3

DRL agents taking scheduling decisions for a single RAN slice, for a total of 12 DRL agents running in parallel.

DRL Agent Training. To train the DRL agents, approximately 6 GB of training data was generated, containing various performance metrics (e.g., throughput, bit error rate), system state information (e.g., transmission queue size, signal-to-interference-plus-noise ratio, channel quality information) and resource allocation strategies (e.g., slicing policies, scheduling) by running a total of 63 hours of experiments on Colosseum. Each DRL agent was been trained via the Proximal Policy Optimization (PPO) method. Through the O-RAN E2 interface of FIG. 23, the agent is fed with real-time performance measurements related to the slice it controls. Data goes through an autoencoder for dimensionality reduction, the output is then used by the agent that identifies the state of the system and uses a fully connected neural network with, for non-limiting example, 5 layers and 30 neurons each to determine the best scheduling policy for the corresponding slice. The reward of the agents depends on the specific slice and the corresponding KPI requirements. Specifically, eMBB and MTC DRL agents have been trained to maximize the throughput of UEs, while URLLC agents have been trained to maximize the number of resources (i.e., PRBs) allocated to each UE and to satisfy their latency requirements. To fully comply with O-RAN directives, the DRL agents were trained offline, and their effectiveness then tested on Colosseum.

Figure 24:
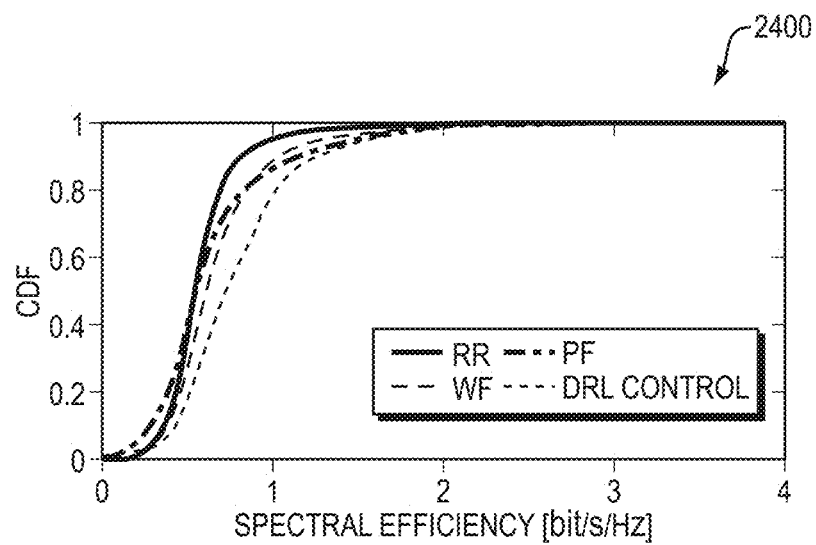
FIG. 24 is a graph of an example embodiment of downlink spectral efficiency of the enhanced Mobile Broad-band (eMBB) slice for different scheduling policies and with Deep Reinforcement Learning (DRL) control.

FIG. 24 is a graph 2400 of an example embodiment of downlink spectral efficiency of the eMBB slice for different scheduling policies and with DRL control.

Results. To demonstrate the benefits of closed-loop data-driven optimization in O-RAN applications, FIG. 24 shows the Cumulative Distribution Function (CDF) of the downlink spectral efficiency of the eMBB slice. The performance of the network when DRL agents dynamically select the best scheduling strategy among RR, PF and WF was compared against the case where scheduling strategies are fixed over time. FIG. 24 clearly indicates that data-driven optimization outperforms fixed policies by delivering higher spectral efficiency, with gains up to 20%. This is due to the fact that eMBB traffic requires high data-rates and DRL agents are capable of dynamically adapting scheduling decisions to the current network state and traffic demand.

Figure 25:
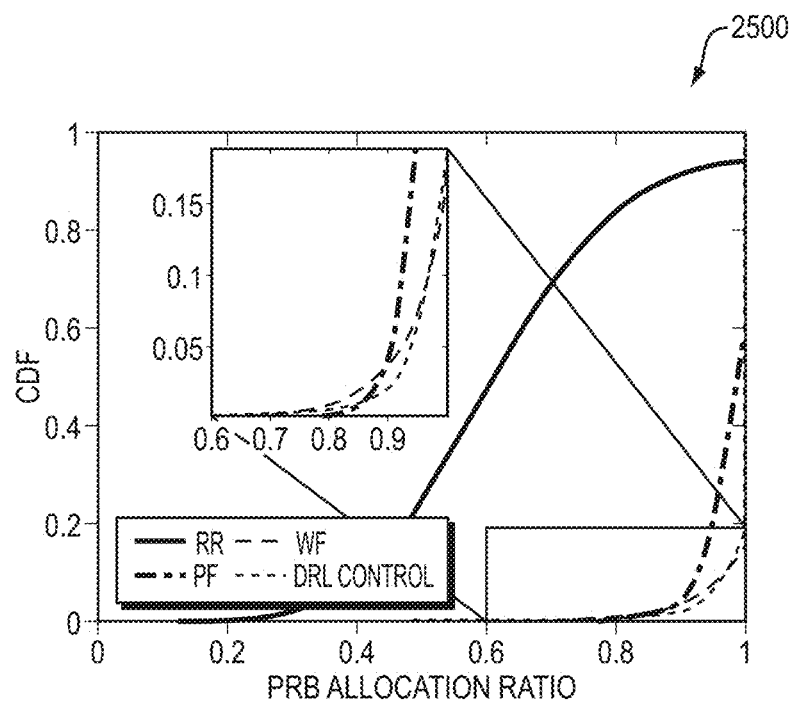
FIG. 25 is a graph of an example embodiment of Physical Resource Block (PRB) allocation ratio of the Ultra Reliable and Low Latency Communications (URLLC) slice for different scheduling policies and with DRL control.

FIG. 25 is a graph 2500 of an example embodiment of PRB allocation ratio of the URLLC slice for different scheduling policies and with DRL control. While RR is not capable of satisfying the requirements of the URLLC UEs, the DRL agent achieves the best performance overall and ensures that all UEs are granted with the resource they request. Although not reported here, additional results were also found to demonstrate that DRL reduces the downlink buffer occupancy at the base station by 20% on average if compared to RR, WF and PF.

Figure 26:
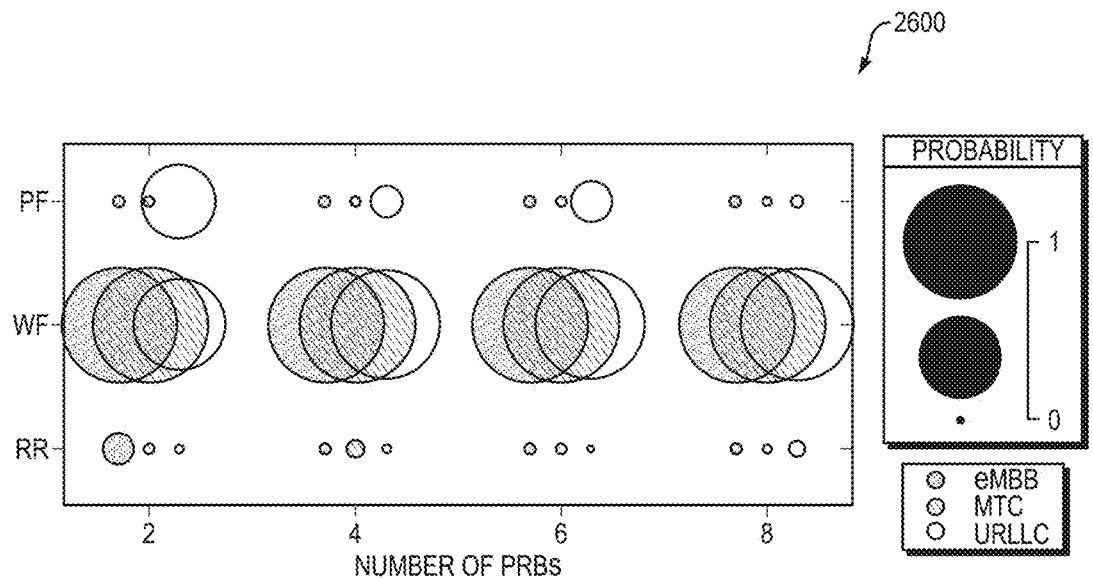
FIG. 26 is a graph of an example embodiment of DRL action selection distribution as a function of the number of PRBs assigned to each slice.

FIG. 26 is a graph 2600 of an example embodiment of DRL action selection distribution as a function of the number of PRBs assigned to each slice. FIG. 26 shows how often DRL agents select a specific scheduling policy as a function of the number of PRBs of each slice (the bigger the circle, the higher the probability of the agent selecting a given policy). The results show that while DRL agents seldom deviate from the WF scheduling policy for the MTC slice, agents making decisions on eMBB traffic select WF with high probability, while RR is sporadically selected when only a few PRBs are allocated to the slice. On the contrary, URLLC DRL agents are likely to select both PF and WF scheduling policies even when more PRBs are available.

VI. Conclusions

Disclosed above is a systematic discussion on the path that can lead to a practical integration of closed-control loops in cellular networks, effectively implementing the vision of self-optimizing and autonomous net-works. The key enablers, i.e., the virtualization, disaggregation, openness and re-programmability, of 5G and 6G cellular networks were reviewed first, with specific focus on O-RAN. The data-driven control loops that can be implemented were discussed, as well as their timescale, and whether the current O-RAN architecture supports them. Finally, the disclosure above showcased how large-scale experimental testbeds can be used to develop and validate data-driven methods by deploying O-RAN RIC on Colosseum. The systematic discussion and the experimental evaluation of closed-control loops can provide a strong foundation for future research toward data-driven, autonomous, and self-optimizing cellular networks. The following disclosure relates to intelligence in the Open RAN.

Intelligence in the Open RAN: Lessons Learned from Large-Scale Experimental Platforms Cellular networks are undergoing a radical transformation toward disaggregated, fully virtualized, and reprogrammable architectures with increasingly heterogeneous devices and applications. In this context, the Open Radio Access Network (RAN) architecture standardized by the O-RAN Alliance enables method-based and hardware-independent RAN adaptation through closed-loop control. O-RAN makes it possible to deploy Machine Learning (ML)-based network control and automation methods as so-called xApps running on RAN Intelligent Controllers (RICs). In spite of the new opportunities brought about by Open RAN architectures, advances in ML-based network automation techniques are being delayed by the lack of large-scale datasets and experimental testing infrastructure. This slows down the training and deployment of Deep Reinforcement Learning (DRL) agents on real networks and stymies the adoption of intelligent and autonomous RAN control solutions. The disclosure below bridges this gap by introducing ColORAN, the first open, large-scale O-RAN testbed based on Software-defined Radios (SDRs) in the Colosseum emulation platform. ColORAN enables ML research using elements of the O-RAN architecture and programmable base stations, with an experimental setup that is easily portable across software-defined platforms. An example embodiment includes a design of 3 xApps for DRL-based control of slicing, scheduling and online model training, for non-limiting example and provides a comprehensive overview of the lessons learned by deploying ColORAN on a cellular network with 7 softwarized base stations and 42 users. Results from this unprecedented large-scale evaluation highlight the benefits and challenges of DRL-based adaptive control, and provide insights on the development of wireless ML pipelines, from data analysis to the design of DRL agents, and on the tradeoffs associated to training on a live RAN.

I. Introduction

Cellular systems are becoming more pervasive, encompassing not only traditional human-to-human connectivity, but also industrial and agricultural automation, interconnecting millions of sensors, vehicles, airplanes, and drones, providing the nervous system for a plethora of smart systems (Ericsson, "Ericsson mobility report," June 2021. [Online]. Available: https://www.ericsson.com/en/mobility-report), (M. Giordani, et al., "Toward 6G networks: Use cases and technologies," IEEE Comm. Mag., vol. 58, no. 3, pp. 55-61, March 2020). These different use cases, however, often come with diverse—possibly orthogonal—network constraints and requirements (Z. Xiong et al., "Deep reinforcement learning for mobile 5G and beyond: Fundamentals, applications, and challenges," IEEE Vehic. Tech. Mag., vol. 14, no. 2, pp. 44-52, June 2019). For instance, autonomous driving applications require Ultra Reliable and Low Latency Communications (URLLC) to allow vehicles to promptly react to traffic conditions. On the other hand, high-quality multimedia content requires high data rates, but can tolerate a higher packet loss and latency. Therefore, future generations of cellular networks need to be flexible and adaptive to many different application requirements.

Background and Motivation. Future Radio Access Networks (RANs) will benefit from combining three key ingredients (L. Bonati, et al., "Open, programmable, and virtualized 5G networks: State-of-the-art and the road ahead," Computer Networks, vol. 182, pp. 1-28, December 2020): (i) programmable and virtualized protocol stacks with clearly defined, open interfaces; (ii) closed-loop network control, and (iii) data-driven modeling and Machine Learning (ML). The first ingredient will allow swift, programmable adaptation of the RAN to provide bespoke solutions able to satisfy the requirements of specific deployments and instantiate services on demand. The second will use telemetry measurements from the RAN to reconfigure cellular nodes, adapting their behavior to network conditions and traffic. The third will leverage recent developments in ML and big data to enable real-time, closed-loop, and dynamic decision-making based, for instance, on Deep Reinforcement Learning (DRL) (O-RAN Working Group 2, "O-RAN AI/ML workflow description and requirements—v1.01," O-RAN.WG2.AIML—v01.01 Technical Specification, April 2020). These are the very same principles that constitute the heart and soul of the Open RAN paradigm, which has recently been under the spotlight as a practical enabler of innovation in future cellular networks (S. Niknam et al., "Intelligent O-RAN for beyond 5G and 6G wireless networks," arXiv:2005.08374 [eess.SP], May 2020), L. Bonati, et al., "Intelligence and learning in O-RAN for data-driven NextG cellular networks," arXiv:2012.01263 [cs.NI], December 2020, H. Zhou, M. Elsayed, and M. Erol-Kantarci, "RAN resource slicing in 5G using multi-agent correlated Q-learning," in Proc. IEEE Intl. Symp. on Personal, Indoor and Mobile Radio Communications (PIMRC), Virtual Conference, September 2021). In this domain, the 3GPP has evolved its base station design toward a disaggregated and flexible solution, split into Central Unit (CU), Distributed Unit (DU), and Radio Unit (RU). The O-RAN Alliance is standardizing open interfaces that connect these heterogeneous nodes to a common control overlay, the RAN Intelligent Controller (RIC), capable of onboarding custom control logic via so-called xApps. These efforts will render the monolithic RAN "black box" obsolete, favoring open, programmable and virtualized solutions that expose status and offer control knobs through standardized interfaces (L. Bonati, et al., "Open, programmable, and virtualized 5G networks: State-of-the-art and the road ahead," Computer Networks, vol. 182, pp. 1-28, December 2020).

Although intelligent, dynamic network optimization via add-on software xApps is revolutionary—and an enabler for future network automation—it also introduces novel practical challenges concerning, for instance, the deployment of data-driven ML solutions at scale. Domain-specific challenges stem from considering the constraints of standardized RANs, the very nature of the wireless ecosystem and the complex interplay among different elements of the networking stack. These challenges, all yet to be addressed in practical RAN deployments, include:

1) Collecting datasets at scale. Datasets for ML training/testing at scale need to be carefully collected and curated to accurately represent the intrinsic randomness and behavior of real-world RANs.
2) Need for testing ML-based control at scale. Even if ML methods are trained on properly collected data, it is necessary to assess the robustness of such models at scale, especially when considering closed-loop control, to ascertain that poor data-driven solutions do not result in outages and inefficiencies.
3) Designing ML agents capable of generalizing. ML agents should be able to generalize and adapt to deployment configurations that may not have been part of the training set.
4) Selecting meaningful features. Features should be accurately selected to provide a meaningful representation of the network status without incurring into dimensionality issues.
5) Designing efficient ML agents with unreliable input and constrained output. In production systems, real-time collection of data from the RAN may be inconsistent (e.g., with varying periodicity) or incomplete (e.g., missing entries), and control actions may be constrained by standard specification.

Contributions. To address the key challenges that impede progress toward intelligent and fully automated cellular networks, the following disclosure describes the development and experiences in deploying a first-of-its-kind softwarized pipeline on a large-scale experimental platform to train and test DRL agents for closed-loop control in O-RAN. An example embodiment builds on results and lessons learned by deploying an O-RAN-managed cellular infrastructure in a wireless data factory. Specifically, for non-limiting example, a 49-node cellular network is deployed on Colosseum, the world's largest, open, and remotely accessible wireless network emulator based on Software-defined Radios (SDRs) (Colosseum. https://www.colosseum.net. Accessed July 2020), and optimizes its performance at runtime through data-driven control loops running on the O-RAN near real-time RIC. Based on this experience, the disclosure reviews and discusses key lessons learned in the domain of ML-driven networks. Notable contributions are as follows:

ColORAN is introduced, the first open, large-scale, experimental O-RAN testbed. ColORAN combines O-RAN components, a softwarized RAN framework (L. Bonati, et al., "SCOPE: An open and softwarized prototyping platform for NextG systems," in Proc. of ACM Intl. Conf. on Mobile Systems, Applications, and Services (MobiSys), Virtual Conference, June 2021), and Colosseum into a first-of-its-kind platform for training and testing ML solutions for next-generation RANs. An example embodiment uses Colosseum as a wireless data factory to generate large-scale datasets for ML training in a variety of Radio Frequency (RF) environments, taking into account propagation and fading of real-world deployments. The ML models are deployed as xApps on the near-real-time RIC, which connects to RAN nodes through O-RAN-compliant interfaces for data collection and closed-loop control. ColORAN is the first platform that enables wireless researchers to deploy and test ML solutions on a full-stack, fully virtualized O-RAN environment. It also embeds tools for large-scale data collection analysis, and can be easily deployed on other experimental platforms.

A non-limiting example embodiment develops three xApps for closed-loop control of RAN scheduling and slicing, and for the online training of DRL agents on live production environments.

An example embodiment utilizes ColORAN to provide insights on the design and performance of DRL agents for adaptive RAN control at scale. For non-limiting example, agents were trained over an 11 GB dataset with more than 100 hours of live RAN performance traces, and one of the first evaluations of DRL agents autonomously driving a programmable, software-defined RAN, was performed. Lessons learned from this evaluation span from the design to the deployment of DRL agents for RAN control. They include new understandings of data analysis and feature selection, modeling of control actions for DRL agents, and design strategies to train ML methods that generalize and operate even with unreliable data.

Disclosed below is an analysis of the tradeoffs for the training of DRL agents on live networks, using Colosseum and another publicly available, remotely accessible, over-the-air indoor testbed with commercial smartphones (L. Bertizzolo et al., "Arena: A 64-antenna SDR-based ceiling grid testing platform for sub-6 GHz 5G-and-beyond radio spectrum research," Computer Networks, vol. 181, pp. 1-17, November 2020). The RAN performance during the DRL exploration phase and after the training was profiled as disclosed below. The disclosure shows how an online training step can adapt a pre-trained model to deployment-specific parameters, fine-tuning its weight and improving the agent performance, at the cost of a degraded RAN performance during online training.

Key takeaways the work highlight (i) the effectiveness of adaptive control policies over static—yet optimized—configurations; (ii) the impact of different design choices of DRL agents on the end-to-end network performance, and (iii) the importance of online DRL training in wireless environments. These insights and the research infrastructure developed in this work may catalyze the deployment of ML-enabled control loops in next generation networks.

The following sections are disclosed as follows. Section II describes the development of ML solutions in O-RAN-based networks. Section III introduces ColORAN. Large-scale evaluation and lessons learned are discussed in Sections IV and V. Section VI reviews related work. Section VII draws conclusions.

II. Machine Learning Pipelines for Open RAN

Figure 27:
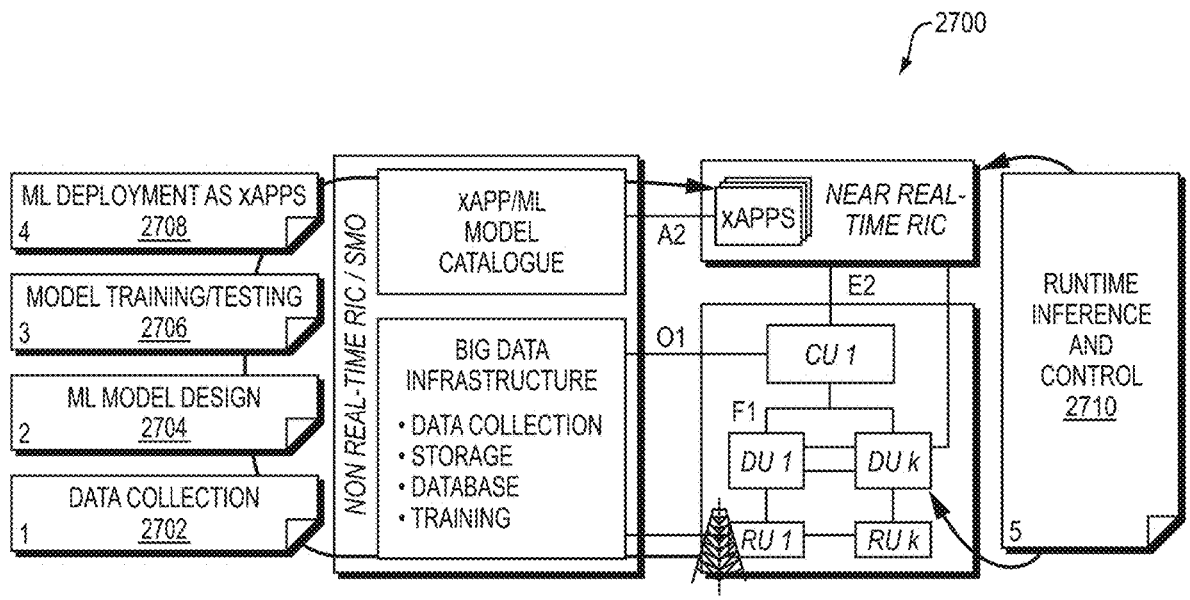
FIG. 27 is a block diagram of an example embodiment of the O-RAN architecture and workflow for the design, development, and deployment of ML applications in next generation wireless networks.

The deployment of machine learning models in wireless networks is a multi-step process, as disclosed in FIG. 27.

FIG. 27 is a block diagram 2700 of an example embodiment of the O-RAN architecture and workflow for the design, development, and deployment of ML applications in next generation wireless networks. The workflow involves data collection 2702, the design of the model 2704, its offline or online training 2706, and deployment 2708 for runtime inference and control 2710. The O-RAN architecture, also shown in FIG. 27, has been developed to aid the overall deployment process, focusing on open interfaces for data collection and deployment steps. In the following disclosure, the O-RAN architecture is described, and how it facilitates training and deploying ML models in the RAN is discussed.

A. O-RAN Overview

The O-RAN Alliance, a consortium of academic and industry members, has been pushing forward the concept of an open and programmable cellular ecosystem since its inception in 2018. O-RAN-compliant equipment is based on open and standardized interfaces that enable interoperability of equipment from different vendors and interaction with RAN controllers, which manage the RAN itself. The O-RAN specifications introduce two RICs that perform network control procedures over different time scales, i.e., near real-time and non real-time, respectively (O-RAN Working Group 1, "O-RAN Architecture Description—v2.00," O-RAN.WG1.O-RAN-Architecture-Description—v02.00 Technical Specification, July 2020). The non real-time RIC performs operations at time scales larger than 1 s and can involve thousands of devices. Examples include Service Management and Orchestration (SMO), policy management, training, and deployment of ML models. The near real-time RIC, instead, implements tight control loops that span from 10 ms to 1 s, involving hundreds of CUs/DUs. Procedures for load balancing, handover, RAN slicing policies and scheduler configuration are examples of near real-time RIC operations (O-RAN Alliance White Paper, "O-RAN use cases and deployment scenarios," https://tinyurl.com/8cmtxmyp, February 2020). The near real-time RIC can also host third-party applications, i.e., xApps. xApps implement control logic through heuristics or data-driven control loops, as well as collect and analyze data from the RAN.

The components of the O-RAN architecture are connected via open and standardized interfaces. The non real-time RIC uses the O1 interface to collect data in bulk from RAN nodes and to provision services and network functions. The near real-time RIC connects to CUs and DUs through the E2 interface, which supports different Service Models (SMs), i.e., functionalities like reporting of Key Performance Measurements (KPMs) from RAN nodes and the control of their parameters (O-RAN Working Group 3, "O-RAN near-real-time RAN intelligent controller E2 service model (E2SM) KPM v01.00.00 Technical Specification, February 2020). The two RICs connect through the A1 interface for the deployment of policies and xApps on the near real-time RIC.

B. ML Pipelines in O-RAN

The O-RAN specifications include guidelines for the management of ML models in cellular networks. Use cases and applications include Quality of Service (QoS) optimization and prediction, traffic steering, handover, and radio fingerprinting (O-RAN Working Group 2, "O-RAN AI/ML workflow description and requirements—v1.01," O-RAN.WG2.AIML—v01.01 Technical Specification, April 2020). The specifications describe the ML workflow for O-RAN through five actions as shown in FIG. 27, namely: (1) data collection; (2) model design; (3) model training and testing; (4) model deployment as xApp, and (5) runtime inference and control.

First, data is collected for different configurations and setups of the RAN (e.g., large/small scale, different traffic, action 1). Data is generated by the RAN nodes, i.e., CUs, DUs and RUs, and streamed to the non real-time RIC through the O1 interface, where it is organized in large datasets. After enough data has been collected, an ML model is designed (action 2). This entails the following: (i) identifying the RAN parameters to input to the model (e.g., throughput, latency, etc.); (ii) identifying the RAN parameters to control as output (e.g., RAN slicing and scheduling policies), and (iii) the actual ML method implementation. Once the model has been designed and implemented, it is trained and tested on the collected data (action 3). This involves selecting the model hyperparameters (e.g., the depth and number of layers of the neural network) and training the model on a portion of the collected data until a (satisfactory) level of convergence of the model has been reached. After the model has been trained, it is tested on an unseen portion of the collected data to verify that it is able to generalize and react to potentially unforeseen situations. Then, the model is packaged into an xApp ready to run on the near real-time RIC (action 4). After the xApp has been created, it is deployed on the O-RAN infrastructure. In this phase, the model is first stored in the xApp catalogue of the non real-time RIC, and then instantiated on demand on the near real-time RIC, where it is interfaced with the RAN through the E2 interface to perform runtime inference and control based on the current network conditions (action 5).

III. ColORAN: Enabling Large-Scale ML Research with O-RAN and Colosseum

The ML pipeline described in Section II-B involves a number of critical actions whose execution requires joint access to comprehensive datasets and testing facilities at scale, still largely unavailable to the research community. In fact, even major telecom operators or infrastructure owners might not be able to dedicate (parts of) their extensive commercial networks to training and testing of ML methods. This stems from the lack of adequate solutions to separate testing from commercial service and to prevent performance degradation. As a consequence, researchers and innovators are constrained to work with small ad hoc datasets collected in contained lab setups, resulting in solutions that hardly generalize to real-world deployments (J. Wang et al., "Thirty years of machine learning: The road to Pareto-optimal wireless networks," IEEE Commun. Surveys Tuts., vol. 22, no. 3, pp. 1472-1514, Third quarter 2020). To address this limitation, this section introduces ColORAN, a large-scale research infrastructure to train, deploy, and test state-of-the-art wireless ML solutions. The main features of Colosseum are first reviewed and its use described as a wireless data factory for ColORAN (Section III-A). Then, the implementation of the ColORAN virtualized O-RAN infrastructure on Colosseum (Section III-B) and of the xApps (Section III-C) is introduced. The scenario for data collection used to illustrate the usage of ColORAN (Section III-D) is then described.

A. Colosseum as a Wireless Data Factory

Colosseum is the world's largest wireless network emulator (Colosseum. https://www.colosseum.net. Accessed July 2020). It was developed by DARPA for the Spectrum Collaboration Challenge and then transitioned to the NSF PAWR program to be available for the research community. Colosseum is made up of 256 USRPs X310 SDRs. Half of the SDRs can be controlled by the users, while the other half is part of the Massive Channel Emulator (MCHEM), which uses 64 Virtex-7 FPGAs to emulate wireless channels. MCHEM processes the signal transmitted by radio nodes, called Standard Radio Nodes (SRNs), through a set of complex-valued finite impulse response filter banks. These model propagation characteristics and multi-path scattering of user-defined wireless environments. Thus, MCHEM provides high-fidelity emulation of wireless signals with the same characteristics of those traveling through a real environment. Colosseum also features a user-controlled source Traffic Generator (TGEN), based on MGEN (U.S. Naval Research Laboratory, "MGEN Traffic Emulator." [Online]. Available: https://tinyurl.com/beexe8yc), and compute capabilities that make it a full-fledged specialized data center with over 170 high-performance servers.

The combination of programmable software-defined hardware with RF and traffic scenarios uniquely positions Colosseum as a wireless data factory, namely, as a tool that can be used to effectively collect full-stack datasets in heterogeneous and diverse scenarios. With respect to other large testbeds such as the PAWR platforms, Colosseum offers scale and a more controlled and customizable environment that researchers can use to collect data and to test ML methods on different RF scenarios and frequencies, without changing the protocol stack or experimental procedures. Compared to a production network, Colosseum is flexible, with programmable radios that can run different software-defined stacks, and the possibility to test closed-loop control without affecting commercial deployments.

B. O-RAN-Based Colosseum ML Infrastructure

Besides enabling large-scale data collection, Colosseum also provides a hybrid RF and compute environment for the deployment of ColORAN, a complete end-to-end ML infrastructure. ColORAN provides researchers with a ready-to-use environment to develop and test ML solutions, following the actions of FIG. 27 (Section II-B). These include the deployment on a 3GPP-compliant RAN and testing in heterogeneous emulated environments. Moreover, ColORAN is based on virtualized and containerized components, and it can be ported to other testbeds with minimal changes. The software, compute and networking components of an example embodiment of an end-to-end infrastructure are shown in FIG. 28, disclosed below.

FIG. 28 is a block diagram 2800 of an example embodiment of integration of the O-RAN infrastructure in Colosseum. The SMO (left) features three compute nodes to train large ML models, 64 Terabyte of storage for models and datasets, and the xApp catalogue. The near real-time RIC (FIG. 28, center) provides E2 connectivity to the RAN and support for multiple xApps interacting with the base stations. It is implemented as a standalone Linux Container (LXC) that can be deployed on a Colosseum SRN. It features multiple Docker containers for the E2 termination and manager, the E2 message routing to handle messages internal to the RIC, a Redis database, which keeps a record of the nodes connected to the RIC, and the xApps (Section III-C). The implementation of the near real-time RIC is based on the Bronze release of the O-RAN Software Community (OSC) (O-RAN Software Community. Bronze release. https://wiki.o-ransc.org/pages/viewpage.action?pageId=14221635. Accessed July 2021), which an example embodiment extends to support concurrent connections from multiple base stations and xApps and to provide improved support for encoding, decoding, and routing of control messages.

The near real-time RIC connects to the RAN base stations through the E2 interface (FIG. 28, right). The base stations leverage a joint implementation of the 3GPP DUs and CUs. These nodes run the publicly available SCOPE framework (L. Bonati, et al., "SCOPE: An open and softwarized prototyping platform for NextG systems," in Proc. of ACM Intl. Conf. on Mobile Systems, Applications, and Services (MobiSys), Virtual Conference, June 2021), which extends srsRAN (I. Gomez-Miguelez et al., "srsLTE: An open-source platform for LTE evolution and experimentation," in Proc. of ACM Intl. Workshop on Wireless Network Testbeds, Experimental evaluation & Characterization (WiNTECH), New York City, N.Y., USA, October 2016) with open interfaces for runtime reconfiguration of base station parameters and automatic collection of relevant KPMs. Moreover, an example embodiment leverages and extends the E2 termination of the OSC DU (O-RAN Software Community. O-DU-L2 Documentation. https://docs.o-ran-sc.org/projects/o-ran-sc-o-du-l2/en/latest/index.html. Accessed July 2021) to reconfigure the base stations directly from the near real-time RIC and for periodic data reporting. The E2 termination allows the setup procedure and registration of the base stations with the near real-time RIC. An example embodiment of the implementation also features two custom SMs (as discussed next) for trigger-based or periodic reporting, and control events in the base stations. This effectively enables data-driven real-time control loops between the base stations and the xApps. The RAN supports network slicing with 3 slices for different QoS: (i) eMBB, representing users requesting video traffic; (ii) MTC for sensing applications, and (iii) URLLC for latency-constrained applications. For each slice, the base stations can adopt 3 different scheduling policies independently of that of the other slices, namely, the Round Robin (RR), the Waterfilling (WF), and the Proportional Fair (PF) scheduling policies. Finally, the base stations connect to the RF frontends (USRPs X310) that perform signal transmission and reception.

C. xApps

The xApps deployed on the near real-time RIC are the heart of the O-RAN-based RAN control loops. For non-limiting example, three xApps were developed to evaluate the impact of different ML strategies for closed-loop RAN control as shown in Table I disclosed below with reference to FIG. 29A.

FIG. 29A is a table 2900, namely the Table I, of an example embodiment of a catalogue of developed xApps. Each xApp can receive data and control RAN nodes with two custom SMs, which resemble the O-RAN KPM and RAN control SMs (O-RAN Working Group 3, "O-RAN near-real-time RAN intelligent con-troller E2 service model (E2SM) KPM 1.0," ORAN-WG3.E2SM-KPM—v01.00.00 Technical Specification, February 2020). The control actions available to the xApps are the selection of the slicing policy (the number of PRB allocated to each slice) and of the scheduling policy (which scheduler is used for each slice).

The xApps have been developed by extending the OSC basic xApp framework (—.xApp Framework. https://wiki.o-ran-sc.org/display/ORANSDK/xAppFramework. Accessed July 2021), and include two components as shown in FIG. 29B, disclosed below.

Figure 29B:
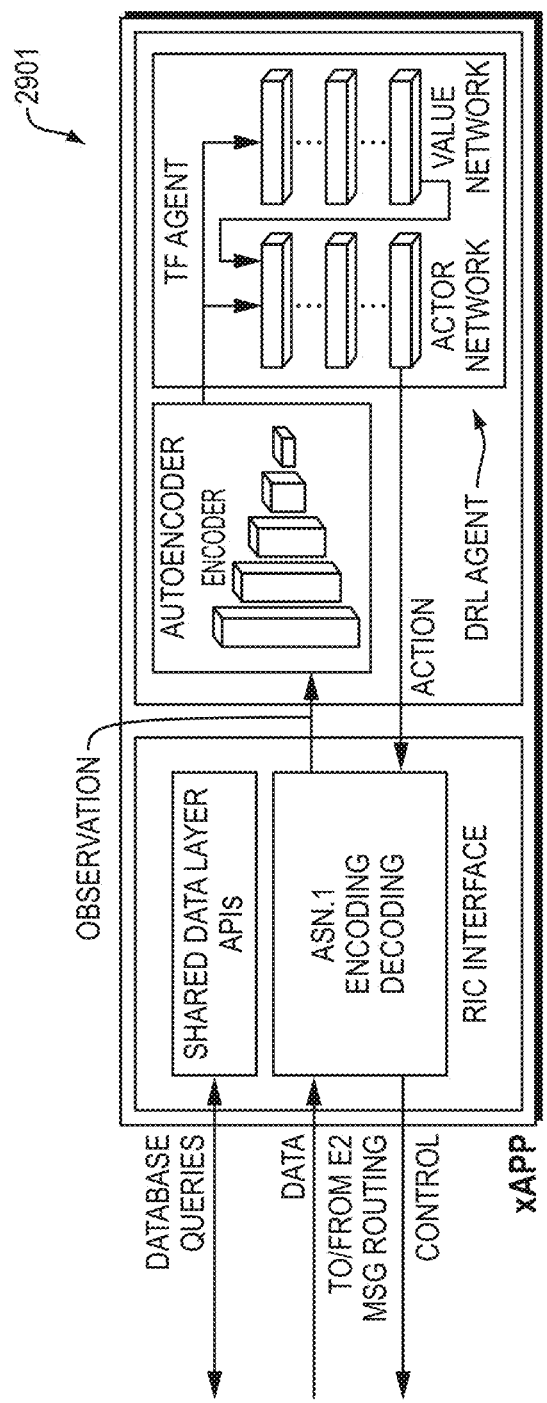
FIG. 29B is a block diagram of an example embodiment of a structure of a ColORAN xApp.

FIG. 29B is a block diagram 2901 of an example embodiment of a structure of a ColORAN xApp. The first component is the interface to the RIC, which implements the SM and performs ASN.1 encoding/decoding of RAN data and control. The second component is the ML infrastructure itself, which includes one or more autoencoders and DRL agents. For non-limiting example, TensorFlow 2.4 (M. Abadi et al., "TensorFlow: Large-scale machine learning on heterogeneous systems," 2015, software available from tensorflow.org.[Online]. Available: https://www.tensorflow.org/) and the TF-Agents library (S. Guadarrama et al., "TF-Agents: A library for reinforcement learning in TensorFlow," https://github com/tensorflow/agents, 2018, [Online; accessed 25 Jun. 2019). [Online]. Available: https://github.com/tensorflow/agents) were used.

The DRL agents have been trained using the Proximal Policy Optimization (PPO) method (J. Schulman, et al., "Proximal policy optimization algorithms," arXiv: 1707.06347 [cs.LG], July 2017) on the dataset described in Section III-D, and selecting RAN data from different base stations to remove dependence on a specific wireless environment (Section V). Training is performed on the offline dataset by randomly selecting instances in which the network reaches the state $s_1$ that results from the combination of the previous state $s_0$ and the action to explore $a_0$. Before being fed to the DRL agents, the data is processed by the encoding portion of an autoencoder for dimensionality reduction (see Section IV-B). DRL agents include an actor network (taking actions) and a value network (scoring the actions taken by the actor network) implemented, for non-limiting example, as two fully-connected neural networks with 5 layers with 30 neurons each and an hyperbolic tangent activation function. The autoencoder has an hourglass architecture with an encoder and a decoder. The encoder includes, for non-limiting example, 4 fully-connected layers with 256, 128, 32 and 3 neurons and a rectified linear activation function. The decoder is the specular image of the encoder. For all models, the learning rate is set to 0.001 for non-limiting example.

The different observation, action, and reward configurations are shown in Table I of FIG. 29A. The DRL agent of sched-slicing jointly selects the slicing and scheduling policy for a single base station and all slices. For this xApp three DRL models were trained for non-limiting example, namely: a baseline (DRL-base), an agent that explores a reduced set of actions (DRL-reduced-actions), and an agent where input data is fed directly to the agent (DRL-no-autoencoder). The sched xApp includes, for non-limiting example, three DRL agents that select in parallel the scheduling policy for each slice (eMBB, MTC, and URLLC). Each agent has been trained using slice-specific data.

Finally, the online-training xApp supports training a DRL agent using live data from the RAN and performing exploration steps on the online RAN infrastructure itself. While this is not recommended by O-RAN (O-RAN Working Group 2, "O-RAN AI/ML workflow description and requirements—v1.01," O-RAN.WG2.AIML—v01.01 Technical Specification, April 2020), it specializes the trained model to the specific deployment. The tradeoffs involved in this operation are discussed in Section V. online-training leverages TensorFlow CheckPoint objects to save and re-store a (partially) trained model for multiple consecutive rounds of training. In this way, the training services in the xApp can restore an agent trained on an offline dataset using it as starting point for the online, live training on the RAN.

D. Large-Scale Data Collection for ColORAN

To train the DRL agents for the ColORAN xApps, large-scale data collection experiments were performed on Colosseum. The parameters for the scenario are summarized in Table II, disclosed below.

TABLE II

Configuration parameters for the considered scenario.

| Parameter | Value |
| --- | --- |
| Number of nodes | $N_{BS}$ = 7, $N_{UE}$ = 42 |
| RF parameters | DL carrier $f_d$ = 0.98 GHz, UL carrier $f_u$ = 1.02 GHz, bandwidth B = 10 MHz (50 PRBs) |
| Schedulers | RR, WF, PF |
| Slices | eMBB, MTC, URLLC (2 UEs/BS/slice) |
| Traffic profiles | Slice-based: 4 Mbit/s/UE for eMBB, 44.6 kbit/s/UE for MTC, 89.3 kbit/s/UE URLLC<br>Uniform: 1.5 Mbit/s/UE for eMBB, MTC, URLLC |

The large-scale RF scenario mimics a real-world cellular deployment in downtown Rome, Italy, with the positions of the base stations derived from the OpenCelliD database (Unwired Labs. OpenCelliD. https://opencellid.org. Accessed July 2021). A softwarized cellular network was instantiated with 7 base stations through the SCOPE framework, disclosed above. For non-limiting example, each base station operates on a 10 MHz channel (50 PRBs) which can be dynamically assigned to the 3 slices (i.e., eMBB, MTC, URLLC). Additionally, two different TGEN traffic scenarios were considered: slice-based traffic and uniform traffic. In slice-based traffic, users are distributed among different traffic profiles (4 Mbit/s constant bitrate traffic to eMBB users, and 44.6 kbit/s and 89.3 kbit/s Poisson traffic to MTC and URLLC, respectively, for non-limiting example). The uniform traffic is configured with 1.5 Mbit/s for all users, for non-limiting example. The training of the DRL agents on the offline dataset has been performed with slice-based traffic. Finally, for non-limiting example, the base stations serve a total of 42 users equally divided among the 3 slices.

In the data collection campaign, 11 GB of data was gathered, for a total of more than 100 hours of experiments. In each experiment, the base stations periodically report RAN KPMs to the non real-time RIC. These include metrics such as throughput, buffer queues, number of PHY Transport Blocks (TBs), and PRBs. The complete dataset features more than 30 metrics that can be used for RAN analysis and ML training.

IV. Lessons Learned on DRL-Based xApp Design

Learning strategies for RAN control are coded as xApps on ColORAN. This section presents their comparative performance evaluation. Feature selection based on RAN KPMs is described in Section IV-A. The experimental comparison of the different DRL models is reported in Section IV-B.

A. RAN KPM and Feature Selection

O-RAN is the first architecture to introduce a standardized way to extract telemetry and data from the RAN to drive closed-loop control. However, O-RAN does not indicate which KPMs should be considered for the design of ML methods. The O-RAN E2SM KPM specifications (O-RAN Working Group 3, "O-RAN near-real-time RAN intelligent controller E2 service model (E2SM) KPM 1.0," ORAN-WG3.E2SM-KPM—v01.00.00 Technical Specification, February 2020) allow the generation of more than 400 possible KPMs, listed in (3GPP, "5G performance measurements," Technical Specification (TS) 28.552, June 2021, version 17.3.1, "Performance measurements Evolved Universal Terrestrial Radio Access Network (E-UTRAN)," Technical Specification (TS) 32.425, June 2021, version 17.1.0). More vendor-specific KPMs may also be reported on E2. These KPMs range from physical layer metrics to base station monitoring statistics. Therefore, the bulk set of data may not be useful to represent the network state for a specific problem. Additionally, reporting or collecting all the metrics via the E2 or O1 interfaces introduces a high overhead, and a highly dimensional input may lead to sub-optimal performance for ML-driven xApps (M. Sakurada and T. Yairi, "Anomaly detection using autoencoders with nonlinear dimensionality reduction," in Proc. of the 2nd Workshop on Machine Learning for Sensory Data Analysis, ser. MLSDA'14, Gold Coast, Australia QLD, Australia, 2014, p. 4-11).

Therefore, a key step in the design process of ML-driven xApps is the selection of the features that should be reported for RAN closed-loop control. In this context, the availability of large-scale, heterogeneous datasets and wireless data factories is key to enable feature selection based on a combined expert- and data-driven approach. To better illustrate this, a correlation analysis for several metrics collected in the dataset described in Section III-D is reported in FIGS. 30A-D and FIGS. 31A and 31B, disclosed below. The correlation analysis helps identify the KPMs that provide a meaningful description of the network state with minimal redundancy.

FIGS. 30A-D are graphs of an example embodiment of correlation analysis for the eMBB slice with 36 PRBs and the slice-based traffic profile. The solid line is the linear regression fit of the data.

Correlation analysis. FIG. 30A is a graph 3000 that shows the correlation matrix of 9 among the 30 UE-specific metrics in the dataset for the eMBB slice. While downlink and uplink metrics exhibit a low correlation, most downlink KPMs positively or negatively correlate with each other (the same holds for uplink KPMs). For example, the downlink Modulation and Coding Scheme (MCS) and buffer occupancy have a negative correlation (−0.56). This can also be seen in the scatter plot 3002 of FIG. 30B that shows MCS vs. buffer size: as the MCS increases, it is less likely to have a high buffer occupancy, and vice versa. Similarly, the number of TBs and symbols in downlink have a strong positive correlation (0.998), as also shown in the graph 3006 of FIG. 30D that shows the number of PHY TB vs. TX symbols. Two downlink metrics that do not correlate well, instead, are the number of TBs and the buffer occupancy. Indeed, the amount of data transmitted in each TB varies with the MCS and, therefore, cannot be used as indicator of how much the buffer will empty after each transmission. Additionally, as shown in the graph 3004 of FIG. 30C that shows the number of PHY TB vs. buffer size, the three scheduling policies have a different quantitative behavior, but they all show a low correlation.

eMBB vs. URLLC. The correlation among metrics also depends on the RAN configuration and slice traffic profile. This can be seen by comparing FIGS. 30A-D, which analyzes the eMBB slice with 36 PRBs, and FIGS. 31A and 31B, which use telemetry for the URLLC slice with 11 PRBs.

FIGS. 31A and 31B are graphs of an example embodiment of correlation analysis for the URLLC slice with 11 PRBs and the slice-based traffic profile. FIG. 31A is a graph of the correlation matrix 3100. The solid line 3111 of the graph 3102 of FIG. 31B is the linear regression fit of the data. With the slice-based traffic, the URLLC users receive data at a rate that is an order of magnitude smaller than that of the eMBB users. As a consequence, the load on the URLLC slice (represented by the buffer occupancy in the graph 3102 of FIG. 31B) is lower, and the buffer is quickly drained even with lower MCSs. Consequently, the correlation among the buffer occupancy and the MCS (−0.2) is lower with respect to the eMBB slice. This further makes the case for collecting datasets that are truly representative of a wireless RAN deployment, including heterogeneous traffic and diverse applications.

Summary. FIGS. 30A-D and FIGS. 31A and 31B provide insights on which metrics can be used to describe the RAN status. Since the number of downlink symbols and TBs, or the MCS and the buffer occupancy for the eMBB slice are highly correlated, using them to represent the state of the network only increases the dimensionality of the state vector without introducing additional information. Conversely, the buffer occupancy and the number of TBs enrich the representation with low redundancy. Therefore, the DRL agents for the xApps disclosed herein may consider as input metrics the number of TBs, the buffer occupancy (or the ratio of PRB granted and requested, which has a high correlation with the buffer status), and the downlink rate.

B. Comparing Different DRL-Based RAN Control Strategies

Once the input metrics have been selected, the next step in the design of ML applications involves the selection of the proper modeling strategy (O-RAN Working Group 2, "O-RAN AI/ML workflow description and requirements—v1.01," O-RAN.WG2.AIML—v01.01 Technical Specification, April 2020). In this disclosure, ML models for sequential decision making were considered and, thus, focus on DRL methods.

Control policy selection. In this context, it is clearly crucial to properly select the control knobs, i.e., the RAN parameters that need to be controlled and adapted automatically, and the action space, i.e., the support on which these parameters can change. To this end, FIGS. 32A-C, disclosed below, compare the performance for the sched and sched-slicing xApps, which perform different control actions. The first assumes a fixed slicing profile and includes three DRL agents that select the scheduling policy for each slice, while the second jointly controls the slicing (i.e., number of PRBs allocated to each slice) and scheduling policies with a single DRL agent. For this comparison, the slicing profile for the sched xApp evaluation matches the configuration that is chosen most often by the sched-slicing agent, and the source traffic is slice-based.

FIGS. 32A-C are graphs, namely the graphs 3200, 3202, and 3204, respectively, of an example embodiment of a comparison between the sched and sched-slicing xApps, with the slice-based traffic profile. The slicing for the sched xApp is fixed and based on the configuration chosen with highest probability by the sched-slicing xApp (36 PRBs for eMBB, 3 for MTC, 11 for URLLC). The Cumulative Distribution Functions (CDFs) of FIGS. 32A-C show that the joint control of slicing and scheduling improves the relevant metric for each slice, with the most significant improvements in the PRB ratio and in the throughput for the users below the 40th percentile. This shows that there exist edge cases in which adapting the slicing profile further improves the network performance with respect to adaptive schedulers with a static slice configuration, even if the fixed slicing configuration is the one that is chosen most often by the sched-slicing xApp.

DRL agent design. To further elaborate on the capabilities of sched-slicing, in FIGS. 33A-D, disclosed below, results for different configurations of the DRL agent of the xApp are compared, as well as for a static baseline without slicing or scheduling adaptation, using the slice-based traffic. The slicing profile for the static baseline is the one chosen most often by the sched-slicing xApp. The results of FIGS. 33A-D further highlight the performance improvement introduced by adaptive, closed-loop control, with the DRL-driven control outperforming all baselines.

FIGS. 33A-D are graphs (3300, 3302, 3304, and 3306) of an example embodiment of a comparison between the different models of the sched-slicing xApp and baselines without DRL-based adaptation. For the latter, the performance is based on the slicing configuration chosen with highest probability by the best-performing DRL agent, and the three scheduler policies.

Additionally, this comparison spotlights the importance of careful selection of the action space for the DRL agents. By constraining or expanding the action space that the DRL agents can explore, the xApp designer can bias the selected policies. Consider the DRL-base and DRL-reduced-actions agents (see Table I of FIG. 29A), whose difference is in the set of actions that the DRL agent can explore. Notably, the DRL-reduced-actions agent lacks the action that results in the policy chosen most often by the DRL-base agent. Compared to the most common action chosen by the DRL-reduced-actions agent (36 PRB for eMBB, 9 for MTC, 5 for URLLC), the most likely policy of DRL-base agent favors the URLLC over the MTC slice (11 vs. 3 PRBs). This is reflected in the performance metrics for the different slices. Notably, DRL-reduced-actions fails to maintain a small buffer and high PRB ratio for the URLLC slice (FIG. 33C and FIG. 33D), but achieves the smallest buffer occupancy for the MTC traffic.

Autoencoder. Finally, the results of FIGS. 33A-D show the benefit of using an autoencoder, as the DRL-base and DRL-reduced-actions agents generally outperform the DRL-no-autoencoder agent. Indeed, the autoencoder decreases the dimensionality of the input for the DRL agent, improving the mapping between the network state and the actions. Specifically, the autoencoder used herein reduces a matrix of $T=10$ input vectors with $N=3$ metrics each to a single N-dimensional vector, for non-limiting example. Second, it improves the performance with online inference on real RAN data. Indeed, one of the issues of operating ML methods on live RAN telemetry is that some entries may be reported inconsistently or may be missing altogether. To address this, an example embodiment trains the autoencoder simulating the presence of a random number of zero entries in the training dataset. This allows the network to be able to meaningfully represent the state even if the input tensor is not fully populated with RAN data.

V. Lessons Learned on Online Training for xApps

The last set of results presents an analysis of the tradeoffs associated with training DRL agents on a live network in an on-line fashion. These include the evaluation of the time required for convergence, the impact of the exploration process on the RAN performance, and the benefits involved with this procedure. To do this, a model, pre-trained on the offline dataset with the slice-based traffic profile, is loaded on the online-training xApp. The same model is used in the DRL-reduced-actions agent. The online-training xApp is deployed on a ColORAN base station and an example embodiment further continues the training with online exploration, using the uniform traffic profile (with the same constant bitrate traffic for each user) for non-limiting example. Additionally, the containerized nature of ColO-RAN is leveraged to deploy it on Arena (L. Bertizzolo et al., "Arena: A 64-antenna SDR-based ceiling grid testing platform for sub-6 GHz 5G-and-beyond radio spectrum research," Computer Networks, vol. 181, pp. 1-17, November 2020) a publicly available indoor testbed, and perform training with one SDR base station and three smartphones.

Figure 34A:
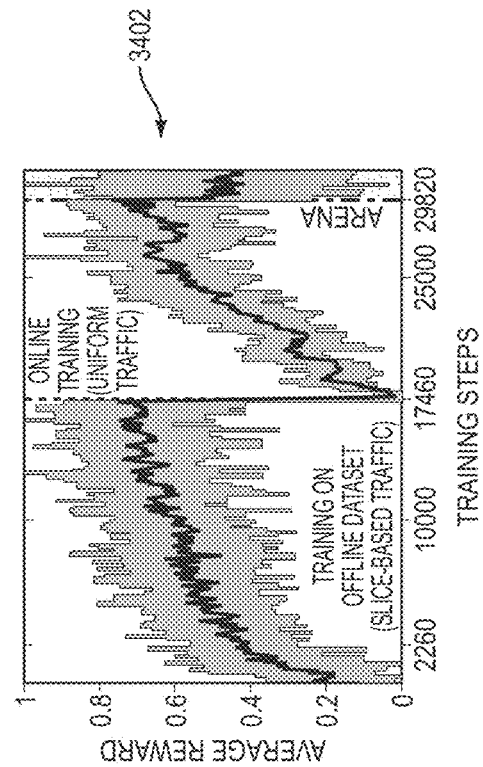
FIGS. 34A and 34B are graphs of an example embodiment of metrics for the training on the offline dataset and the online training on Colosseum and Arena.
Figure 34B:
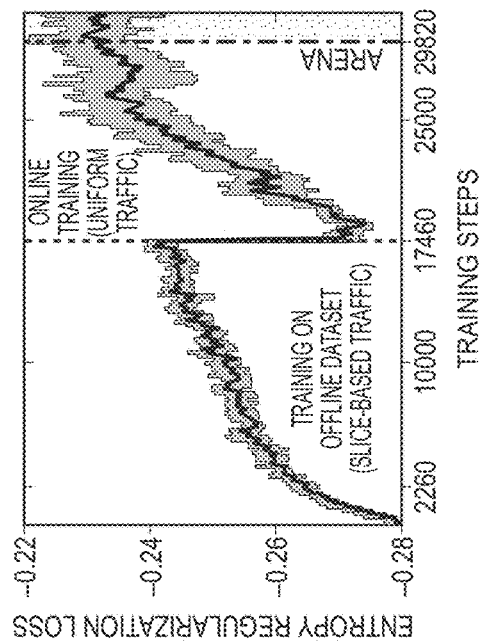

Convergence. FIGS. 34A and 34B show how quickly the pre-trained agent adapts to the new environment.

FIGS. 34A and 34B are graphs of an example embodiment of metrics for the training on the offline dataset and the online training on Colosseum and Arena. The Arena configuration uses LTE band 7. FIG. 34A is a graph 3400 that shows the entropy regularization loss and FIG. 34B is graph 3402 that shows the reward. In particular, FIG. 34A reports the entropy regularization loss as a function of the training step of the agent. This metric correlates with the convergence of the training process: the smaller the absolute value of the entropy, the more likely the agent has converged to a set of actions that maximize the reward in the long run (T. Haarnoja, et al., "Reinforcement learning with deep energy-based policies," in Proc. of the 34th Intl. Conf. on Machine Learning, ser. ICML'17, Sydney, NSW, Australia, 2017, p. 1352-1361). When this metric (and the average reward, FIG. 34B) plateaus the training is stopped, i.e., at step 17460 for the offline training, step 29820 for the online training on Colosseum. The loss remains stable when transitioning from the Colosseum to the Arena online training, while it increases (in absolute value) when switching traffic profile at step 17460. This shows that the agent can better generalize across different channel conditions than source traffic profiles. The same trend can be observed in the average reward (FIG. 34B), with the difference that the transition from Colosseum to Arena halves the reward (as this configuration features 3 and not 6 users for each base station). While the Colosseum online training requires 30% fewer steps than the initial offline training, it also comes with a higher wall-clock time. Indeed, offline exploration allows the instantiation of multiple parallel learning environments. Because of this, the Colosseum DGX supports the simultaneous exploration of 45 network configurations. Instead, online training can explore one configuration at a time, leading to a higher wall-clock time.

Figure 35:
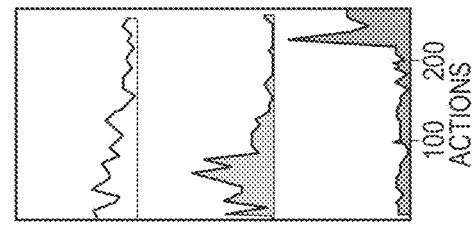
FIG. 35 is a graph of an example embodiment of distribution of the actions during the training on the offline dataset and the online training on Colosseum.

FIG. 35 is a graph 3500 of an example embodiment of distribution of the actions during the training on the offline dataset and the online training on Colosseum. The offline training stops at step 17460. FIG. 35 reports the evolution of the distribution of the actions chosen by the DRL agent for the Colosseum offline and online training. Three histograms for steps 2260, 17460 (end of offline training) and 29820 (end of online training) are also highlighted in the plot 3502 on the right. During training, the distribution of the actions evolves from uniform to more skewed, multi-modal distributions at the end of the offline training (in orange) and online training (in red). Additionally, when the training on the new environment begins, the absolute value of the entropy regularization loss increases (FIG. 34A), and, correspondingly, the distribution starts to change, until convergence to a new set of actions is reached again.

Impact of online training on RAN performance. Achieving convergence with a limited number of steps is particularly important for online training, as the performance of the RAN may be negatively affected during the training process. FIG. 36 reports the CDF for the user throughput during training and after, when the agent trained online is deployed on the sched-slicing xApp.

FIG. 36 is a graph 3600 of an example embodiment of CDF of the throughput for the eMBB slice during the online training (OT) and with the trained agent (TR) with the uniform traffic profile. The performance worsens when comparing the initial training step, which corresponds to the agent still using the actions learned during offline training, with an intermediate step, in which it is exploring random actions.

Once the agent identifies the policies that maximize the reward in the new environment (in this case, with the uniform source traffic profile), the throughput improves. The best performance, however, is achieved with the trained agent, which does not perform any exploration. FIG. 37 further elaborates on this by showing how the online training process increases the through-put variability for the two eMBB users.

FIG. 37 is a graph 3700 of an example embodiment of an eMBB slice throughput during training and with the trained model.

Therefore, performing online training on a production RAN may be something a telecom operator cannot afford, as it may temporarily lead to disservices or reduced quality of service for the end users. In this sense, testbeds such as Colosseum can be an invaluable tool for two reasons. First, they provide the infrastructure to test pre-trained ML methods—and ColORAN enables any RAN developer to quickly onboard and test their xApps in a standardized O-RAN platform. Second, they allow online training without affecting the performance of production environments.

Adaptability. The main benefit of an online training phase is to allow the pre-trained agent to adapt to updates in the environment that are not part of the training dataset. In this case, the agent trained by the online-training xApp adapts to a new configuration in the slice traffic, i.e., the uniform traffic profile. FIGS. 38A and 38B compare the cell throughout for the agent before/after the online training, as disclosed below.

FIGS. 38A and 38B are graphs (3800 and 3802) of an example embodiment of throughput comparison between the offline- and online-trained models with two source traffic patterns. The offline agent is the DRL-base for the sched-slicing xApp. FIGS. 38A and 38B compare the cell throughout for the agent before/after the online training, with the slice-based source traffic (FIG. 38A) and the uniform source traffic (FIG. 38B). Notably, the online agent achieves a throughput comparable with that of the agent trained on the offline dataset with slice-based traffic, showing that—despite the additional training steps—it is still capable of selecting proper actions for this traffic profile. This can also be seen in FIG. 39, disclosed below, which shows that the action selected most often grants the most PRBs to the eMBB slice (whose users have a traffic one order of magnitude higher than MTC and URLLC).

Figure 39:
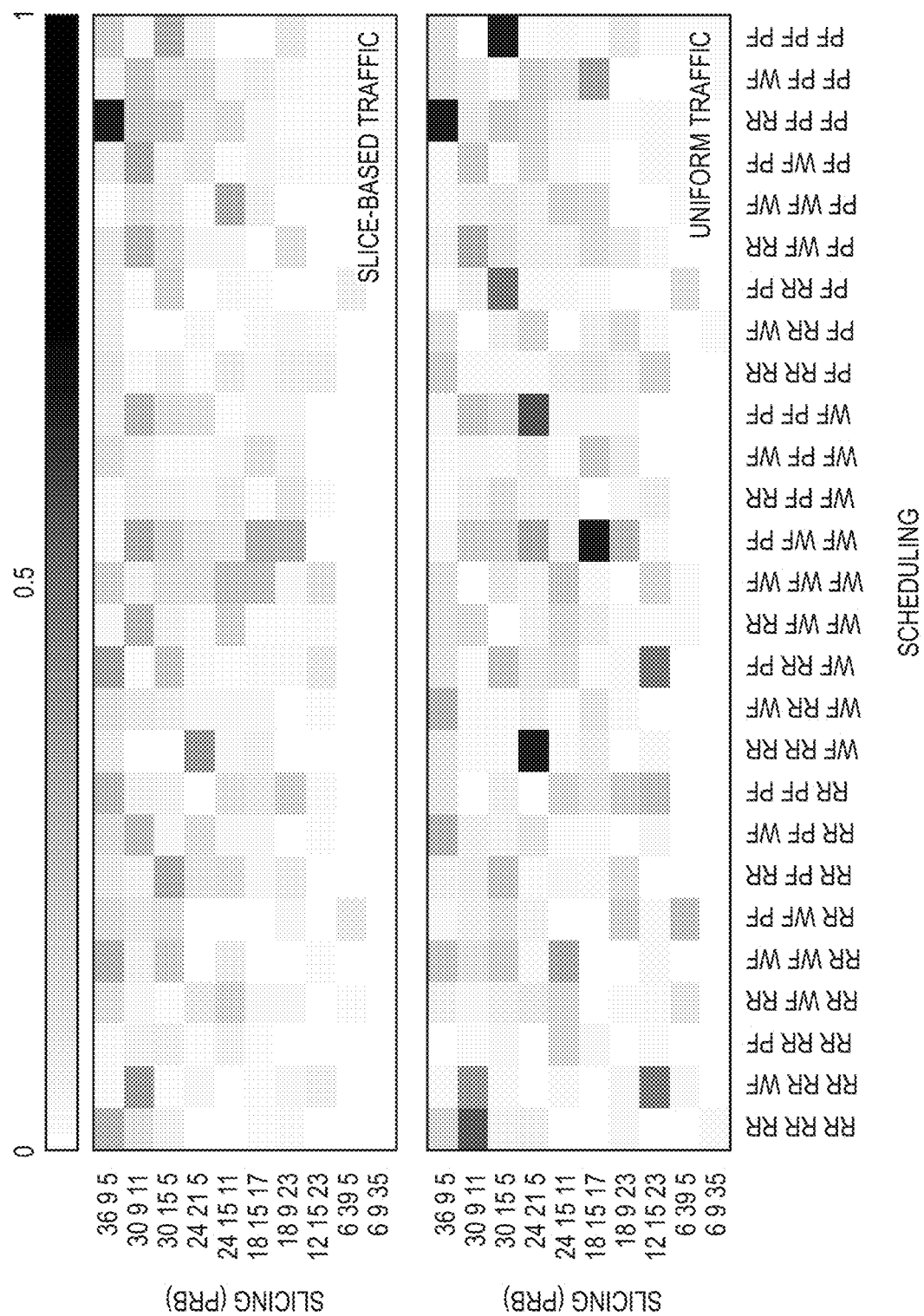
FIG. 39 is a graph of an example embodiment of probability of selecting a slicing/scheduling combination for the online-trained agent with two different source traffic patterns.

FIG. 39 is a graph 3900 of an example embodiment of probability of selecting a slicing/scheduling combination for the online-trained agent with two different source traffic patterns. For each tuple, the first element refers to the PRB (scheduling) for the eMBB slice, the second for the MTC slice, and the third for the URLLC slice. The online agent, however, outperforms the offline-trained agent with the uniform traffic profile, with a gap of 2 Mbit/s in the 80th percentile, demonstrating the effectiveness of the online training to adapt to the updated traffic. The action profile also changes when comparing slice-based and uniform traffic, with a preference toward more balanced PRB allocations.

Summary. These results show how online training can help pre-trained models evolve and meet the demands of the specific environment in which they are deployed, at the cost, however, of reduced RAN performance during training. This makes the case for further research in this area, to develop, for example, smart scheduling methods that can alternate training and inference/control steps according to the needs of the network operator. Additionally, models pre-trained on Colosseum were shown to be effective also in over-the-air deployments, making the case for ColORAN as a platform to train and test O-RAN ML solutions in a controlled environment.

VI. Related Work

The application of ML to wireless networks is a topic that has received a lot of attention in recent years. Studies in the literature span the full protocol stack, with applications to channel modeling, PHY and MAC layers, ML-based routing and transport, and data-driven applications (J. O'Shea, K. Karra, and T. C. Clancy, "Learning to communicate: Channel auto-encoders, domain specific regularizers, and attention," in Proc. of IEEE Intl. Symp. on Signal Processing and Information Technology (ISSPIT), Limassol, Cyprus, December 2016, pp. 223-228, S. Abbasloo, C.-Y. Yen, and H. J. Chao, "Wanna make your TCP scheme great for cellular networks? let machines do it for you!" IEEE J. on Sel. Areas Commun., vol. 39, no. 1, pp. 265-279, January 2021, M. G. Kibria et al., "Big data analytics, machine learning, and artificial intelligence in next-generation wireless networks," IEEE Access, vol. 6, pp. 32 328-32 338, 2018).

Several papers review the potential and challenges of ML for wireless networks, discussing open issues and potential solutions. The authors of (M. G. Kibria et al., "Big data analytics, machine learning, and artificial intelligence in next-generation wireless networks," IEEE Access, vol. 6, pp. 32 328-32 338, 2018) highlight different areas in which ML and big data analytics can be applied to wireless networks. (Y. Sun, M. Peng, Y. Zhou, Y. Huang, and S. Mao, "Application of machine learning in wireless networks: Key techniques and open issues," IEEE Commun. Surveys Tuts., vol. 21, no. 4, pp. 3072-3108, Fourth quarter 2019, D. Gunduz et al., "Machine learning in the air," IEEE J. Sel. Areas Commun., vol. 37, no. 10, pp. 2184-2199, October 2019) review the key learning techniques that researchers have applied to wireless, together with open issues. Similarly, (M. Chen, U. Challita, W. Saad, C. Yin, and M. Debbah, "Artificial neural networks-based machine learning for wireless networks: A tutorial," IEEE Commun. Surveys Tuts., vol. 21, no. 4, pp. 3039-3071, Fourth quarter 2019) focuses on artificial neural network methods. Other reviews can be found in (J. Wang et al., "Thirty years of machine learning: The road to Pareto-optimal wireless networks," IEEE Commun. Surveys Tuts., vol. 22, no. 3, pp. 1472-1514, Third quarter 2020, C. Jiang et al., "Machine learning paradigms for next-generation wireless networks," IEEE Wireless Commun., vol. 24, no. 2, pp. 98-105, April 2017). While these papers present a clear overview of open problems associated with learning in wireless networks, and sometimes include some numerical evaluations (Z. Xiong et al., "Deep reinforcement learning for mobile 5G and beyond: Fundamentals, applications, and challenges," IEEE Vehic. Tech. Mag., vol. 14, no. 2, pp. 44-52, June 2019, Y. Fu, S. Wang, C.-X. Wang, X. Hong, and S. McLaughlin, "Artificial intelligence to manage network traffic of 5G wireless networks," IEEE Netw., vol. 32, no. 6, pp. 58-64, 2018), they do not provide results based on an actual large-scale deployment, as disclosed herein, thus, missing key insights related to the usage of real data, with imperfections, and of closed-loop control on actual radios.

When it comes to cellular networks, ML has been applied throughout the 3GPP protocol stack. The authors of (E. Perenda, S. Rajendran, G. Bovet, S. Pollin, and M. Zheleva, "Learning the unknown: Improving modulation classification performance in unseen scenarios," in Proc. of IEEE INFOCOM 2021, Virtual Conference, May 1-13, 2021) automatically classify modulation and coding methods. Their approach is with respect to modulation parameters that are not part of the training set—a typical problem in wireless networks. Again, at the physical layer, (Y. Huang, T. Hou, and W. Lou, "A Deep-Learning-based Link Adaptation Design for eMBB/URLLC Multiplexing in 5G NR," in Proc. of IEEE INFOCOM 2021, Virtual Conference, May 1-13, 2021) studies learning-based link adaptation methods to select the proper MCS for eMBB in case of preemptive puncturing for URLLC. The papers (M. Polese et al., "Machine learning at the edge: A data-driven architecture with applications to 5G cellular networks," IEEE Trans. Mob. Comput., pp. 1-16, June 2020, D. Bega, M. Gramaglia, M. Fiore, A. Banchs, and X. Costa-Perez, "DeepCog: Cognitive network management in sliced 5G networks with deep learning," in Proc. of IEEE INFOCOM 2019, Paris, France, Apr. 29-May 2, 2019, pp. 280-288, J. Wang et al., "Spatiotemporal modeling and prediction in cellular networks: A big data enabled deep learning approach," in Proc. of IEEE INFOCOM 2017, Atlanta, GA, USA, May 2017, pp. 1-9.39) apply ML to 5G network management and KPM prediction. These papers, however, do not close the loop with experimental evaluation of the control action or classification accuracy on real testbeds and networks. (Chuai et al., "A collaborative learning based approach for parameter configuration of cellular networks," in Proc. of IEEE INFOCOM 2019, Paris, France, Apr. 29-May 2, 2019, pp. 1396-1404) features a large-scale, experimental evaluation on a production network, but the evaluation is limited to a single performance metric.

DRL has recently entered the spotlight as a promising enabler of self-adaptive RAN control. (N. Naderializadeh, J. J. Sydir, M. Simsek, and H. Nikopour, "Resource management in wireless networks via multi-agent deep reinforcement learning," IEEE Trans. Wireless Commun., vol. 20, no. 6, pp. 3507-3523, June 2021) considers a multi-agent setup for centralized control in wireless networks, but not in the context of cellular networks. (Z. Wang, L. Li, Y. Xu, H. Tian, and S. Cui, "Handover control in wireless systems via asynchronous multiuser deep reinforcement learning," IEEE Internet Things J., vol. 5, no. 6, pp. 4296-4307, December 2018) uses DRL to perform handover. Other papers analyze the theoretical performance of DRL agents for medium access (S. Wang, H. Liu, P. H. Gomes, and B. Krishnamachari, "Deep reinforcement learning for dynamic multichannel access in wireless networks," IEEE Trans. Cogn. Commun. Netw., vol. 4, no. 2, pp. 257-265, June 2018) and user association (N. Zhao et al., "Deep reinforcement learning for user association and resource allocation in heterogeneous cellular networks," IEEE Trans. Wireless Commun., vol. 18, no. 11, pp. 5141-5152, November 2019). The authors of (S. Mollahasani, M. Erol-Kantarci, M. Hirab, H. Dehghan, and R. Wil-son, "Actor-critic learning based QoS-aware scheduler for reconfigurable wireless networks," IEEE Trans. on Netw. Sci. Eng., pp. 1-10, 2021) evaluate actor-critic learning for scheduling, and (H. Zhou, M. Elsayed, and M. Erol-Kantarci, "RAN resource slicing in 5G using multi-agent correlated Q-learning," in Proc. IEEE Intl. Symp. on Personal, Indoor and Mobile Radio Communications (PIMRC), Virtual Conference, September 2021) applies Q-learning to RAN slicing. (S. Chinchali et al., "Cellular network traffic scheduling with deep reinforcement learning," in Proc. of Thirty-Second AAAI Conf. on Artificial Intelligence, New Orleans, LA, 2018, pp. 766-774) applies DRL to user scheduling at the base station level. Contrary to these papers, an example embodiment analyzes the performance of DRL agents with a closed loop, implementing the control actions on a software-defined testbed with an O-RAN compliant infrastructure, to provide insights on how DRL agents impact a realistic cellular network environment. Finally, (S. Niknam et al., "Intelligent O-RAN for beyond 5G and 6G wireless networks," arXiv: 2005.08374 [eess.SP], May 2020, L. Bonati, et al., "Intelligence and learning in O-RAN for data-driven NextG cellular networks," arXiv:2012.01263 [cs.NI], December 2020) consider ML/DRL applications in O-RAN, but provide a limited evaluation of the RAN performance without specific insights and results on ML.

VII. Conclusions

The disclosure above presents the first large-scale evaluation of ML-driven O-RAN xApps for managing and controlling a cellular network. For this purpose, ColORAN was introduced, the implementation of the O-RAN architecture in the Colosseum network emulator. ColORAN features a RAN E2 termination, a near real-time RIC with three different xApps, and a non real-time RIC for data storage and ML training. The effectiveness of ColORAN is demonstrated through results from the large-scale comparative performance evaluation of the xApps running on ColORAN and discuss key lessons learned on DRL-based closed-loop control. In particular, it should be understood from the disclosure that (i) it is useful to choose meaningful input features for the network state to avoid unnecessarily highly dimensional input for the DRL agent and that (ii) the action space for the DRL agent should be properly designed. The disclosure presents a comparison of different scheduling and slicing adaptation strategies that shows that autoencoders can help to deal with unreliable real RAN data. Further, that above disclosure provides insights on the live training of DRL agents in Colosseum and Arena.

Figure 40:
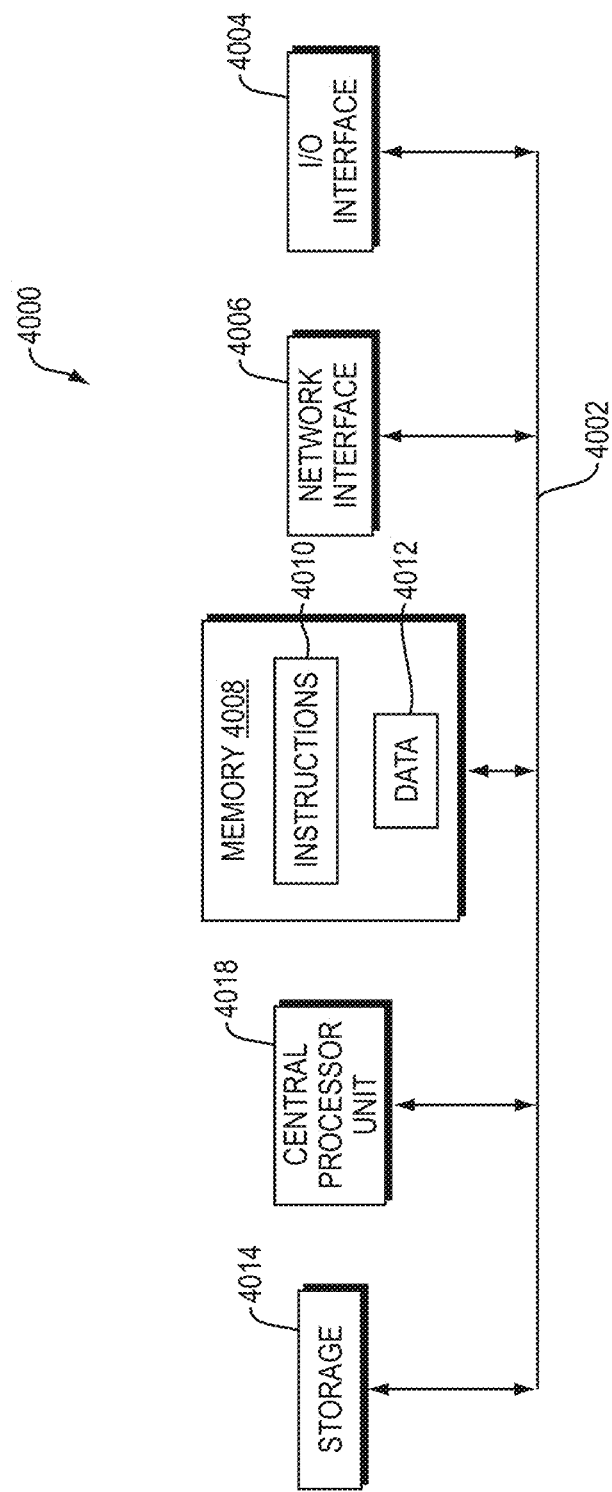
FIG. 40 is a block diagram of an example internal structure of a computer optionally within an embodiment disclosed herein.

FIG. 40 is a block diagram of an example of the internal structure of a computer 4000 in which various embodiments of the present disclosure may be implemented for non-limiting example. The computer 4000 contains a system bus 4002, where a bus is a set of hardware lines used for data transfer among the components of a computer or processing system. The system bus 4002 is essentially a shared conduit that connects different elements of a computer system (e.g., processor, disk storage, memory, input/output ports, network ports, etc.) that enables the transfer of information between the elements. Coupled to the system bus 4002 is an I/O device interface 4004 for connecting various input and output devices (e.g., keyboard, mouse, displays, printers, speakers, etc.) to the computer 4000. A network interface 4006 allows the computer 4000 to connect to various other devices attached to a network. Memory 4008 provides volatile or non-volatile storage for computer software instructions 4010 and data 4012 that may be used to implement embodiments of the present disclosure, where the volatile and non-volatile memories are examples of non-transitory media. Disk storage 4014 provides non-volatile storage for computer software instructions 4010 and data 4012 that may be used to implement embodiments of the present disclosure, such as the computer-implemented methods 400 or 1300, disclosed above. A central processor unit 4018 is also coupled to the system bus 4002 and provides for the execution of computer instructions.

Further example embodiments disclosed herein may be configured using a computer program product; for example, controls may be programmed in software for implementing example embodiments. Further example embodiments may include a non-transitory computer-readable-medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 40, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

The following documents are incorporated by reference in their entirety: "Methods for the Enforcement of Network Slicing Policies in Virtualized Cellular Networks;" Salvatore D'Oro; PCT Application No. PCT/US2020/014896; INV-19040; "Operating System for Software Defined Cellular Networks;" Tommaso Melodia; PCT Application No. PCT/US2020/030930; INV-19068; and "A unified framework for multi-access edge computing (MEC) network slicing in 5G networks;" Salvatore D'Oro; Application No. 63/051,992; INV-20109.

While example embodiments have been particularly shown and described, it will be understood by those skilled in the art that various changes in form and details may be made therein without departing from the scope of the embodiments encompassed by the appended claims.

What is claimed is:

1. A radio access network (RAN) intelligent controller (RIC) comprising:
    an interface to a RAN; and
    a data-driven logic unit configured to (i) produce, based on data received from the RAN via the interface, a representation describing a state of the RAN and (ii) based on the representation describing the state of the RAN, instruct an action associated with at least one network element, the interface configured to transmit a message based on the action instructed, the message to be routed to the at least one network element, the representation describing the state of the RAN being based on a context of the RAN, the message transmitted enabling re-configuration of the at least one network element, the re-configuration improving performance of the at least one network element within the context;
    wherein the data-driven logic unit includes an autoencoder and a deep reinforcement learning (DRL) agent, wherein the autoencoder is configured to produce the representation describing the state of the RAN, wherein the DRL agent is configured to instruct the action, and wherein the data-driven logic unit is pre-trained, offline, and wherein the data-driven logic unit is capable of being trained, in real-time, based on the data received.

2. The RIC of claim 1, wherein the context includes a geographical area, frequency of operation, or other condition of the RAN, wherein the action includes at least one instruction to alter at least one parameter of the at least one network element, wherein the data received includes at least one key performance metric (KPM) or key performance indicator (KPI), and wherein the at least one KPM or KPI is associated with throughput, service latency, quality of service (QoS), signal-to-noise ratio, telemetry, or a combination thereof.

3. The RIC of claim 1, wherein the RIC is a near-real-time RIC, and wherein the at least one network element is a base station, a central unit (CU) of a base station, a distributed unit (DU) of a base station, a radio unit (RU) of a base station, another network, other network element, or a combination thereof.

4. The RIC of claim 1, wherein the data-driven logic unit is included in an xApp and wherein the xApp is a composite application deployed on the RIC.

5. The RIC of claim 4, wherein the xApp is a first xApp, wherein a second xApp is deployed on the RIC or on another controller, wherein the first xApp and second xApp include first and second respective instances of at least one shared layer, respectively, and wherein the first xApp is configured to:
produce a newly trained version of the at least one shared layer by training the first respective instance of the at least one shared layer based on the data received; and
communicate the newly trained version produced to the second xApp causing the second xApp to, in turn, update the second respective instance of the at least one shared layer to the newly trained version.

6. The RIC of claim 5, wherein a data-driven logic unit of the second xApp includes a second autoencoder, wherein the first and second respective instances of the at least one shared layer are included in the respective autoencoders of the first and second xApps, wherein the at least one shared layer is associated with a network slicing policy, transmission power or policy, scheduling policy, or other control action.

7. The RIC of claim 1, wherein the data-driven logic unit includes a first machine learning component and a second machine learning component, the first machine learning component configured to produce the representation describing the state of the RAN and the second machine learning component configured to instruct the action.

8. The RIC of claim 7, wherein the first machine learning component is the autoencoder, wherein the second machine learning component is the DRL agent, wherein the DRL agent is configured to process a specific type of data, and wherein the autoencoder is configured to:
modify the data received by padding the data received in an event data is missing from the data received;
decrease dimensionality of the data received, or decrease dimensionality of the data received and modified, to produce a reduced data set of the specific type of data; and
encode the reduced data set to produce the representation describing the state of the RAN.

9. The RIC of claim 7, wherein the representation describing the state of the RAN is produced in a coded form discernible by the second machine learning component, wherein the first machine learning component includes at least one neural network, wherein a given neural network of the at least one neural network is configured to decrease dimensionality of the data received to produce a reduced data set, and wherein the given neural network is further configured to encode the reduced data set to produce the coded form.

10. The RIC of claim 7, wherein the second machine learning component is the DRL agent and includes an actor neural network and a value neural network, wherein the actor neural network is configured to take actions, wherein the value neural network is configured to score the actions taken by the actor network, and wherein the action instructed is among the actions taken by the actor neural network.

11. The RIC of claim 1, wherein the data-driven logic unit includes a plurality of machine learning components trained offline using synthetic data, wherein the synthetic data is obtained via emulation of a wireless network, wherein the plurality of machine learning components are further trained, in real-time, based on the data received from the RAN, and wherein the emulation is based on different channels and network conditions.

12. The RIC of claim 1, wherein the action instructed is configured to control, at the at least one network element, slicing of resources, selection of a scheduling policy, load balancing, transmission power or policy, or a combination thereof, wherein the RIC further comprises at least one neural network or other type of machine learning component configured to produce a prediction or classification based on the representation, wherein the DRL agent is further configured to instruct the action based on the prediction produced, classification produced, or combination thereof, and wherein the classification is associated with traffic and the prediction is associated with a load.

13. A computer-implemented method comprising:
interfacing, by a radio access network (RAN) intelligent controller (RIC), with a RAN;
producing, by an autoencoder of a data-driven logic unit of the RIC, based on data received from the RAN via the interfacing, a representation describing a state of the RAN; and
based on the representation describing the state of the RAN, instructing by a deep reinforcement learning (DRL) agent of the data-driven logic unit, an action associated with at least one network element, the interfacing including transmitting, by the RIC, a message based on the action instructed, the message to be routed to the at least one network element, the representation describing the state of the RAN being based on a context of the RAN, the message transmitted enabling re-configuration of the at least one network element, the re-configuration improving performance of the at least one network element within the context;
wherein the data-driven logic unit is pre-trained, offline, and wherein the data-driven logic unit is capable of being trained, in real-time, based on the data received.

14. The computer-implemented method of claim 13, wherein the RIC is a near-real-time RIC, and wherein the at least one network element is a base station, a central unit (CU) of a base station, a distributed unit (DU) of a base station, a radio unit (RU) of a base station, another network, other network element, or a combination thereof.

15. The computer-implemented method of claim 13, wherein producing the representation describing the state of the RAN includes employing the autoencoder, the autoencoder including a first respective instance of at least one shared layer, and wherein the computer-implemented method further comprises:
producing a newly trained version of the at least one shared layer by training the first respective instance of the at least one shared layer in the autoencoder based on the data received; and
communicating the newly trained version produced to a second autoencoder, the second autoencoder including a second respective instance of the at least one shared layer, the communicating causing the second respective instance of the at least one shared layer in the second autoencoder to be updated to the newly trained version.

16. The computer-implemented method of claim 13, wherein producing the representation describing the state of the RAN includes employing at least one neural network of the autoencoder, wherein instructing the action includes employing the DRL agent, wherein the computer-implemented method further comprises producing, via at least one neural network or other machine learning component, a prediction or classification based on the representation, wherein the classification is associated with traffic, wherein the prediction is associated with a load, and wherein the instructing is further based on the classification, prediction, or combination thereof.

17. The computer-implemented method of claim 16, wherein the DRL agent is configured to process a specific type of data, and wherein the computer-implemented method further comprises, by the autoencoder:
  modifying the data received by padding the data received in an event data is missing from the data received;
  decreasing dimensionality of the data received, or decrease dimensionality of the data received and modified, to produce a reduced data set of the specific type of data; and
encoding the reduced data set to produce the representation describing the state of the RAN.

* * * * *